US012762899B2

(12) United States Patent
Mateer

(10) Patent No.: US 12,762,899 B2
(45) Date of Patent: Oct. 13, 2026

(54) SYSTEM AND METHOD FOR EXPANDED BAGGAGE INFORMATION MESSAGES

(71) Applicant: Craig Mateer, Orlando, FL (US)

(72) Inventor: Craig Mateer, Orlando, FL (US)

( * ) Notice: Subject to any disclaimer, the term of this patent is extended or adjusted under 35 U.S.C. 154(b) by 0 days.

(21) Appl. No.: 19/262,439

(22) Filed: Jul. 8, 2025

(65) Prior Publication Data

US 2025/0336239 A1 Oct. 30, 2025

Related U.S. Application Data

(63) Continuation of application No. 18/421,601, filed on Jan. 24, 2024, now Pat. No. 12,380,740, which is a continuation of application No. 18/529,705, filed on Dec. 5, 2023, now Pat. No. 12,014,580, which is a continuation of application No. 18/337,288, filed on Jun. 19, 2023, now Pat. No. 11,893,832, which is a continuation of application No. 18/332,377, filed on Jun. 9, 2023, now Pat. No. 11,900,732, which is a continuation of application No. 18/201,908, filed on May 25, 2023, now Pat. No. 11,881,057, which is a continuation of application No. 18/311,566, filed on May 3, 2023, now Pat. No. 11,948,404, which is a continuation of application No. 18/104,359, filed on Feb. 1, 2023, now Pat. No. 11,682,241.

(51) Int. Cl.

| | |
|---|---|
| ***G06Q 10/02*** | (2012.01) |
| ***B42D 15/00*** | (2006.01) |
| ***G07B 11/00*** | (2006.01) |
| ***G09F 3/20*** | (2006.01) |

(52) U.S. Cl.

CPC .......... *G07B 11/00* (2013.01); *B42D 15/0053* (2013.01); *G09F 3/207* (2013.01)

(58) Field of Classification Search

CPC ....... G06Q 10/025; B64F 1/368; B64F 1/366; G09F 2003/0254; G06K 19/025; G06K 7/10445

USPC .......................................... 235/384, 375, 492

See application file for complete search history.

(56) References Cited

U.S. PATENT DOCUMENTS

| | | | | |
|---|---|---|---|---|
| 6,158,658 | A * | 12/2000 | Barclay | G07B 15/00 235/375 |
| 11,881,057 | B1 * | 1/2024 | Mateer | G06Q 10/025 |
| 2003/0233244 | A1 * | 12/2003 | Kumhyr | G06Q 10/02 705/5 |
| 2006/0184399 | A1 | 8/2006 | Goldstein | |
| 2008/0120147 | A1 | 5/2008 | Burrows | |

(Continued)

*Primary Examiner* — Paultep Savusdiphol

(74) *Attorney, Agent, or Firm* — Anton J. Hopen; Trenam Law

(57) ABSTRACT

The disclosure describes a method for luggage management involving electronically acquiring an originating hardcopy bag tag identifier (OP-BTI) from a luggage item's bag tag associated with an originating travel carrier. The method uses the OP-BTI as a unique identifier to query a database for expanded baggage information messages that enumerate a passenger's travel path using a different mode of travel from the originating travel carrier. This process includes checking in a luggage item for the passenger using information from the expanded baggage information messages. The method accommodates various modes of travel and lodging entities, and it includes different acquiring devices for the OP-BTI, such as scanning or radio-frequency communication.

30 Claims, 29 Drawing Sheets

(56) References Cited

U.S. PATENT DOCUMENTS

| | | | | |
|---|---|---|---|---|
| 2008/0215383 | A1 | 9/2008 | Sundt et al. | |
| 2008/0243561 | A1 | 10/2008 | Deygout et al. | |
| 2011/0231212 | A1* | 9/2011 | Hurley | G06Q 10/02 705/5 |
| 2015/0286962 | A1 | 10/2015 | Echtermeyer et al. | |
| 2015/0294236 | A1 | 10/2015 | Laffitte et al. | |
| 2017/0004444 | A1 | 1/2017 | Krasko et al. | |
| 2017/0132565 | A1* | 5/2017 | Beadles | G06K 7/1417 |
| 2020/0372536 | A1 | 11/2020 | Scislowski et al. | |
| 2020/0387861 | A1* | 12/2020 | Sanglier | G06Q 10/0833 |
| 2021/0150562 | A1 | 5/2021 | Palriwala et al. | |
| 2022/0058762 | A1* | 2/2022 | Goddard | G06Q 10/0833 |
| 2022/0292273 | A1* | 9/2022 | Kusy | G06K 7/10445 |
| 2023/0186509 | A1 | 6/2023 | Ryan | |
| 2024/0232983 | A1 | 7/2024 | O'Neil-Dunne et al. | |

* cited by examiner

SYSTEM AND METHOD FOR EXPANDED BAGGAGE INFORMATION MESSAGES

PRIORITY CLAIM

This application is a continuation of co-pending U.S. patent application Ser. No. 18/421,601 filed Jan. 24, 2024 entitled "System and Method for Expanded Baggage Information Messages," currently under allowance, which is a continuation of U.S. patent application Ser. No. 18/529,705 filed Dec. 5, 2023 entitled "System for Baggage Check-in," and issued as U.S. Pat. No. 12,014,580 which is a continuation of U.S. patent application Ser. No. 18/337,288 filed Jun. 19, 2023 entitled "Method and System for Baggage Check-in," and issued as U.S. Pat. No. 11,893,832 which is a continuation-in-part of U.S. patent application Ser. No. 18/332,377 filed Jun. 9, 2023 entitled "Digital Recreation of Original Bag Tag Identifier," and issued as U.S. Pat. No. 11,900,732 which claims priority to U.S. patent application Ser. No. 18/201,908 filed May 25, 2023 entitled "Return Leg Remote Passenger-Check-In from Bag Tag Identifiers," and issued as U.S. Pat. No. 11,881,057 on Jan. 23, 2024, which claims priority to Ser. No. 18/311,566 filed May 3, 2023 entitled "Multi-Leg Travel Baggage Tracking," and issued as U.S. Pat. No. 11,948,404 which claims priority to Ser. No. 18/104,359 filed Feb. 1, 2023, and issued as U.S. Pat. No. 11,682,241 on Jun. 20, 2023, entitled "Return Leg Remote Passenger Check-In."

BACKGROUND OF THE INVENTION

1. Field of the Invention

The described embodiments relate generally to baggage check-in. Specifically, the described embodiments relate to systems and methods for extracting otherwise discarded data and repurpose it to utilize the discarded data to trigger printing of return flight bag tag.

2. Brief Description of the Related Art

Travel carriers generally provide a passenger with the ability to check-in luggage packed with a passenger's personal items, with or without a luggage fee. The luggage is often weighed to determine whether additional luggage fees are required. Then, the luggage is tagged by the airline with a printed bag tag. Each travel carrier may have its own format for printing a bag tag at the travel carrier counter. This process consumes human resources of personnel working behind the counter to finalize a check-in of the passenger, print boarding passes, check-in luggage, and print and attach bag tags. Airline travel carriers have also invested in kiosk machines that allow passengers to print bag tags themselves to free up some time for the counter personnel. This can allow a passenger to print and attach the printed bag tag without using the human resources of the counter personnel.

According to the Federal Aviation Administration, the average number of daily passengers in Fiscal Year 2021 was approximately 1.6 million. In Fiscal Year 2019, the average of daily passengers was approximately 2.9 million. Some of these passengers are traveling on the return leg of a trip. Still further, some of the passengers traveling on a return leg are returning from a cruise or high-volume resort.

There have been many attempts to reduce the cost of baggage handling, and especially the baggage handling, traveler departure, and return flight check-in from lodging entities. To simplify baggage handling during transport, a passenger is provided the option to select services from a third-party vendor to pick-up the passenger and/or baggage and transport the baggage to the airport when needed. The baggage may be picked up from any location, such as home, office, hotel, etc. and/or delivered to any location identified by the passenger, without the passenger needing to be present.

Another attempt at baggage handling includes cross-use of employees at lodging entities, such as a hotel. One of the biggest drawbacks of cross-use of employees is that these employees are otherwise unavailable for other tasks that may arise for passengers still enjoying the amenities of the lodging entity. Hiring more employees has become a challenge in recent years due to COVID-19. Moreover, employee costs have risen. In some venues, such as cruise ships, extra employees to handle additional tasks is not just cost prohibitive but reduces the revenue of the cruise by trading paying passengers for the cost of a hired employee. The ability to print bag tags and boarding passes takes up area in the cruise ship that can be used for passenger lodging or additional revenue opportunities.

Some baggage handling services issue a valet receipt or tag that is placed on the luggage. This process still requires the baggage to receive a printed IATA bag tag with a bag tag identifier to replace the valet receipt or tag. This process can be cost prohibitive in a competitive lodging enterprise competing for clientele. Overall, the baggage handling services require a passenger to order the service using a website or mobile application, enter various passenger information that may be entered incorrectly, and pay a fee. Passengers can be remotely checked in to their flights by providing in advance all the necessary flight information of a travel itinerary using the website or mobile application. While the process seems benign, data entry errors can occur which can be very costly coupled with the additional cost of baggage handling and temporary valet tickets.

Most times after a passenger arrives at their destination, the bag tag is removed and discarded to make room for the bag tag on their return leg of travel.

An average ocean liner cruise ship has a capacity of approximately 3,000 passengers. Some larger cruise ships have a capacity of 5,400 passengers. The cruise ship personnel can handle the precheck-in process for a return flight and/or check-in of luggage bags. However, the process consumes valuable limited human resources available on the cruise ship for disembarkation. There is a need for a system and process to address these challenges that are cost and time efficient, and easy to use by any passenger.

BRIEF SUMMARY OF THE INVENTION

The invention includes a method and system for checking in baggage of a passenger for a return flight using an originating hardcopy bag tag identifier (OP-BTI) of an originating flight. The method includes electronically acquiring, by at least one electronic acquiring device, an OP-BTI associated with or printed on a printed bag tag from an originating airline travel carrier that is on a luggage item of a passenger. This creates a digital bag tag identifier (BTI) data record linked to the airline travel carrier. The method includes utilizing, by at least one processor, the OP-BTI as a unique identifier to query a database to retrieve return flight data of the passenger. The method includes checking in, by the at least one processor, each luggage item for the passenger for the return flight with a return flight travel carrier identified in the retrieved return flight data.

Embodiments of the invention comprise an electronic method to streamline baggage check-in for return flights. The method starts with acquiring an OP-BTI associated with or printed on a bag tag from an originating airline travel carrier that is on a luggage item of a passenger. This process creates a digital BTI data record linked to the airline travel carrier. This OP-BTI is utilized as a unique identifier to query a database and retrieve the return flight data of the passenger. Once the return flight data is retrieved, the luggage item for the passenger is checked in for the return flight with a return flight travel carrier.

The passenger is generally departing from a lodging entity such as a hotel, resort, cruise ship, short or long-term rental homestay, residential dwelling, or building. The OP-BTI is acquired either from a radio-frequency communication or by scanning the tag with a barcode scanner or receiving information via a radio frequency identifier (RFID) or near field communication (NFC).

The OP-BTI often includes an International Air Transport Association (IATA) license plate. The database that is queried may be a part of the airline's travel information system. The system queries the database and accesses B-Type messages or universal B-Type messages using the digital BTI data record, which can include baggage transfer messages or baggage source messages.

The process may also involve the system generating records in the database that include universal B-Type messages for multi-mode travel, indicating different modes of travel in a passenger's itinerary. The database can be queried by at least a substring of integer characters comprising the OP-BTI. In addition, the method can entail the printing of a return flight bag tag that is compatible with the International Air Transport Association's standards.

The database stores a manifest and triggers a baggage check-in process for the passenger for a return flight with the return flight travel carrier in response to acquiring the OP-BTI. The system can simulate airline B-Type messages with return flight data, passenger names, and passenger name records. It can also assign new OP-BTIs to luggage items for the return flight and populate a new digital BTI data record representative of the assigned OP-BTI in the simulated B-Type message.

In addition to this, the system can also access a passenger name record stored by an information system of the airline travel carrier using the digital BTI data record. Lastly, the method allows for receiving updated reservation information for a respective passenger and updating a corresponding passenger itinerary linked to the expanded B-Type message of the respective passenger in the database. This triggers a communication to a computing device of the updated reservation information in response to acquiring the OP-BTI.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1A:
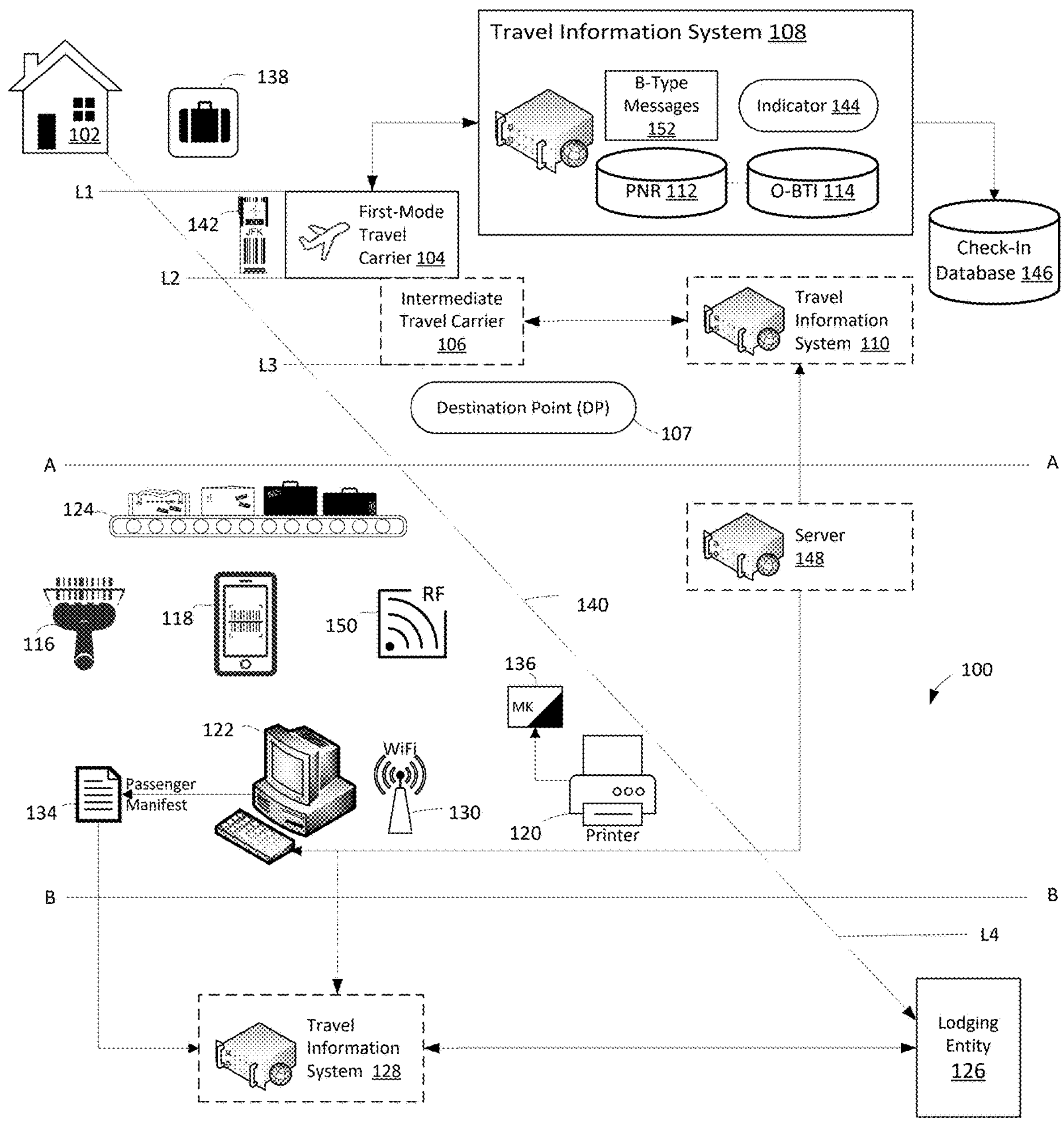
FIG. 1A illustrates a block diagram of a system for checking in baggage of a passenger for return legs of travel in accordance with one embodiment.

Embodiments are described herein with reference to the attached figures wherein like reference numerals are used throughout the figures to designate similar or equivalent elements. The figures are not drawn to scale, and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

A Departure Control System (DCS) controls various airline operations including airport check-in, checking in baggage, generating a passenger bag tag identifier (BTID), and printing of bag tags. The bag tags are formatted based on rules published by the International Air Transport Association (IATA) and include a 10-digit license plate, for example. Typically, one or more IATA Type-B messages are created that includes the 10-digit license plate and flight information.

The inventor has determined that what has been considered garbage (i.e., discarded airline bag tag) is actually a missing link to cost and time efficient handling of baggage by lodging entities, such as resorts and cruise lines, by way of non-limiting example.

The originating bag tag is generally married to a passenger's identity. For example, before any passenger can check-in for their flight, their identity must be verified. The Real ID Act of 2005 enacted by Congress will require passengers to have a license issued by a state to be compatible with the requirements thereof. For example, a license or identification card compatible with the Act of 2005 can include a star in the upper right-hand corner.

"Positive Passenger Baggage Match" is an international regulation used to determine whether a passenger has boarded an airplane of a flight on which their checked-in baggage is loaded. If a passenger is determined not to have boarded a flight, their baggage is removed from the airplane. In the United States, 49 United States Code (U.S.C.) § 44901 includes similar requirements. As can be seen, the "garbage" at the end of the travel journey, when the passenger has arrived at their destination location, holds valuable security information for lodging entities, such as resorts and cruise ships, as well as other modes of travel to follow an airline flight.

Typically, the passenger is encouraged to remove the printed bag tag, after picking up the baggage from the carousel at a destination location. However, the inventor has determined the originally printed bag tag has useful information and instead of discarding the original printed bag tag, it can be used 1) as a substitute for printing and/or attaching temporary valet tags; and 2) for autonomous data entry and retrieval to relieve the passenger or other employee from acquiring a passenger's personal information and return flight information.

A passenger's baggage may be tagged with an adhesive marker from an airline carrier which can also include an IATA license plate bar code. This marker may be placed anywhere on the baggage and can be used as a substitute for printing and/or attaching temporary valet tags or a missing IATA bag tag. For example, an airline IATA bag tag may become damaged or removed as a result of transport though the airline baggage handling system. Thus, the airline baggage marker can be used in the processes described herein.

In some examples, the airline IATA bag tag or other special use bag tags may include a printed IATA license plate and/or a radio frequency identifier (RFID) that can be read by an RFID-reader. However, RFID technology may be used about 10% of the time and is not widely available today. The system and method described herein may use the RFID that is part of the bag tag, for example, and especially if the originally printed bag tag is damaged or otherwise not capable of being scanned by a barcode scanner, by way of a non-limiting example. As is known, the RFID is used because sometimes scanning the 10-digit license plate can be a challenge for the scanners throughout the airline baggage handling system. This is because the printed text may become damaged, or the attached bag tag may be in a position that prevents the barcode from being captured. The system herein may use an RFID reader to acquire the 10-digit license plate in parallel with a barcode scanner or if needed.

The inventor has determined that in addition to using the non-discarded original IATA bag tag as a substitute for a valet tag, the IATA bag tag may be used to automate processes so that the processes are less prone to data entry errors, less burdensome on the passenger, save time, and are cost efficient.

The system described herein employs parallel methodologies to acquire passenger identifiable information to accommodate scenarios of damaged or missing IATA bag tags so that the 10-digit license plate can be acquired without a passenger input or input by other employees. For example, all of the passenger information and especially return flight information may be obtained by a process that scans the non-discarded original airline IATA bag tag and autonomously retrieves a passenger record and return flight information for remote check-in of baggage (i.e., luggage item (s)) of a passenger to return home. The non-discarded originating printed IATA bag tag may be used as a machine-readable instrument for locating and tracking a luggage item by a smart baggage travel system independent of an airline environment for a portion of a return path home for multi-modes of travel prior to a return flight.

The scanning of all non-discarded bag tags may include scanning dockside of a lodging entity such as a cruise line, scanning at a destination airport or intermediate travel carrier upon arrival, scanning at any lodging entity, such as a hotel resort, and/or scanning at a location anywhere between a destination airport or intermediate travel carrier and the lodging entity.

The scanning of all non-discarded bag tags may include scanning the non-discarded bag tags at any mode of travel station prior to the luggage item being loaded on a transport vehicle (i.e., van, train, bus, ferry).

The inventor has determined that the original printed/paper bag tag by an airline travel carrier has valuable information that can be used to automate processes for checking in a passenger and/or baggage for a return leg of travel with the airline of travel carrier and/or develop passenger records for a manifest used by a lodging entity. Instead of removing the original printed bag tag after arrival at a destination point associated with a lodging entity, the code embedded in the license plate on the original printed bag tag can be electronically acquired, digitized, and used to obtain personal information or personally identifiable information (PII) associated with a passenger from the airline of travel carrier and subsequently used by the lodging entity or other vendor.

Moreover, the inventor has determined that the license plate on the original printed bag tag can be used to obtain return flight information for the passenger autonomously without the need for the passenger or employees of a lodging entity to manually enter return flight itinerary information. For example, the inventor has determined this may be accomplished by using the original printed bag tag from an airline carrier without the passenger being present.

B-Type messages are customized by airline carriers based on requirements provided the B-Type messages are compatible with IATA rules, SITA procedures or another B-Type message communicator.

The inventor has determined that an expanded B-Type message may be generated with the return flight information and the lodging entity information as well as other modes of travel. The lodging entity information may include a building name or number, address, and room number. In some embodiments, the lodging entity information may include a stateroom, cabin number, and floor, for example.

The airline B-Type messages are used by a baggage handling system at airports to track baggage routed and screened through various airports. The baggage handling system includes machine readers to read the printed bag tag as it journeys though the airports. This in essence tracks and locates the baggage while in possession of the airports.

However, for travelers that use multiple modes of travel, there are no universal B-Type messages to track and locate or determine where a baggage has been or will go. The inventor has determined that other modes of travel do not have the same ability to track and locate luggage items as passengers travel along a journey using a secure instrument tied to a luggage item and a passenger.

While not wishing to be bound by theory, the machine-readable OP-BTI created for airline travel and facial recognition at a train loading station and/or bus loading station may be used to ensure the passenger has boarded a train or bus with their luggage item in some instances. In other instances, a passenger and luggage item may travel on different trains, for example, or different transport vehicles. For example, a passenger may travel by train, while the luggage travels by truck or van.

The inventor has determined that an airline B-Type message can be expanded and updated in near real-time outside of the airline and airport facilities so that the expanded B-Type message can be converted and used as a universal B-Type message. The expanded B-Type message may be expanded to include at least one mode of travel and lodging reservation linked by a machine-readable OP-BTI. In some embodiments, the expanded B-Type message may be expanded to include and link multi-mode travel reservations and/or lodging reservations of a passenger for a trip.

In some embodiments, the universal B-Type message is stored in a database to serve as a near real-time digital reservation and baggage tracking and handling coordinator for multi-mode travel and lodging. Upon scanning the original printed bag tag, at any time during the travel outside of the airport, up to date travel information and lodging information may be retrieved and displayed on a display device associated with a computing device, a scanning device, or a mobile computing device, for example.

In some embodiments, the inventor has determined that the once garbage printed bag tag with an OP-BTI at the end of a flight can be used as a primary key or unique identifier that is machine readable to access near-real time reservations for multiple modes of travel and/or lodging reservations to provide environmental savings, reduction in human resources, and increased security and logistics planning.

Return Leg Bag Tag Information

Using the originating flight airline bag tag for check in allows for the ability to address the major flaws in the current remote check-in process. Focus on cruise line check-in has revolved around valet tags which allow the cruise line to check the passenger in for a flight, retrieving the boarding pass and valet tags on the ship while at sea, with all the work for the check in process running through overburdened staff on the ship under serious time constraints. The check in process is difficult and unreliable because you have to create hybrid airline check-in functions to allow this process to happen on the ship. Other issues include the airline check in window that was expanded to 48-hours to try to help the struggle on cruise ships to allow for more time to handle the work and other attempts to address the workload on the ship include a patent for a one page document to allow for a faster process for the printing of documents for all passengers checking in from the ship, and delivering valet tags and boarding documents to each room for each passenger using the service. All these obstacles limit the volume and the financial success of the product. The current invention removes the work from the ship staff and any delivery of documents to the rooms for each passenger. Using the technology light or B-Type message check in process with the originating bag tag (previously garbage) allows for a seamless check in process off the ship because the bag has already been marked with important retrievable data, allowing the user to access the airline check-in process. This seamless baggage process will allow the already tagged bag to flow through the process with an identifier that allows for an information flow for airline check in. The original IATA bag tag scanning also allows for other remote operations at hotels, resorts etc. to have limited technology, workstations, printers, and space, as well as allowing for a seamless and cost-effective system throughout the remote check in network, and allowing for a financially sustainable process.

FIG. 1A illustrates a block diagram of a system 100 for checking in baggage items of the passenger for return legs of travel in accordance with one embodiment. In some embodiments, the system 100 may be used to check in the passenger for the return leg.

The system 100 is denoted between lines A-A and B-B. The system 100 may communicate with the travel information system 108 of a first-mode travel carrier 104, the travel information system 110 of an optional intermediate travel carrier 106 and/or the travel information system 128 of a lodging entity 126. In the embodiments described herein, the lodging entity 126 is a cruise ship. The travel information systems 108, 110 and 128 may include web-based servers connected to the Internet, for example. One or more components of the system 100 are located local to a destination point DP 107 where the destination point is also local to a lodging entity. In some embodiments, the lodging entity 126 may be a resort destination or hotel.

The first-mode travel carrier 104 may be one of an airline carrier, bus carrier, and a train carrier. However, for the purposes of discussion, the examples will be described in relation to the first-mode travel carrier being an airline carrier. The optional intermediate travel carrier 106 may be one of an airline carrier, bus carrier, and a train carrier.

The travel journey 140, represented as a dashed line, denotes a path of travel legs L1, L2, and L3 of the passenger and passenger luggage 138 from the point of origin (i.e., home 102) to the point of lodging with or embarkation at the lodging entity 126 via leg L4. Leg L1 is a travel path journeyed from home 102 to a first-mode travel carrier 104. Leg L2 is a travel path journeyed using the first-mode travel carrier 104 to the destination point DP 107 or to optional leg L3 associated with an intermediate travel carrier 106. Optional leg L3 is a travel path journeyed using the intermediate travel carrier 106 to the destination point DP 107. For example, a passenger may end its travel path at the end of leg L2 and board a vehicle of a different travel carrier or flight to begin travel along leg L3 to the destination point DP 107. Still further, it should be recognized that the travel path of leg L3 may include one or more intermediate travel carriers. In some instances, the passenger's journey may have zero (0) intermediate travel carriers, such as in the case of a direct flight or direct travel journey to the destination point DP along the path of the travel journey 140.

Figure 1B:
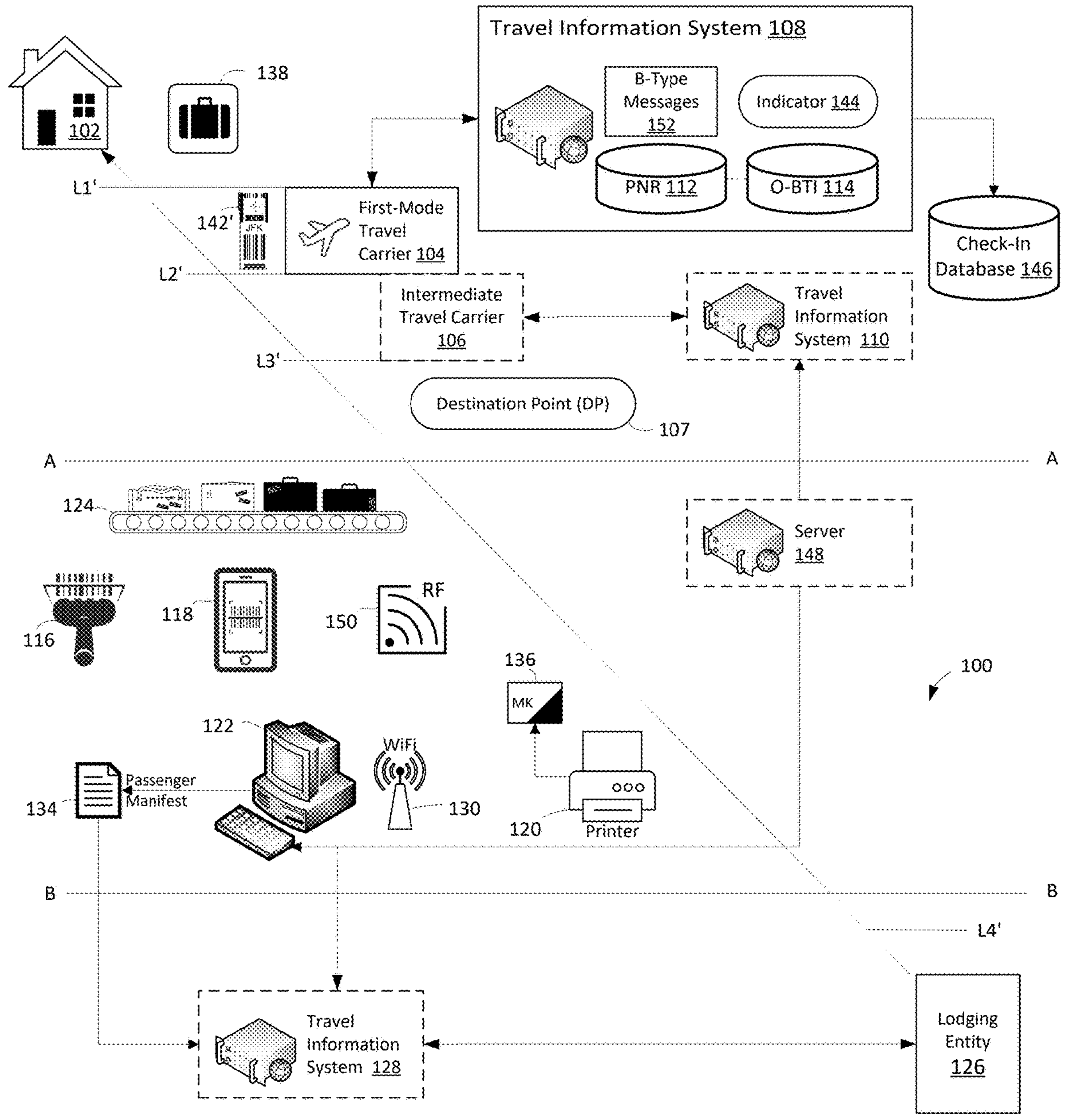
FIG. 1B illustrates a block diagram of a system for checking in baggage of a passenger for return legs of travel after disembarking from a lodging entity in accordance with one embodiment.

FIG. 1B illustrates a block diagram of the system 100 for checking in baggage of a passenger for return legs of travel after disembarking from a lodging entity in accordance with one embodiment. The system of FIG. 1B is the same system 100 of FIG. 1A. However, components of system 100 may be distributed at different off-airport locations for acquiring the OP-BTI.

According to some embodiments, the return path may include travel leg L2' and L1', after leaving the lodging entity on L4'. The return path may include L3', L2' and L1', for example. In some embodiments, the passenger itinerary may include temporary lodging reservation after L2' and before starting the journey L1'. As can be seen, there are many possible modes of travel and lodging stays for a passenger travel experience.

For the return path, the originating printed bag tag 142' may be used for at least one of tracking, locating and information gathering in other modes of travel prior to baggage check-in for a return flight. In some embodiments, the luggage item may be untethered from the passenger for some modes of travel. The passenger may travel bagless using other modes of travel, in some instances.

According to some embodiments, the system 100 may be integrated or connected to system 1300 (FIG. 13) and/or 1800 (FIG. 18) to untether a luggage item from the passenger for other modes of travel to be checked in for a return flight within the regulated check-in window, print a return flight bag tag for placement on the luggage item, and transfer the luggage item into the custody of the airline carrier.

According to some embodiments, the system 100, 1300 and/or 1800 may cause a printer associated with the airline carrier or a kiosk of the airline carrier to print a return flight IATA compatible bag tag for the return flight with an airline travel carrier. In some embodiments, system 100, 1300 and/or 1800 may include a printing device to print an IATA bag tag for a return flight to replace the recycled universal printed bag tag with the return flight IATA bag tag.

In some embodiments, the printed IATA bag tag number on the return flight IATA bag tag is recycled for use at off-airport locations and temporary lodging entities as a recycled unique identifier during those portions of the return path after the luggage items have been off-loaded from an airline carrier and picked up from the airline infrastructure. The return flight IATA bag tag on the return path is a non-discarded machine-readable bag tag for any other modes of travel and lodging entities, including temporary lodging entities after the luggage has completed its return path on an airline travel carrier.

The destination point DP 107 is local to the port of embarkation of the lodging entity 126. The system 100 or one or more components of the system may be controlled and manned by a third-party service provider independent from any travel carriers. The system 100 may be controlled and manned by a travel carrier local to the destination point DP 107. The travel carrier local to the destination point DP 107 may be an airline carrier, a train carrier, a bus carrier, a cruise ship carrier, or combination thereof. The acquiring devices described herein may be distributed at off-airport locations to locate and track luggage items such as at alternate modes of travel.

In some instances, the traveled paths by the first-mode travel carrier and the travel path of the optional intermediate travel carrier 106 may be reversed, such that the travel path journeyed by the passenger on leg L2 may be by an intermediate travel carrier 106 and the travel path journeyed by the passenger on leg L3 to the destination point DP 107 may be using the first-mode travel carrier.

A component of system 100 may include a scanner 116 for scanning a bag tag (BT) 142. An example BT 142 from an airline carrier will be described in more detail in relation to FIG. 2A. The BT 142 is an original paper bag tag (OP-BT) with an original bag tag identifier (O-BTI) 114, such as from a first-mode travel carrier 104 of a first leg of travel. The O-BTI 114 may be stored in a database by first-mode travel carrier 104.

In some embodiments, the components of the system 100 may also include a radio frequency (RF) communication device 150 (also referred to as the RFID-R 150). The RF communication device 150 may be an RFID reader or a near field communication (NFC) identification reader. The RFID reader receives electromagnetic fields to automatically identify and track tags. In some instances, the passenger luggage 138 may use an RFID tag or NFC compatible tags that produce a 10-digit license plate or equivalent identifier. However, currently most luggage still uses the printed or paper bag tag as the primary means of identifying a passenger's piece of luggage 138.

The luggage item may include an RF communication device (not shown). The RF communication devices herein may be one of a Global Positioning System (GPS) tracker, a Global System for Mobile Communications (GSM) tracker, a GSM-5G tracker, a WIFI-enabled communication device, a BLUETOOTH Low Energy (BLE) device, a BLUETOOTH-enabled communication device, a short-range RF communication device and a long-range communication device using compatible wireless communication protocols.

The term passenger luggage 138 may include one or more luggage items. The one or more luggage items may include a first luggage item. In some instances, only the BT 142 of the first luggage item may need to be scanned to digitally recreate a passenger's bag number.

The stored digital O-BTI 114 may be converted to a format compatible with the IATA bag tags code and other standardized formatting of the carrier. For example, an airline bag tag may include an IATA code that includes a three-character alpha numerical geocode designating airports and metropolitan areas. The IATA code is also known as an IATA location identifier. The IATA also publishes industry standard rules for creation of bag tags for the airline industry. The printed BT 142 may include a 10-digit license plate and corresponding bar code shown in FIG. 2A. The O-BTI 114 may include information to create the IATA geocode, the original airline flight information, the 10-digit license plate, and other BT information printed on a BT 142, as will be described in FIG. 2A. The BT 142 may use a license plate used for other travel carriers.

A component of the system 100 may include an imaging device 118 for capturing an image of the passenger luggage 138. The components of the system 100 may include an optional printing device 120 that is configured to print on a substrate a marker (MK) 136. The components of the system 100 may include a computing device 122, as will be described in more detail in relation to FIG. 7. The computing device 122 may be in communication with the scanner 116, the imaging device 118, and the printing device 120 via wireless communication, denoted by reference numeral 130. In some embodiments, the computing device 122 may communicate with the scanner 116, the imaging device 118, and/or the printing device 120 using wired communication protocols. The printing device 120 may be a laser printer, inkjet printer, or other printer device.

It should be understood from this disclosure that the system herein accommodates for many possible outcomes that can be experienced by various passengers. The need for a MK 136 is because some baggage that arrives at a destination may not include the originally printed bag tag or the airline's marker, both of which may include an IATA bar code. In such a situation, the system would need to prepare a marker to temporarily tag the baggage.

The system may obtain passenger information by scanning a barcode or quick-response (QR) code associated with a boarding pass of the original flight. In some instances, the passenger's ticket may include information associated with the 10-digit license plate which may be retrieved from the passenger and placed on the baggage without the need to print a MK 136. For example, the passenger may receive a marker with an adhesive backing from an airline attendant at the time of checking in their baggage at the airport.

This marker may include the 10-digit license plate or other information. This marker can be used to identify the baggage by the passenger in the event of lost baggage, for example.

The system may include creating, by a printing device in communication with the at least one processor, a MK 136 with a marker identifier linking the passenger manifest record to the first luggage item when the originating paper bag tag identifier (OP-BTI) associated with or on the printed bag tag of first luggage item is one of damaged or missing; and populating the passenger manifest record with the marker identifier. The marker identifier may be a barcode, readable by a barcode scanning device, where the marker identifier includes one of OP-BTI or a new passenger tracking identifier.

The computing device 122 may communicate with the scanner 116, imaging device 118 and/or printing device 120 using NFC protocols and BLUETOOTH protocols. The computing device 122 may communicate with the scanner 116, imaging device 118 and/or printing device 120 using wireless fidelity (WI-FI) communications based on Institute of Electrical and Electronic Engineers (IEEE) 802.11 standards. The computing device 122 may communicate with the scanner 116, imaging device 118 and/or printing device 120 using ZIGBEE wireless technology compatible with IEEE 802.15, for example. The computing device 122 may communicate with the scanner 116, imaging device 118 and/or printing device 120 using long range communication protocols, short range communications protocols, cellular radio frequency protocols or other mobile radio frequency protocols.

In other embodiments, the scanner 116 may be a software application stored on the computing device 122 and programmed to interact with a video device or camera device incorporated into, integrated into, or connected via a cable to the computing device 122. In an embodiment, the computing device 122, imaging device 118 and scanner 116 may be a single device, such as a smart phone, tablet or other handheld computing device that is video-enabled, herein after referred to as a "smart communication device." In some embodiments, the system 100 may include a local computing device or a server 148 to communicate with the smart communication device(s) and travel information systems 108, 110 and/or 128. The local computing device (i.e., server 148) communicates using wired or wireless communications with at least one smart communication device and/or to the travel information systems 108, 110 or 128.

In an embodiment, the computing device 122, imaging device 118, scanner 116 and RFID-R 150 may be a single device, such as a smart phone, tablet or other handheld computing device that is video-enabled, also herein after referred to as a "smart communication device."

The imaging device 118, scanner 116, RFID-R 150 may be electronic devices that acquire the barcode or other information associated with the IATA license plate, such as the 10-digit license plate. As should be understood from this disclosure, while the IATA standards use a 10-digit license plate, other license plate formats may be used with more or less digits.

A component of the system 100 may include an optional luggage receiver 124 to transport received luggage, such as on a conveyor belt. While the passenger luggage 138 moves on the conveyor belt, at least one scanner 116 and at least one imaging device 118 may scan or image the information representative of the O-BTI 114. In some embodiments, the imaging device 118 may capture images of one or more passenger luggage 138. Additionally, the RFID-R 150 may also read an RFID tag or NFC tag placed on the luggage receiver 124. In some embodiments, the scanner 116 may scan a QR code-enabled bag tag. The RFID, NFC, and QR code-enabled bag tags may include certain personal information or PU. This personal information of the passenger and the information in the PNR 112 may be used to validate the personal information. The RFID tag or NFC tag should be compatible with IATA RP 1740*c*, for example.

In other embodiments, the luggage receiver 124 may include a designated pad or surface for the placement of a single passenger luggage 138 with a scanner, imaging device 118 and/or RFID-R 150 in proximity to the pad to scan the O-BTI 114 and/or capture images of a passenger luggage 138. The scanner 116 and imaging device 118 may be the same device but operated to look for and scan a barcode with the O-BTI 114 in one process and in a second optional process, find a portion or a side of the body of the passenger luggage 138 to capture identifying luggage features. In some embodiments, the scanned O-BTI data receiver 402 may be bypassed in the event a printed BT 142 is not readable. In this instance, a user may directly enter the 10-digit license plate 210 which is then entered into the license plate parser 404 to identify the travel carrier identification and the passenger's bag numbers. The scanner 116, imaging device 118 and RFID-R 150 may be integrated into the same device, where the RFID-R 150 will read the RFID tag or NFC tag if a printed bag tag is not present to develop personal information for a manifest.

In a process to capture identifying luggage features, such as using computer vision, a determination may be made that the passenger luggage 138 does not include an original paper bag tag. In this instance, received information from the RFID-R 150 may be used. In some instances, the passenger luggage 138 may have both an RFID tag or NFC tag and an original paper bag tag, as the original paper bag tag may include information associated with a travel carrier for a return leg local to home 102.

The computing device 122 and/or server 148 of the system 100 generates a communication session with a travel information system 108 or 110 to access the PNR 112 based on the scanned BT 142 to obtain information representative of the original O-BTI 114 with an embedded code of a passenger's bag number, as will be described later. The travel information system 108 or 110 will generate a communication with passenger file data 132 that includes the return leg information of the passenger and personal information or PII. The received passenger file data 132 is assembled into a manifest file 134 or sent to the travel information system 128 where a manifest file 134 is created. In some instances, the server 148 may create a manifest file. One of the computing device 122 and/or server 148 may communicate a manifest file to travel information system 128 of the lodging entity 126.

The computing device 122 and/or server 148 may merge all the passenger file data 132 into a single manifest file 134 of checked-in passenger baggage. The computing device 122 and/or server 148 will then communicate a manifest file 134 to a travel information system 128 for a lodging entity 126.

DCS may control the management of the check-in process for an airline travel carrier. The travel information system 108 or 110 may include a check-in indicator 144 that indicates that their luggage item(s) is checked-in for travel within a particular window. In some embodiments, the travel carrier may include a baggage check-in database 146 for luggage that has been checked in for travel. In some embodiments, the check-in database 146 may also include data for passengers that are checked in.

Figure 2A:
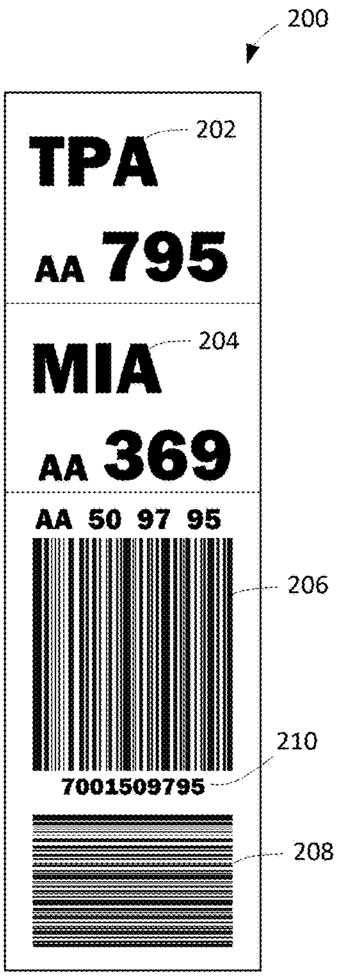
FIG. 2A illustrates a partial view of a conventional airline bag tag of the prior art.

An example scenario will now be described in detail. A passenger ready for a travel journey begins at home 102 where the passenger luggage 138 originates, for example, and travels on leg L1 of travel journey 140. The passenger luggage 138 may travel with the passenger or via a luggage transport service to an airline travel carrier 104, which begins leg L2 of travel. At the airline travel carrier 104, the passenger luggage 138 receives a BT 142, as shown in FIG. 2A. The BT 142 includes printed information representative of the O-BTI 114 compatible with the IATA bag tag format. A BT 142 may be printed on paper or paper composite at the airline counter via an airline agent, a luggage transport service or by the passenger at a kiosk. The BT 142 remains on the passenger luggage 138, as it travels on leg L3 of travel, if used, as described later.

The passenger's travel journey will include a lodging entity 126. In this example, assume the lodging entity 126 is a cruise ship. In some embodiments, prior to the passenger embarking on a cruise (i.e., lodging entity 126), the BT 142 with the O-BTI 114 is scanned by scanner 116 to digitize the printed representation of O-BTI 114.

In various scenarios, the passenger's travel journey may include leg L2 of travel and leg L3 of travel. For example, if there is only an airline travel carrier then leg L3 of travel is omitted. In this instance, the airline travel carrier may provide a direct flight to a city or destination in proximity or local to the lodging entity 126. In other examples, a passenger's travel journey may include an intermediate travel carrier 106 to provide for a leg L3 of travel. For example, a passenger's travel journey may include at least one connecting flight or leg of travel to a city or destination in proximity to the lodging entity 126. The connecting leg of travel may be denoted as leg L3 of travel, which begins at the end of leg L2 and ends at a destination point DP 107.

FIG. 2A illustrates a partial view of a conventional airline bag tag 200 (i.e., BT 142) of the prior art that is printed. The bag tag 200 is half of a bag tag. The bag tag 200 includes two sides, which may be mirror images of each other so that ends of the bag tag 200 may be affixed together. In the example illustrated, the bag tag 200 includes an origination airport flight identifier 202, represented as three digits and a destination airport flight identifier 204, represented as three digits. The bag tag 200 includes at least one barcode flight identifier 206. In this illustration, the bag tag 200 includes a first barcode flight identifier 206 having the bars of the barcode oriented in a first orientation and a second barcode flight identifier 208 having the bars of the barcode oriented in a second orientation, different from the first orientation. The format of the bag tag may have slight changes from country to country and travel carrier to travel carrier.

In some embodiments, the passenger's name may be on bag tag 200.

The bag tag 200 includes a 10-digit license plate 210 that is a compatible with the IATA rules. The 10-digit license plate number includes a first integer in the range of 0-9 followed by a three-digit airline code followed by six digits of the license plate number. The last six digits of the license plate number correspond to a passenger bag number. The font of the digits can be hard to capture. The 10-digit license plate 210 includes is adjacent to first barcode flight identifier 206 and/or second barcode flight identifier 208.

The human-readable license plate will have either a two-character or a three-digit IATA carrier code. For example, it may be either "AA509795" or "001509795." "AA" would be the two-character IATA code for American Airlines, and "001" would be the three-digit IATA carrier code. Nevertheless, the barcode will always be the full ten digits.

The first barcode flight identifier 206 is a label that may hide personal information and flight information. For example, the first barcode flight identifier 206 is coded to include the passenger's name and information about where the luggage should go (i.e., destination), and other information. The name of the airport of arrival, departure time, an IATA airport code of airport of arrival, airline code and flight number and the name of the passenger identified with the baggage (last name, first name). The first barcode flight identifier 206 is a modified version of the license plate 210.

The bag tag number includes a two-letter airline code and six digits. The six digits represent the passenger's bag number. By using the passenger's bag number, a PNR 112 may be found. In some embodiments, the passenger's bag number also may hide personal information of passenger.

The airline carriers generate and store one or more B-Type messages 152. The B-Type messages 152 may include one or more of a baggage transfer message (BTM), baggage source message (BSM), baggage processed message (BPM), baggage unload message (BUM), baggage not seen message (BNS), baggage control message (BCM), baggage manifest message (BMM) and baggage request (BRQ). The bag tag number may be part of the baggage messages. Furthermore, the B-Type messages may include the passenger's name and PNR. This allows other information to be accessed based on the bag tag number.

The license plate 210 embedded in either first barcode flight identifier 206 or second barcode flight identifier 208 is known as an index number (IN) linking to a Baggage Source Message (BSM), sent by a carrier's DCS, to the airport's baggage handling system where each digit in the license plate 210 has a specific meaning. For example, the BSM contains flight details and passenger information from the second leg L2.

The inventor has determined that the index number (IN) embedded in the license plate 210, first barcode flight identifier 206 or second barcode flight identifier 208 may be used to access the PNR 112 of a passenger.

The example in FIG. 2A is a self-tag airline bag tag printed by a passenger via a kiosk at an airport. Bag tags of an airline may include the same license plate format.

Figure 2B:
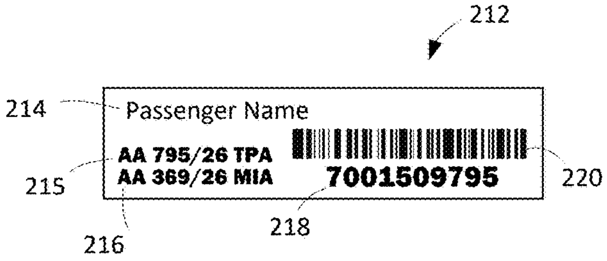
FIG. 2B illustrates a conventional airline bag tag marker of the prior art.
Figure 2C:
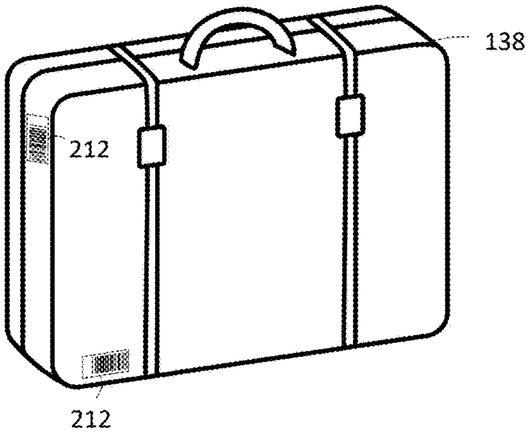
FIG. 2C illustrates an example of affixing bag tag markers to passenger baggage.

FIG. 2B illustrates a conventional airline bag tag marker 212 of the prior art. The airline bag tag marker 212 may include the passenger's name 214, origination airport flight identifier 215, destination airport flight identifier 216, a 10-digit license plate 218 and adjacent barcode flight identifier 220.

In some embodiments, the airline bag tag marker 212 is affixed to an end of the conventional airline bag tag 200 and can be detached for the passenger to keep. The airline bag tag marker 212 is also printed on paper or a paper composite.

The MK 136 printed by printing device 120 may include personal information for the PNR 112 to populate the passenger's name. In some instances, MK 136 may include a temporary bag tag with an embedded code for the lodging entity 126 or for a return leg.

Figure 3A:
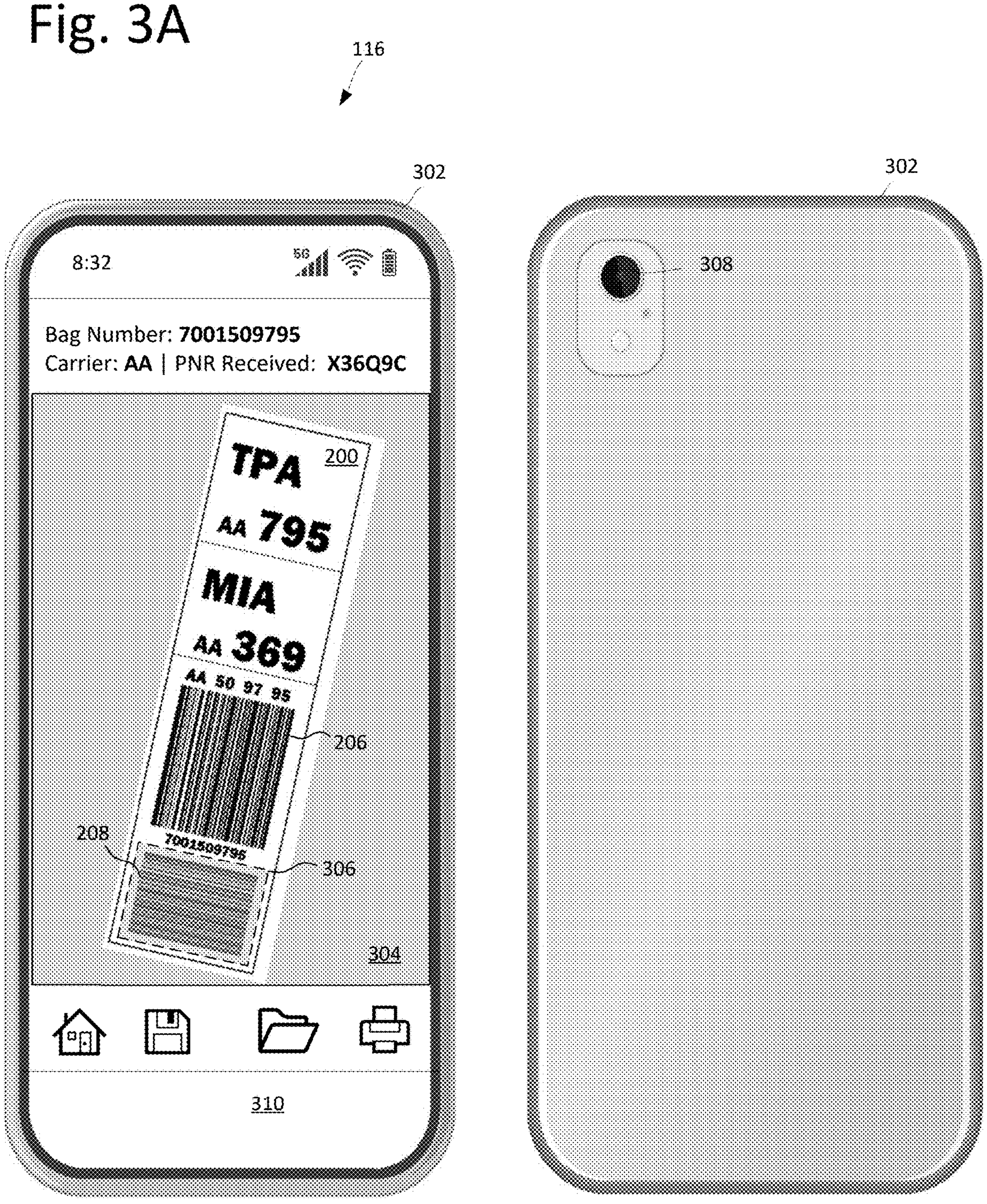
FIG. 3A illustrates a scanner in accordance with one embodiment.

FIG. 3A illustrates a scanner 116 in accordance with one embodiment. The scanner 116 includes a software application (i.e., scanner application 310) loaded on a computing device 302, such as computing device 122. The user of the scanner 116 will direct the camera lens 308, in the direction of the printed bag tag 200. The camera lens 308 is on the rear-side of the device that is opposite the side with the display screen 304. The processor of the computing device causes an image (input) representative of the printed bag tag 200 captured by camera lens 308 to be displayed on the display screen 304.

The scanner application 310 may provide a barcode window 306, denoted in dashed lines, to highlight and identify in the image the printed barcode or for directing the user in the direction of the barcode so that the barcode window 306 is placed to capture all of the bars of the second barcode flight identifier 208, for example. The scanner application 310 may alternately, or in addition, scan the first barcode flight identifier 206. The barcode window 306 may be automatically displayed with the initiating of the scanner application 310. The scanner application 310 may search for a linear or 1D barcode, for example, to convert the barcode of the first barcode flight identifier 206 or the second barcode flight identifier 208 and produce a series of digits representative of the license plate 210, for example. A person can see the license plate 210. However, entering each digit can be time consuming and susceptible to human error.

The first barcode flight identifier 206 or the second barcode flight identifier 208 associated with the license plate 210 can be used as an index number (IN) linking to the Baggage Source Message (BSM), for example, with passenger information, to locate and access the PNR 112 for the passenger and their return flight information.

In some embodiments, the scanner application may also be used to capture a QR code bag tag identifier on a QR code bag tag, affixed to the passenger luggage 138. This information may be used to validate the PNR 112 or to access personal information.

Figure 3B:
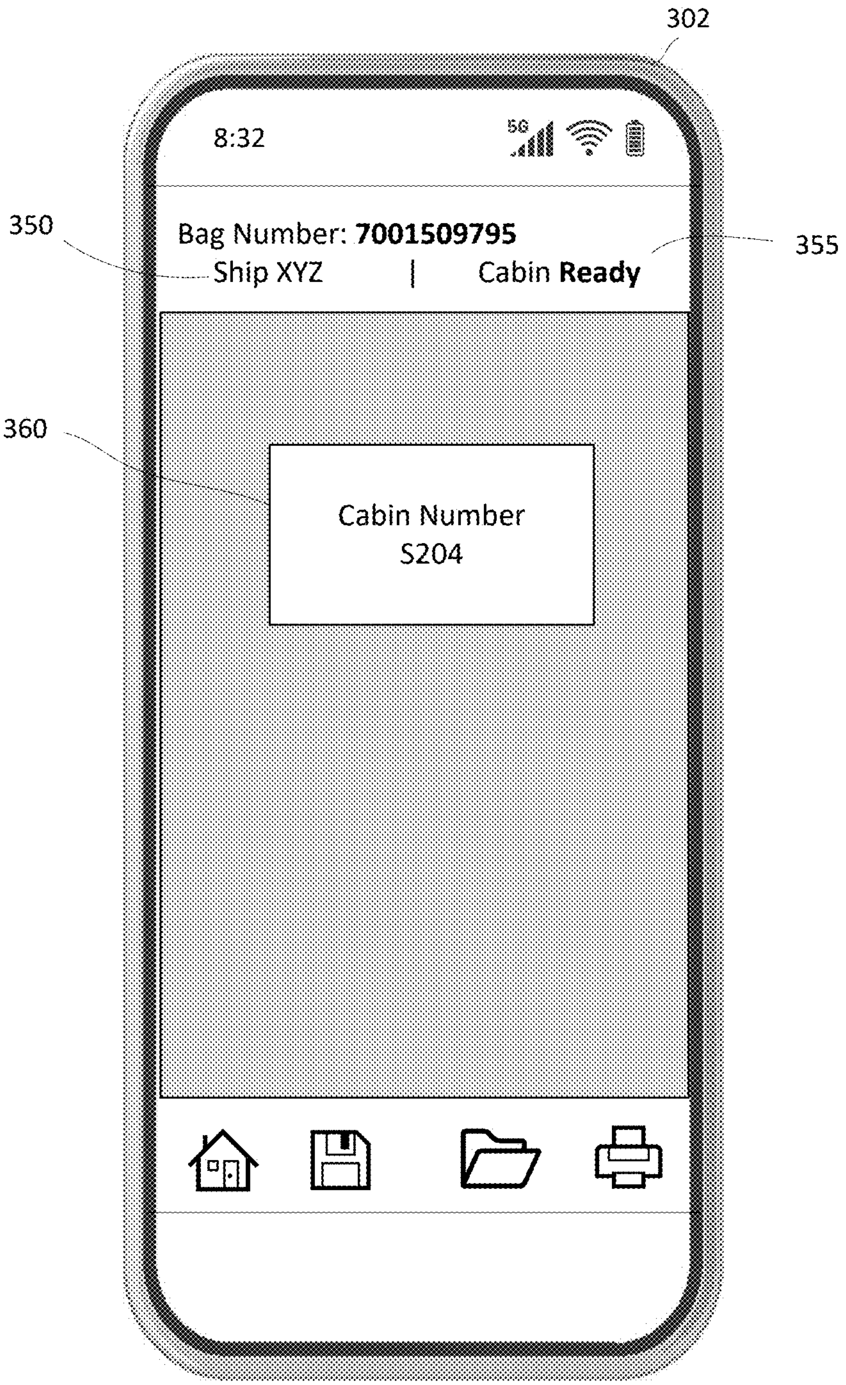
FIG. 3B illustrates a scanner with a displayed message in accordance with one embodiment.

FIG. 3B illustrates a scanner (computing device 302) with a displayed message 360 in accordance with one embodiment. The message 360 may include text representative of a cabin number to deliver the luggage items for which the printed bag tag was scanned in FIG. 3A. The displayed message also includes a message 355 that indicates that the cabin is ready. In some embodiments, the displayed message may include message 350, which represents the lodging entity's name. Still further, the displayed message may include the scanned bag number.

For other lodging entities, such as a hotel resort, the cabin number may be substituted with a room number, or building number, floor number and room number. In some embodiments, the messages 350, 355 and/or 360 may be generated and communicated by the messaging system 1390 via server 1310 of FIG. 13, as will be described later.

Figure 4:
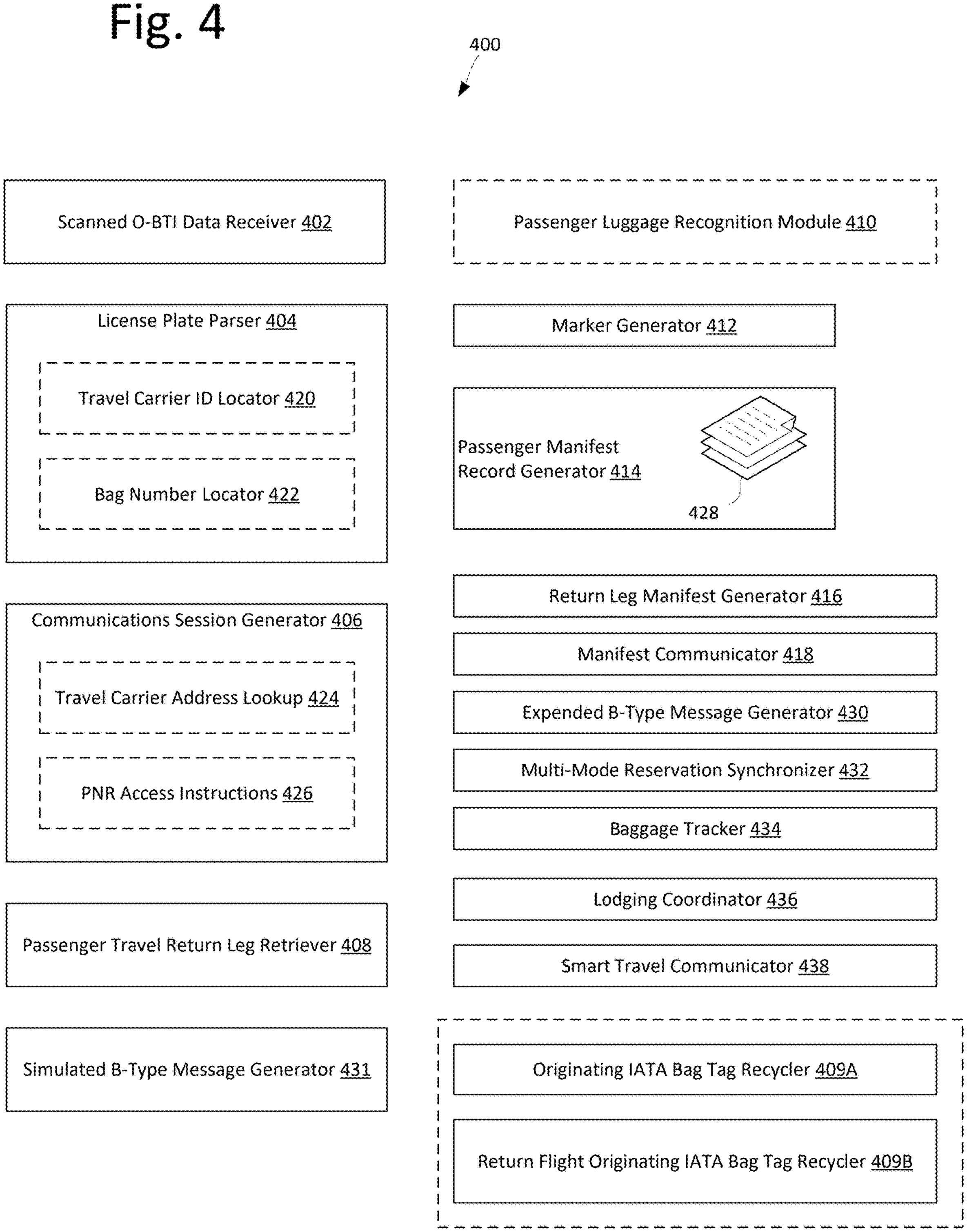
FIG. 4 illustrates a block diagram of programming modules for checking in baggage of a passenger, generating a manifest for embarking on a leg of travel and generating an expanded B-Type message in accordance with one embodiment.

FIG. 4 illustrates a block diagram of programming modules 400 for checking in baggage of a passenger, generating a manifest for embarking on a leg of travel, and generating an expanded B-Type message in accordance with one embodiment. The programming modules 400 may be on the computing device 122, the server 148 or a combination thereof.

The one or more programming modules 400 may include software, hardware, firmware, or a combination of software, hardware, and firmware. The computing device 122 and/or server 148 may include at least one processor and/or hardware to execute instructions of the programming modules 400.

The programming modules 400 may include a scanned O-BTI data receiver 402 and a license plate parser 404. The scanned O-BTI data receiver 402 may receive 10 digits embedded in the captured barcode of first barcode flight identifier 206 or second barcode flight identifier 208 and parse, by the license plate parser 404, the series of digits received from the scanner application 310. The license plate parser 404 may track the digits to locate the travel carrier identification (ID) by the travel carrier ID locator 420. The license plate parser 404 may track the digits, such as the last six digits, to locate the bag number by the bag number locator 422.

The license plate parser 404 may extract the first digit of the converted barcode. In this instance, it is the number 7. This digit may be discarded. Then, the license plate parser

404 may extract the next three digits, by the travel carrier ID locator 420. In this case the next three digits include "001," which correspond to the travel carrier ID. In this case, the travel carrier ID corresponds to American Airlines®. The license plate parser 404 may then extract the next six digits, which include "509795" using the bag number locator 422. These six digits correspond to the bag number for the passenger.

In some embodiments, the scanned O-BTI data receiver 402 may be bypassed in the event a printed BT 142 is not readable. In this instance, a user may directly enter the 10-digit license plate 210 which is then received by the license plate parser 404 to identify the travel carrier identification and the passenger's bag number.

The programming modules 400 may include a communications session generator 406 to communicate with at least one of the first-mode travel carrier 104 and/or the intermediate travel carrier 106. The communications session generator 406 may include a travel carrier Internet Protocol (IP) address look-up database 424 and PNR access instructions 426. The travel carrier ID of the license plate 210 may be used to locate the predetermined instructions to generate an electronic communication packet to a server of the first-mode travel carrier 104 and/or the intermediate travel carrier 106 associated with the travel carrier ID. The communications session generator 406 would also extract stored instructions for accessing the return leg information from the stored PNR access instructions 426 using a digitally created passenger's bag number extracted from the first barcode flight identifier 206 or second barcode flight identifier 208 associated with the license plate 210. The communication instructions may identify the information associated with tools (i.e., programming instructions) compatible with transmission control protocol/internet protocol (TCP/IP), file transfer protocol (FTS), hypertext transfer protocol (HTTP), hypertext transfer protocol secure (HTTPS), secure socket layer (SSL), secure file transfer protocol (SFTP), and user datagram protocol (UDP).

In some embodiments, instructions may identify a link of the scanned license plate 210 to the Baggage Source Message (BSM) with passenger information, to locate and access the PNR 112 for the passenger and their return flight information. The link may be, without limitation, a HTTP compatible link, in some embodiments. Each airline may format their BSM or other B-Type message with additional fields of data. However, the B-Type message is compatible with the IATA B-Type codes.

During the communications session, the computing device 122 may execute programming instructions of a passenger travel return leg retriever 408, where the return leg is a traveled path or portion of a journeyed path to return to home 102. For example, if the passenger is returning home using the same travel carrier as the original printed bag tag, the PNR 112 would include the return flight information. Otherwise, the return flight information may be marked as null by system 100.

The programming modules 400 may include a passenger luggage recognition module 410. The image data of the imaging device 118 may be processed by machine learning software to generate an image of passenger luggage 138. This image may be stored in a database for a passenger luggage recognition process. In some instances, a passenger's luggage may need to be found or identified. The computing device 122 or server 148 may store an image of the passenger luggage 138 that can be later retrieved. Machine learning algorithms may then be used to recognize luggage and match a passenger with their luggage.

The computing device 122 or server 148 may use machine learning algorithms to identify whether a particular luggage item has been processed by one or more components of the system 100.

The programming modules 400 may include a marker generator 412. The marker generator 412 may generate a barcode for use in the format of the MK 136 that can be printed by printing device 120 and affixed on the passenger luggage 138. As discussed previously, the MK 136 may be used when the original bag tag or airline marker are not available or unscannable, such as due to damage.

The programming modules 400 may include a passenger manifest record generator 414, a return leg manifest generator 416, and manifest communicator 418. The passenger manifest created from the non-discarded originally printed bag tag may be used to reconcile passengers arriving at a lodging entity and determine room or cabin numbers. The non-discarded printed bag tag populated in the manifest is used to bring a passenger's baggage to their room and/or lodging entity, for example, without the need for generating a temporary valet tag. The non-discarded printed bag tag may be used also for departures of the passengers from the lodging entity to return home for example, without the need to print yet another temporary valet tag.

The passenger manifest record generator 414 may store in one or more files passenger information 428 and related PNR 112 for those passengers with passenger luggage 138 scanned by system 100. The passenger information may include the first name, middle name or initial, last name and contact information of the passenger. For example, the contact information may also include the passenger's address. The passenger information may include private information (PII).

The components of system 100 may store a list of passengers for one or more lodging entities 126 local to the destination point DP 107 so that passenger luggage 138 for passengers not intended to travel via the lodging entity 126 will not be commingled with passenger luggage 138 for lodging entity 126. In some embodiments, the files of passenger information 428 may include passenger information associated with a pre-paid service with a third-party service provider, the first-mode travel carrier 104 or the lodging entity 126. In some embodiments, the files of passenger information 428 may include assigned cabin numbers for the passenger. Thus, the marker generator 412 may communicate with the passenger manifest record generator 414 to obtain information, such as a cabin number and a passenger name, to format and populate a field of the marker printed by the marker generator 412.

The return leg manifest generator 416 may extract information of the PNR 112 that includes return leg travel information, including without limitation, the travel carrier of the return leg mode of travel, the departure time of the return leg mode of travel, a flight number, and/or an estimated number of luggage bags that need to be checked in for the return leg home. The return leg manifest generator 416 may populate return leg travel information into corresponding data fields of the manifest file.

The manifest file includes a conduit for checking in of the baggage of a plurality of passengers with the designated return travel carrier. The conduit may include a graphical user interface to remotely check-in each luggage item of a passenger leaving the lodging entity within a designated window prior to a return flight. In some embodiments, the passenger manifest record includes the digital BTI data, the PNR and data identifying for check-in of a return leg of travel of the passenger with a designated return travel carrier.

In some embodiments, server 148 and server 1310 may include conduits to check-in luggage of the passenger with at least an airline carrier for a return flight.

The manifest communicator 418 is configured to establish a communication session with travel information system 128 associated with the lodging entity 126. The manifest communicator 418 may have different instructions for each travel information system 128 of a plurality of cruise ship carriers. The communication instructions may identify the information associated with tools (i.e., programming instructions) compatible with transmission control protocol/internet protocol (TCP/IP), file transfer protocol (FTS), hypertext transfer protocol (HTTP), hypertext transfer protocol secure (HTTPS), secure socket layer (SSL), secure file transfer protocol (SFTP), and user datagram protocol (UDP).

Figure 14A:
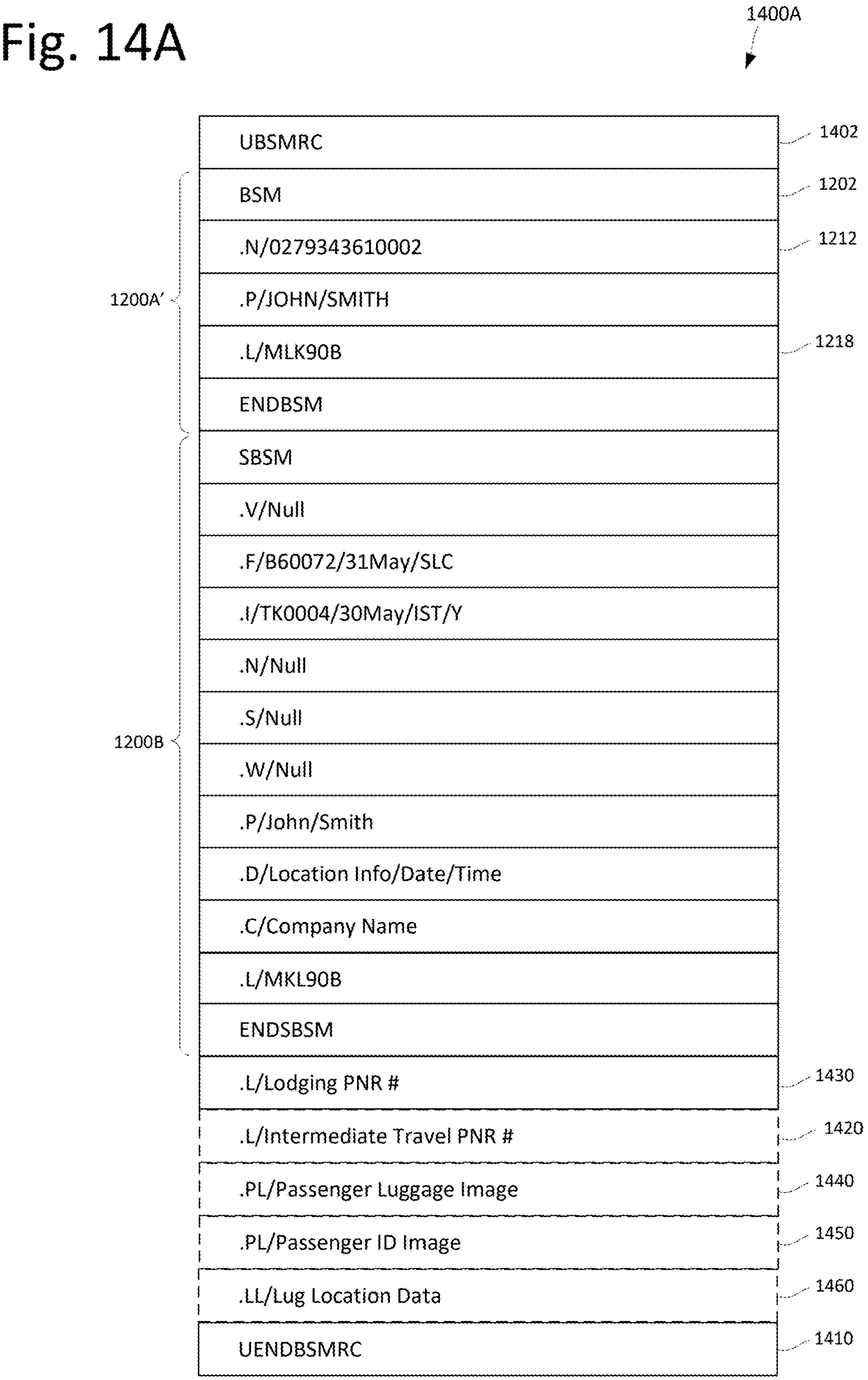
FIG. 14A illustrates an expanded (universal) B-Type message for multi-mode travel and lodging and recycling the originating bag tag in accordance with one embodiment.

The programming modules 400 may include an expanded B-Type message generator 430. An example expanded B-Type message is shown in FIG. 14A, as will be described in detail later. The programming modules 400 may include an originating IATA bag tag recycler 409A and return flight originating IATA bag tag recycler 409B. The return flight originating IATA bag tag recycler 409B initiates expansion of the B-Type message created for the return flight. The originating IATA bag tag recycler 409A initiates expansion of the B-Type message for the originating flight. Once the return flight check-in baggage process starts, for example, the recycling by the originating IATA bag tag recycler 409A needs to be terminated.

Figure 12A:
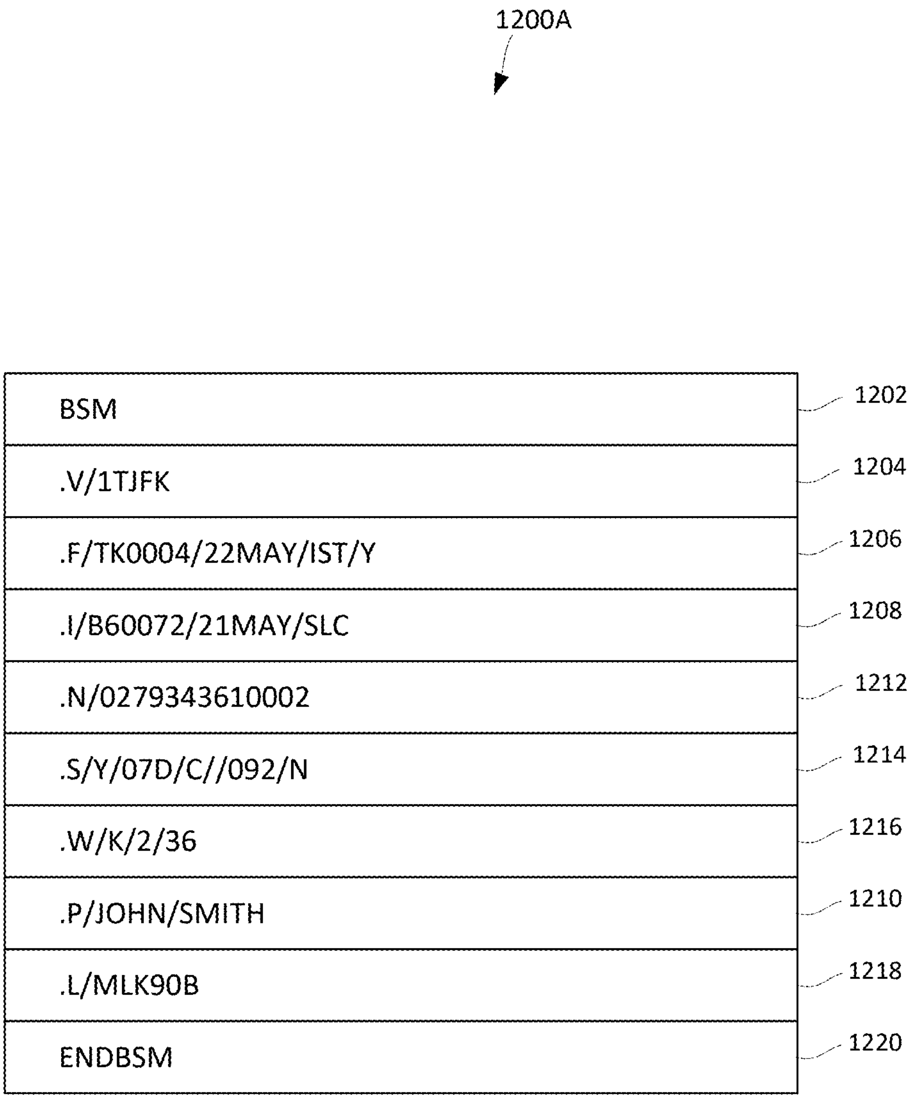
FIG. 12A illustrates a conventional baggage source message (BSM) for an airline carrier.
Figure 12B:
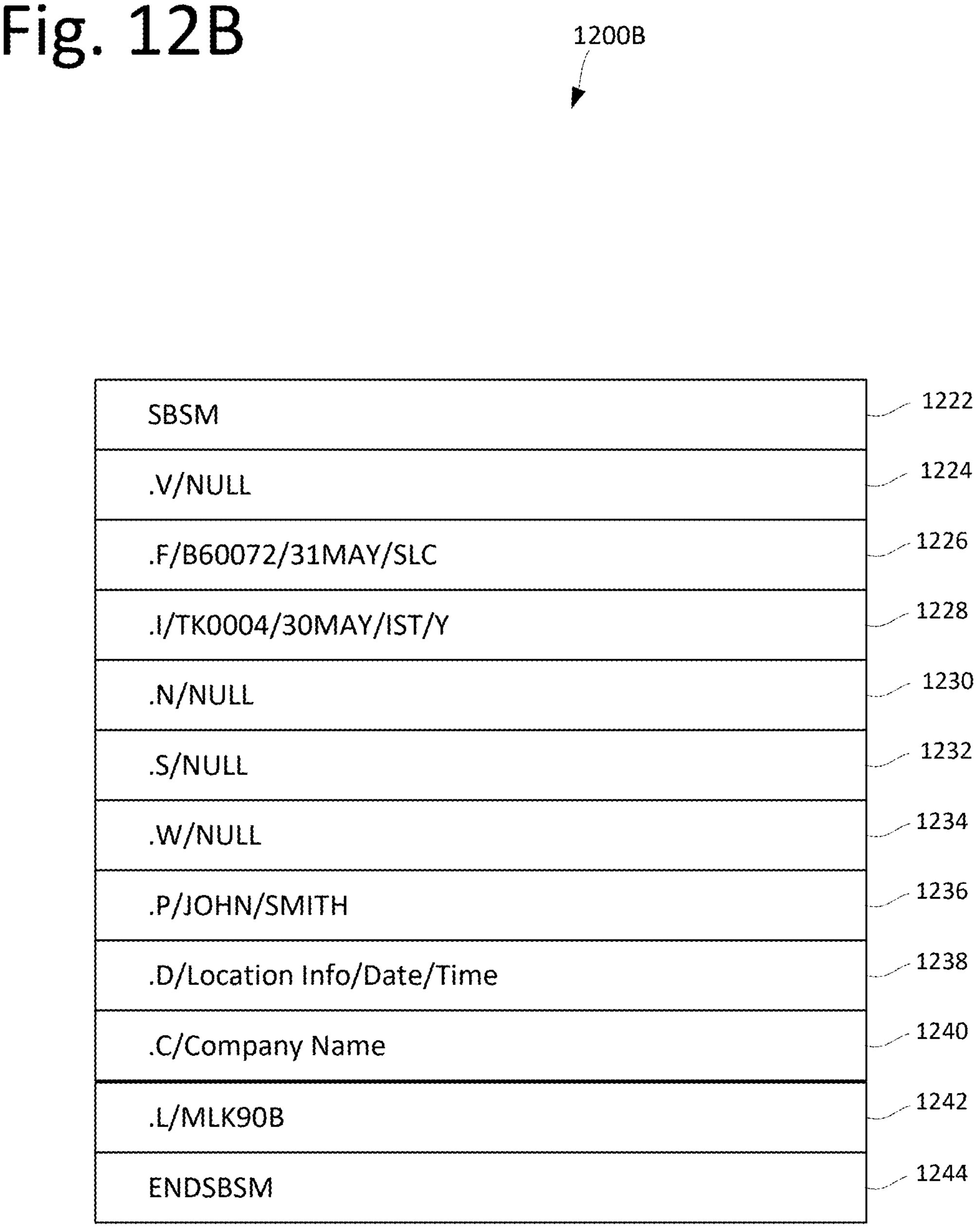
FIG. 12B illustrates a simulated BSM in accordance with one embodiment.

The programming modules 400 may include a simulated B-Type message generator 431 to generate a simulated B-Type message for a return flight, as shown and described in relation to FIG. 12B, or for an originating flight. According to some embodiments, the expanded B-Type message may include at least three data fields from the airline B-Type message. The first field includes the field having the IATA bag tag number. The second field may include the passenger's name. The third field may include the PNR. These fields allow the return flight information to be obtained at any time using the originating IATA bag tag number including any updates. In some embodiments, if the IATA bag tag number is not available when the simulated B-Type message is generated, a temporary unique identifier is used in the field or line with the preface ".N/" used for the sequence of digits representative of the bag tag number. In the example of the originating flight, the field or line with the preface ".N/" may include a temporary unique identifier until an IATA bag tag number can be obtained from the DCS of the airline or the simulated DCS that creates an IATA bag tag number remote from the airline infrastructure. In some embodiments, the simulated DCS may have its own IATA two character or digit code.

The programming modules 400 may include a multi-mode reservation synchronizer 432. Each passenger's journey to a lodging entity such as a resort or cruise ship may include air travel and other modes of travel selected from bus travel carriers, train travel carriers and ferry travel carriers. Ferries may include lodging accommodations to travel from one port to another port. These ports may be in different countries. This type of travel is different from a cruise where the passenger leaves from and returns to the same port.

The passenger's journey may include multi-mode reservations with multiple lodging entity stays across multiple states or multiple countries. The original bag tag number from a printed airline license plate and/or associated RF unique code representative of the original bag tag number linked to the luggage item may be used as a primary key for logging and tracking all travel reservations and updates thereto accessible through a recycled non-discarded machine-readable bag tag.

A passenger itinerary 1314 (FIG. 13) may change before embarking on the first leg of travel, after embarking on the first leg of travel and arriving at the destination point, or before embarking on any leg of travel on a return path to journey home. The systems 100, 1300 and/or 1800 may synchronize travel modes by updating the reservation's information data with updates and communicating the updates to the passenger.

In some embodiments, prior to the start of a leg of travel, the server 148 or 1310 may contact any of the reservation systems associated with the passenger itinerary 1314 to obtain any changes to flight information, bus information, train information or lodging information. The expanded B-Type message may be updated.

The programming modules 400 may include a baggage tracker 434. The original IATA bag tag is used as a recycled machine-readable tag that stays on the luggage item without the need for any other tag on the luggage item, unless the original IATA bag tag is damaged or missing, until the passenger disembarks from a lodging entity and departs for a return path home, for example. When the recycled unique identifier of the non-discarded machine-readable bag tag is acquired, such as by scanning or via a RF communication device, a location code or geotag may be appended to the generated communication stream of the image data and logged with the data. This allows the locations the luggage item has moved through to be tracked by the acquiring devices.

Although airlines allow luggage items to be checked in for an air flight at off-airport locations (i.e., cruise ship and train station) using a remote check-in procedure, the inventor has determined that an originating printed bag tag, such as after a flight, can be used as a marker and conduit to allow luggage to be checked in for a return flight check-in. The remote check-in process at off-airport locations requires robust workstations and printers. These printers that are capable of printing IATA bag tags at off-airport locations are very costly and can be overloaded at times. The inventor has determined that recycling the originating IATA printed bag tag and related unique identifier to access return flight information, such as within a regulated check-in window, and printing the return flight bag tag at a designated printing location remote from a cruise ship, expedites the baggage check-in process and eliminates the need for a valet tag.

By way of non-limiting example, the passenger's luggage leaving a cruise ship needs to be processed in 24 or 48 hours. This can require printing boarding passes, valet tags and bag tags, or any combination thereof. However, the cruise ship can have thousands of passengers each with multiple luggage items. One attempt to solve this logistical challenge was a "Detachable, Single Page Printable Boarding Pass And Tag Identifier Document" shown in U.S. Design patent No. D862590, issued Oct. 8, 2019. This document allowed the boarding pass and bag tags to be printed on a single document. The document had perforations to remove, and an adhesive to affix, the bag tags to the luggage item. However, such an advancement to save human resources, paper resources, and other processing infrastructure was still insufficient to process thousands of passengers disembarking a cruise ship or other high-volume resorts, much less address delays due to equipment malfunctions or other computer technology glitches caused by wireless communication interruptions, inclement weather conditions, and more. Moreover, printing bag tags on cruise ships still required real estate on a ship, for example, which can otherwise be used for other revenue.

In some embodiments, a passenger may travel on a different path from their luggage item(s) during part of their journey. Current processes do not provide seamless baggage identification through your travel experience. This can lead to cumbersome and costly travel experiences for all concerned parties in the travel and destination network. For example, this can cause lost or delayed arrival of luggage or a reduction in seamless travel experience for the baggage due to changes in an itinerary. Delayed arrival to a departing cruise ship or loss of luggage on a trip can be devastating to the passenger.

The inventor has determined the originating printed bag tag affixed to the luggage item should remain on the luggage item and be recycled until the luggage item is checked in for the return flight. This preserves the originating IATA bag tag number on an already printed machine-readable instrument that is tied to a verified passenger's identity.

Before the passenger lands from their originating flight, system 100 or 1300 may initiate a recycling process to recycle the originating IATA bag tag number to a universal bag tag unique identifier for use outside of the airport infrastructure. The transition to the universal bag tag unique identifier is seamless and may be used at off-airport locations from the moment baggage of the passenger is off-loaded from an airplane of the first-mode travel carrier or the intermediate travel carrier and leaves the custody of the airport infrastructure without the need for the passenger to be present.

The (recycled) originating IATA bag tag number can be acquired at an off-airport location by an acquiring device to create a digital data record for use as a primary key or unique identifier and to log the location and time stamp of any mode of travel of the baggage or location along a journey. This may trigger an update in information to locate the luggage item without the need for the passenger to be present. The acquiring device (i.e., scanning device, mobile communication device, video-enabled computing device, RF communication device) may provide a geolocation code with a communication with the image data acquired by the acquiring device or a RF communication from a RF communication device.

The programming modules 400 may include a lodging coordinator 436 programmed to determine whether any changes are made to a lodging reservation such as a room or cabin number and to notify the passenger or bag handler of any reservation changes prior to dropping off the luggage. In some embodiments, the room or cabin number may not be cleaned/ready. Once the room or cabin number is ready, the expanded B-Type message is updated with the current status. The lodging coordinator 436 may communicate with or receive communications from the smart baggage travel system 1300 of FIG. 13, described later. By way of non-limiting example, the expanded B-Type message may be expanded by links to the reservation data of a passenger's itinerary.

The programming modules 400 may include a smart baggage travel communicator 438. When information associated with the expanded B-Type message changes, the smart baggage travel communicator 438 may be configured to communicate any updated information to a computing device of one of a baggage handler and passenger. The computing device may be a mobile communication device or an acquiring device. The details of the communications will become more evident in the description below. The communication instructions may identify the information associated with tools (i.e., programming instructions) compatible with transmission control protocol/internet protocol (TCP/IP), file transfer protocol (FTS), hypertext transfer protocol (HTTP), hypertext transfer protocol secure (HTTPS), secure socket layer (SSL), secure file transfer protocol (SFTP), and user datagram protocol (UDP). The smart baggage travel communicator 438 may communicate with the smart baggage travel system 1300 of FIG. 13, described later.

Figure 5:
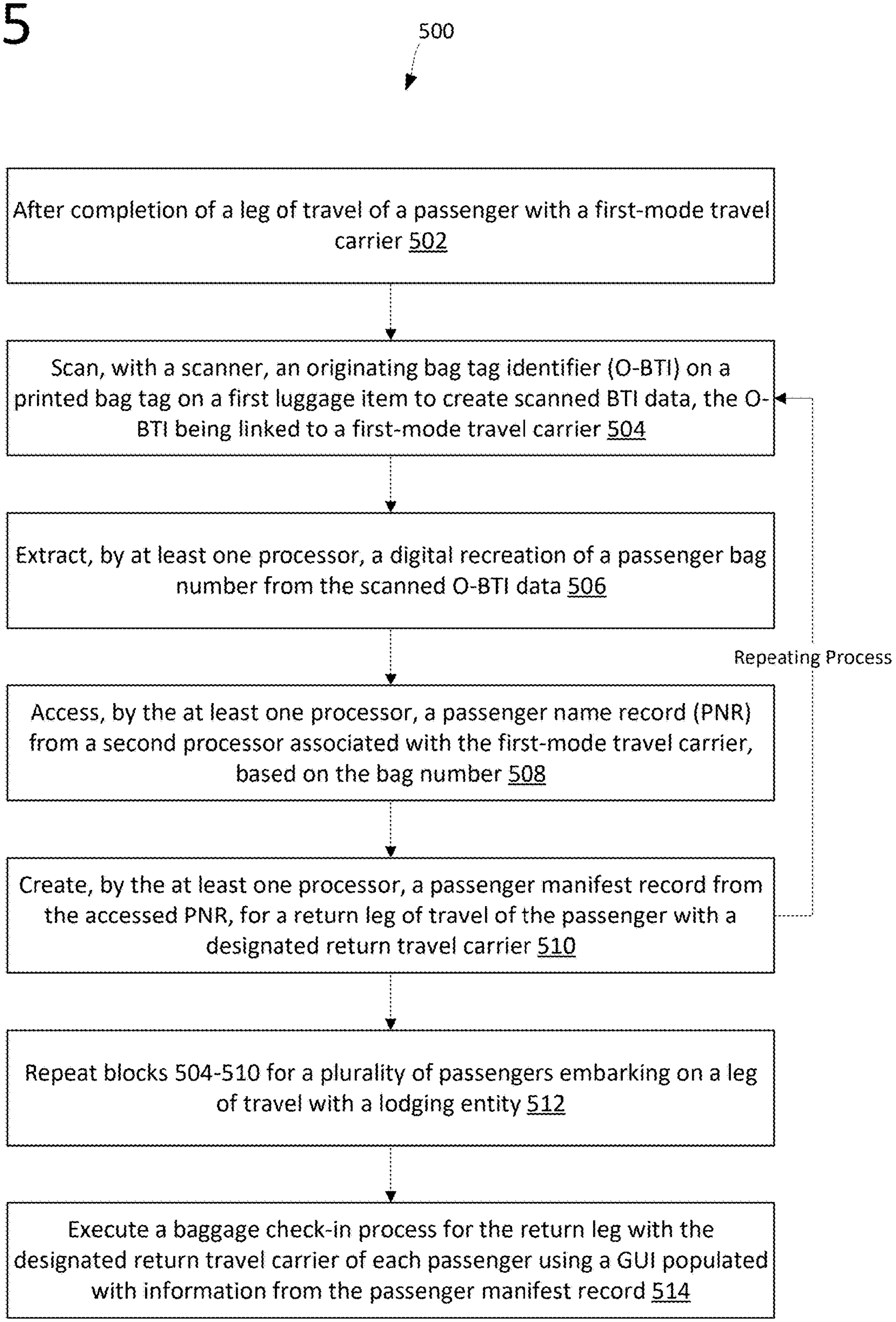
FIG. 5 illustrates a method for checking in baggage of a passenger in accordance with one embodiment.

FIG. 5 illustrates a method 500 for checking in baggage of a passenger in accordance with one embodiment. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence. In some embodiments, one or more blocks disclosed herein may be omitted or blocks may be added.

The method 500 creates a digital license plate number from a printed BT for use in obtaining return flight information, for example. In block 502, method 500 begins after completion of a leg of travel of a passenger that has arrived at the destination point. In block 504, the method 500 includes acquiring an originating bag tag identifier, such as the 10-digit license plate, for example. The process of acquiring the originating bag tag identifier may include scanning, with a scanner, an originating bag tag identifier (O-BTI) on a printed bag tag of a first luggage item to create scanned or digital BTI data, the printed O-BTI being linked to a first-mode travel carrier. By way of a non-limiting example, the scanner may be a barcode scanner.

In some instances, the acquiring of the originating bag tag identifier may include receiving an RFID signal including information representative of the originating bag tag identifier. In other embodiments, acquiring the 10-digit license plate may include scanning an airline marker with adhesive backing, which may be on the baggage.

In summary, assume that the first-mode travel carrier is an airline carrier. Then the electronic acquiring, by at least one electronic acquiring device, may include at least one of: i) scanning, by a barcode scanner, the OP-BTI on a printed paper bag tag from the airline carrier that is attached to the first luggage item of the passenger; ii) scanning, by the barcode scanner, the OP-BTI on a printed marker from the airline that is attached to the first luggage item; iii) reading or acquiring, by a RFID reader, RFID information associated with the OP-BTI; and iv) receiving, by a radio-frequency communication, radio communications that include the OP-BTI.

In block 506, the method 500 may include extracting, by at least one processor, a passenger bag number from the scanned O-BTI data. The block 506 may include extracting a travel carrier code from the scanned or digital BTI data.

In block 508, the method 500 may include accessing, by the at least one processor, a passenger name record (PNR) from a second processor associated with the first-mode travel carrier, based on the digitally created passenger bag number or the digitally created 10-digit license plate. In block 510, method 500 may include autonomously creating, by the at least one processor, a passenger manifest record from the accessed PNR 112, for a return leg of travel of the passenger with a designated return travel carrier. The passenger manifest record may include the digital BTI data and the PNR, with data identifying for check-in of a return leg of travel of the baggage of the passenger with a designated return travel carrier. The passenger manifest record may be populated with travel carrier codes embedded in scanned O-BTI or the accessed PNR 112. The passenger manifest record may be associated with digital BTI data with the passenger for tracking and handling of the luggage items of the passenger before and after the passenger's stay with a lodging entity. For example, a lodging entity may be located on a Disney™ property or other resort destination with lodging accommodations.

In block 512, the method 500 includes repeating blocks 504-510 for a plurality of passengers embarking on a leg of travel with a lodging entity. In block 514, the method 500 may include executing a baggage check-in process for the return leg with the designated return travel carrier of each passenger. The repeating blocks 504-510 may be for a plurality of passengers beginning a stay associated with a lodging entity to autonomously form a manifest file that may have a conduit for checking in the baggage for the plurality of passengers with the designated return travel carrier. In some embodiments, the checked in baggage on the inbound leg to the lodging entity may be stored in a separate manifest for any entity to check-in the baggage and print the bag tag for the return flight.

In some embodiments, the method 500 may include populating, by the at least one processor, at least one manifest file with each created passenger manifest record for the lodging entity.

The block 508 of the method 500 may include identifying a travel carrier from the scanned O-BTI data and identifying stored communication session procedures to communicate with the travel carrier based on the scanned or digital O-BTI data. The stored communication session procedures may identify a communication protocol for accessing, by the at least one processor, a passenger name record (PNR) from a remote second processor (i.e., travel information system 108 or 110) associated with the travel carrier over a communication network.

The communication format may include tools compatible with transmission control protocol/internet protocol (TCP/IP), file transfer protocol (FTS), hypertext transfer protocol (HTTP), hypertext transfer protocol secure (HTTPS), secure socket layer (SSL), secure file transfer protocol (SFTP), and user datagram protocol (UDP).

The process for executing the baggage check-in process of block 514, for the return leg with the designated return travel carrier, may also use stored communication instructions to control a remote second processor to check-in baggage of a passenger for the passenger's return leg of travel back home, for example, within a predetermined check-in window. In some embodiments, the passenger can check themselves in with an airline carrier or other entity for the return leg flight using a computing device or mobile communication device, such as, a smartphone, tablet, notebook, and laptop. The passenger check-in may be completely independent from the baggage check-in process. In some embodiments, the passenger may be checked in by a computing system of lodging entity that communicates with the return flight airline carrier, for example.

Figure 6:
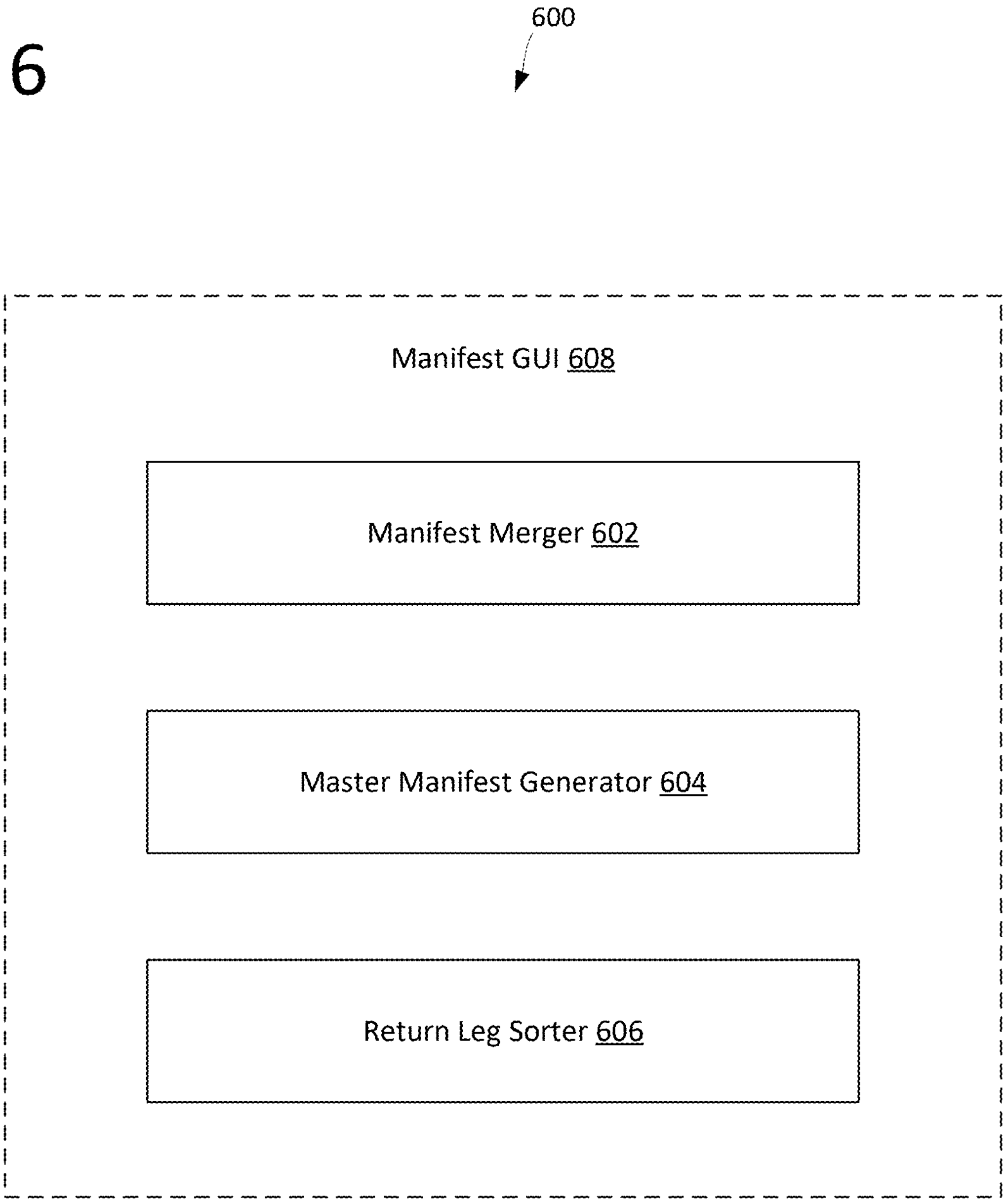
FIG. 6 illustrates a block diagram of programming modules for generating a master manifest in accordance with one embodiment.

FIG. 6 illustrates a block diagram of programming modules 600 for generating a master manifest in accordance with one embodiment. The programming modules 600 may communicate with a plurality of computing devices having programming modules 400 being executed thereon. The programming modules 600 may be stored by a computing device associated with the travel information system 128 or other travel management system. In some embodiments, one or more of the programming modules 600 may be stored on server 148 and computing device associated with the travel information system 128.

In some embodiments, the server 148 and travel information system 128 may be integrated into the same computing system. In other embodiments, the server 148 may be integrated into travel information system 108 or 110.

The programming modules 600 may include manifest merger 602, master manifest generator 604, and return leg sorter 606. The one or more programming modules 600 may include software, hardware, firmware, or a combination of software, hardware, and firmware. The computing device associated with the travel information system 128 may include at least one processor and/or hardware to execute instructions of the one or more programming modules 600.

The programming modules 600 include a manifest graphical user interface (GUI) 608 that may include a manifest merger 602 to merge passenger manifest files from a plurality of computing devices 122, servers 148 or systems 100 for a current voyage. For example, the computing device associated with the travel information system 128 may be in communications with a plurality of systems 100 and each system 100 may have a plurality of computing devices 122. The passenger manifest files include a plurality of passenger manifest records created by the passenger manifest record generator 414 and return leg manifest generator 416 populated with information accessed from the PNR 112.

It should be understood from the disclosure herein that there may be a plurality of local destination points, each serviced by a different system 100. For example, the destination point DP 107 may be at a local train station that is local to the port of the lodging entity 126. The destination point DP 107 may be at a local bus station that is local to the port of the lodging entity 126. The destination point DP 107 may be at each local airport that is local to the port of the lodging entity 126. The term "local" means a travel distance of less than 5-20 miles, 20-50 miles, or 51-100 miles to the lodging entity 126, for example. For example, a lodging entity may be docked at a port in a state with multiple airports, multiple train stations, multiple bus stations, etc. any of which may be used by a passenger to arrive as close as possible to the port based on their own point of origination and travel costs.

The manifest GUI 608 may interface with a master manifest generator 604 and return leg sorter 606. The master manifest generator 604 may merge those files received from the one or more systems 100 and a manifest of booked passengers stored by the travel information system 128 into a master manifest file populated with information derived from a digitized O-BTI. The master manifest file is populated with accessed information of the PNR 112 related to the return leg of travel for those passengers with their BT 142 scanned and processed by system 100.

For example, at a cruise ship port, some passengers arrive the same day as embarkation of the cruise ship. In other examples, passengers may arrive one or more days prior to embarkation. Still further, the passenger's PNR 112 embarking on the same cruise voyage may be merged into a master manifest file. By way of non-limiting example, a third-party service provider may manage the luggage for a plurality of cruise ships at a port.

Each cruise ship will have its own master manifest file. The populated manifest passenger record based on information in the PNR 112 may be displayed on a display device using the manifest GUI 608. The manifest GUI 608 is a computer program that enables a user to see the passenger information records and their return leg flight information, for example. The passenger record may also include a passenger's cabin number on the current voyage. The return leg flight information may include without limitation, one or more of the travel carrier information, travel carrier geolocation, the flight number, flight departure time, and flight arrival time.

The master manifest generator 604 may display the generated master manifest file using the manifest GUI 608. The manifest GUI 608 may also include a return leg sorter 606 that enables personnel to sort the manifest by data associated with a return flight or return leg mode of travel that meets a check-in window for a return leg of travel.

While not wishing to be bound by theory, accessing data of PNR 112 based on a digital recreation of a 10-digit license plate to automate a process to populate a manifest and/or check-in of baggage of a passenger for a return leg of travel using the accessed data saves valuable human resources of the cruise ship and resources of a return travel carrier.

The processor(s) may sort a master manifest file with information associated with the passenger manifest record, using manifest GUI 608, by the return leg flight times or other indicated times. The processor(s) may perform a baggage check-in process for the return leg with the designated return travel carrier of each passenger based on the sorted master manifest file. In some embodiments, the master manifest file is for a resort destination that can include at least one hotel.

The data for baggage check-in of the return leg of travel may include at least return leg flight times, airline carrier and PNR. The methods herein may include sorting, by the at least one processor, the master manifest file with information associated with the return leg flight times for the plurality of passengers; and executing, by the at least one processor, a remote check-in process for baggage for the return leg of travel with the designated return travel carrier for each passenger based on the sorted master manifest file.

Figure 7:
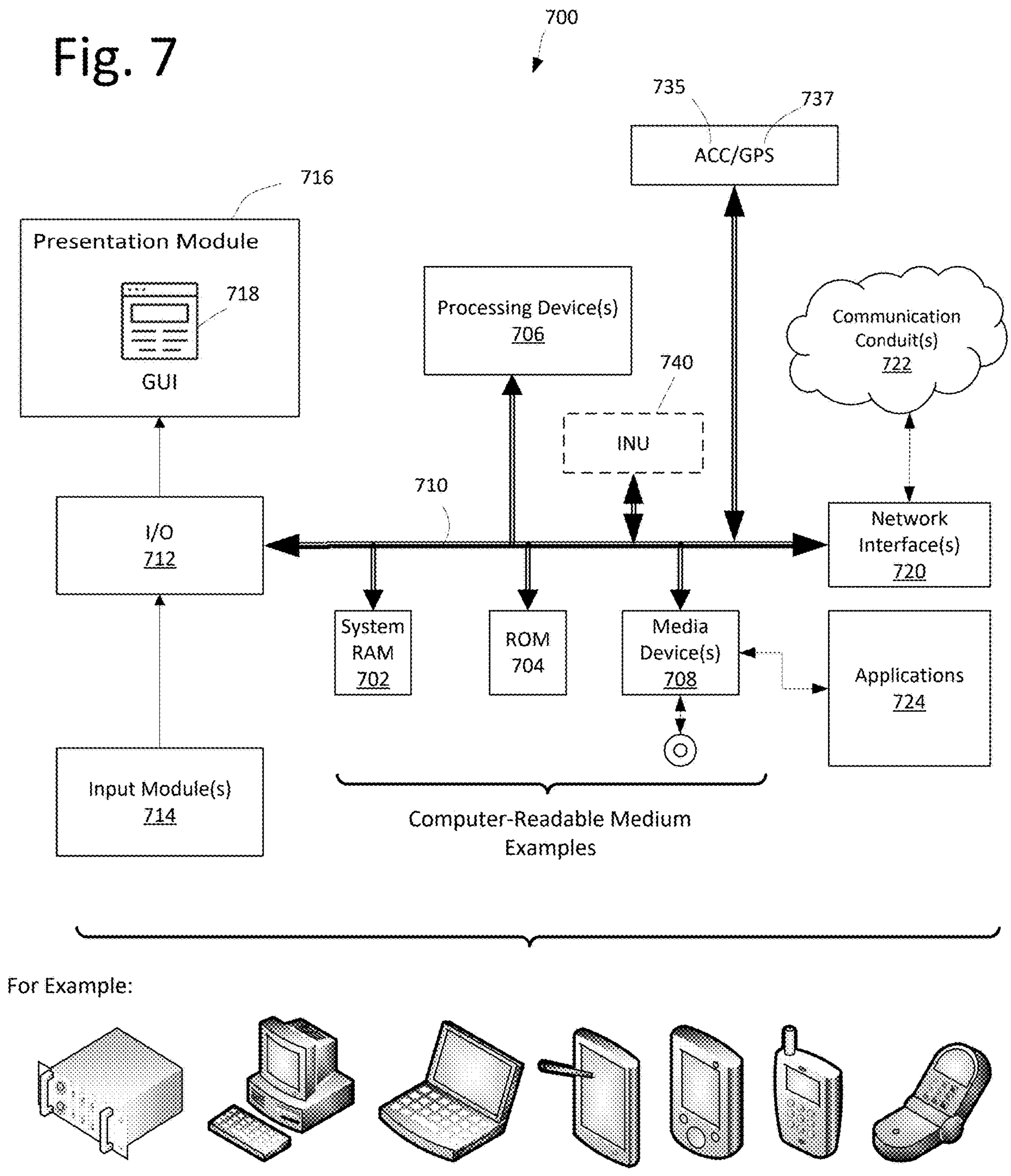
FIG. 7 illustrates a computing system in accordance with one embodiment.

Referring now to FIG. 7, in a basic configuration, a computing device 700 (i.e., computing device 122 or local computing device) may include any type of stationary computing device, server 148, 1310 or 1826, personal computer (PC) or a mobile computing device 302 and 1810.

The computing device 700 may include one or more processing devices 706 and system memory in a hard drive. Depending on the exact configuration and type of computing device 700, system memory may be volatile (such as RAM 702), non-volatile (such as read only memory (ROM 704), flash memory, and the like) or some combination of the two. A system memory may store an operating system and one or more applications 724, and may include program data for performing at least one of the programming modules 400, described above in relation to FIG. 4, and programming modules 600, described above in relation to FIG. 6.

Figure 8:
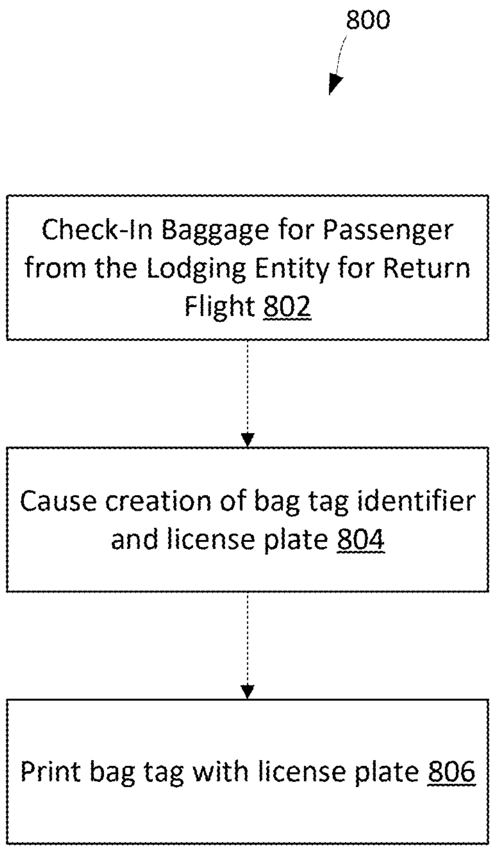
FIG. 8 illustrates a flow chart of a method for checking in baggage of a passenger leaving a lodging entity in accordance with one embodiment.
Figure 9A:
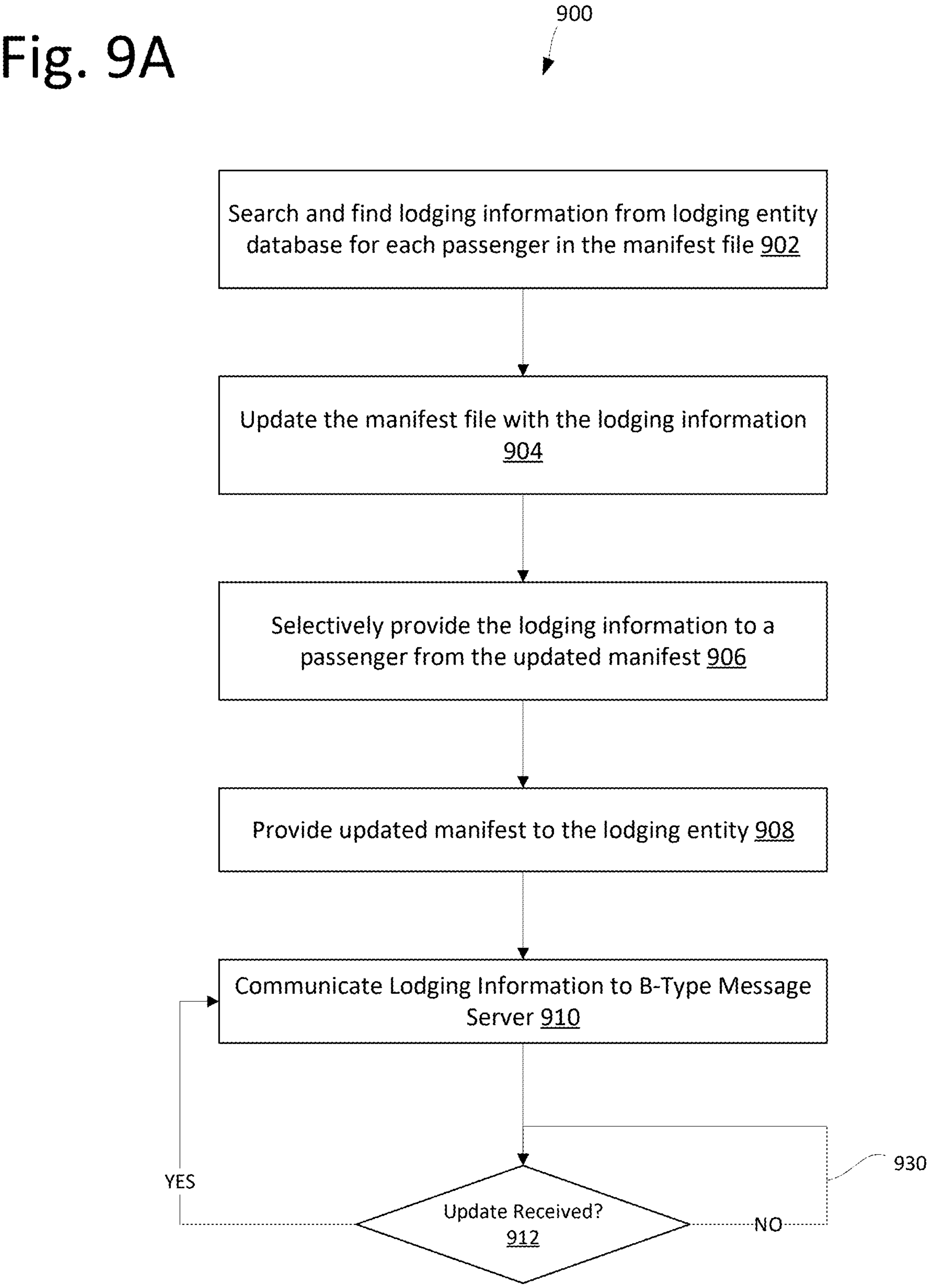
FIG. 9A illustrates a flow chart of a method for merging passenger manifest and lodging entity information in accordance with one embodiment.
Figure 9B:
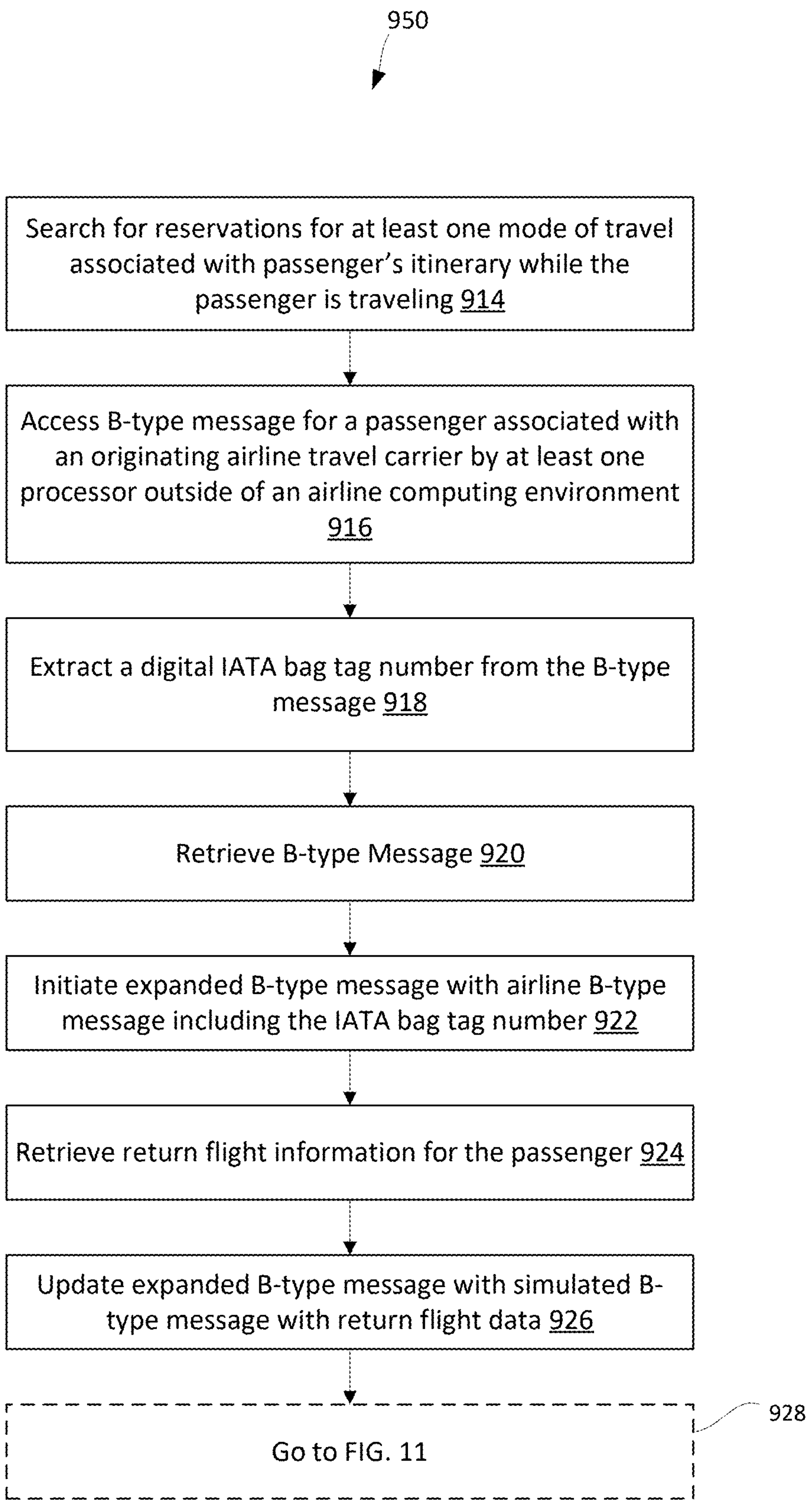
FIG. 9B illustrates a flow chart of a method for initiating an expanded B-Type message in accordance with one embodiment.
Figure 10:
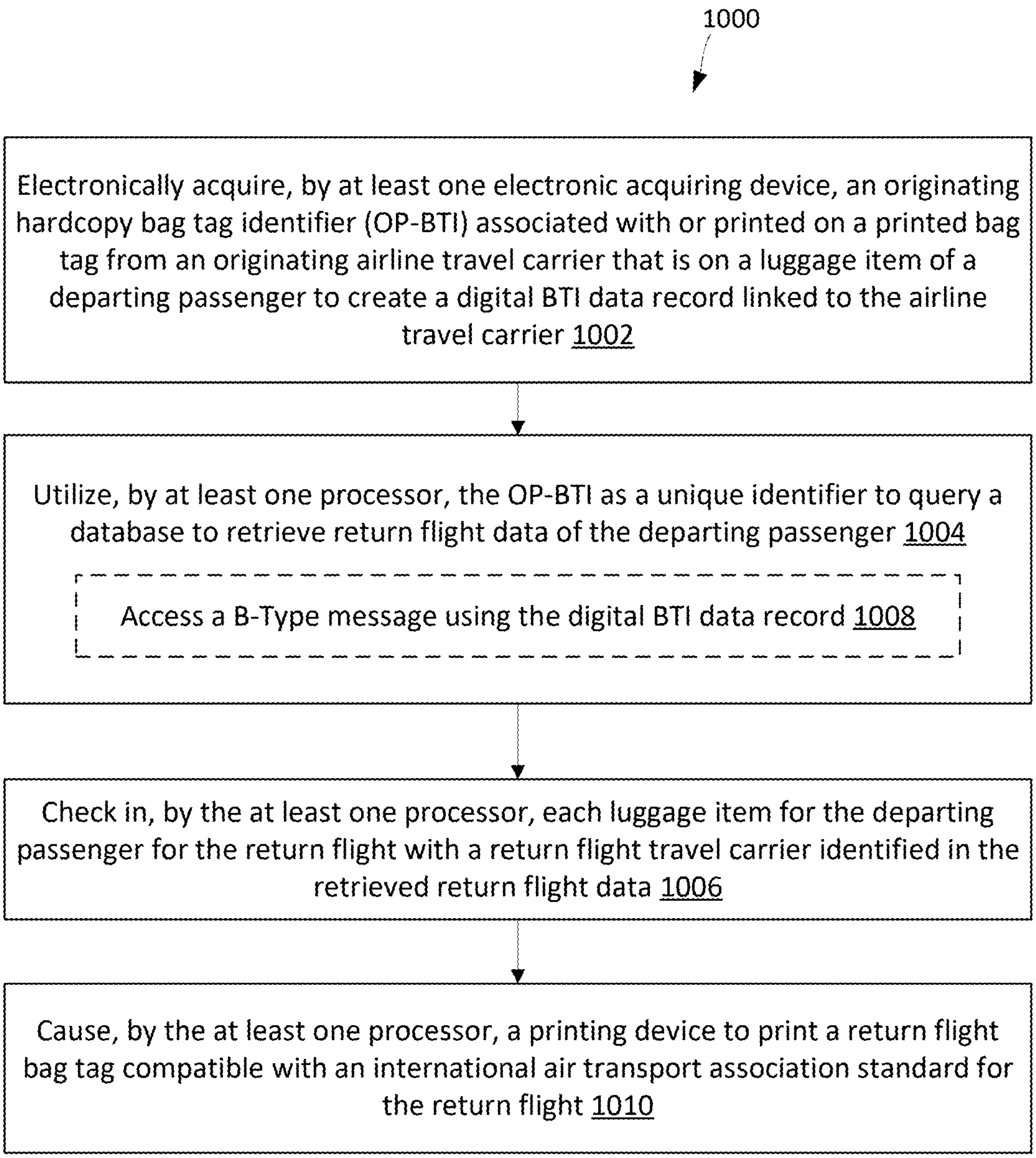
FIG. 10 illustrates a flow chart of a method for checking in baggage of a passenger in accordance with one embodiment.
Figure 11:
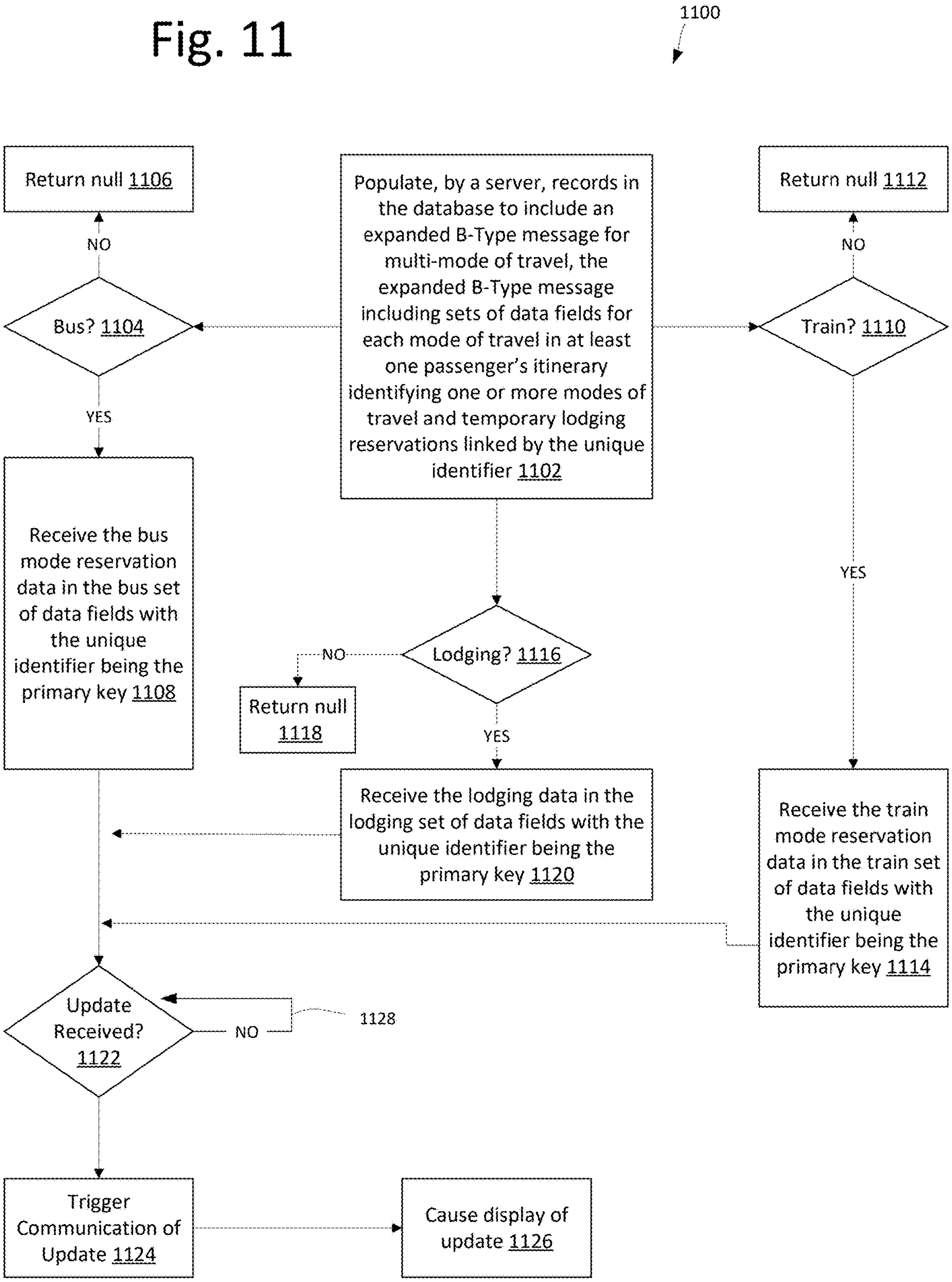
FIG. 11 illustrates a method for generating a universal B-Type message for a return path of a passenger in accordance with one embodiment.
Figure 19:
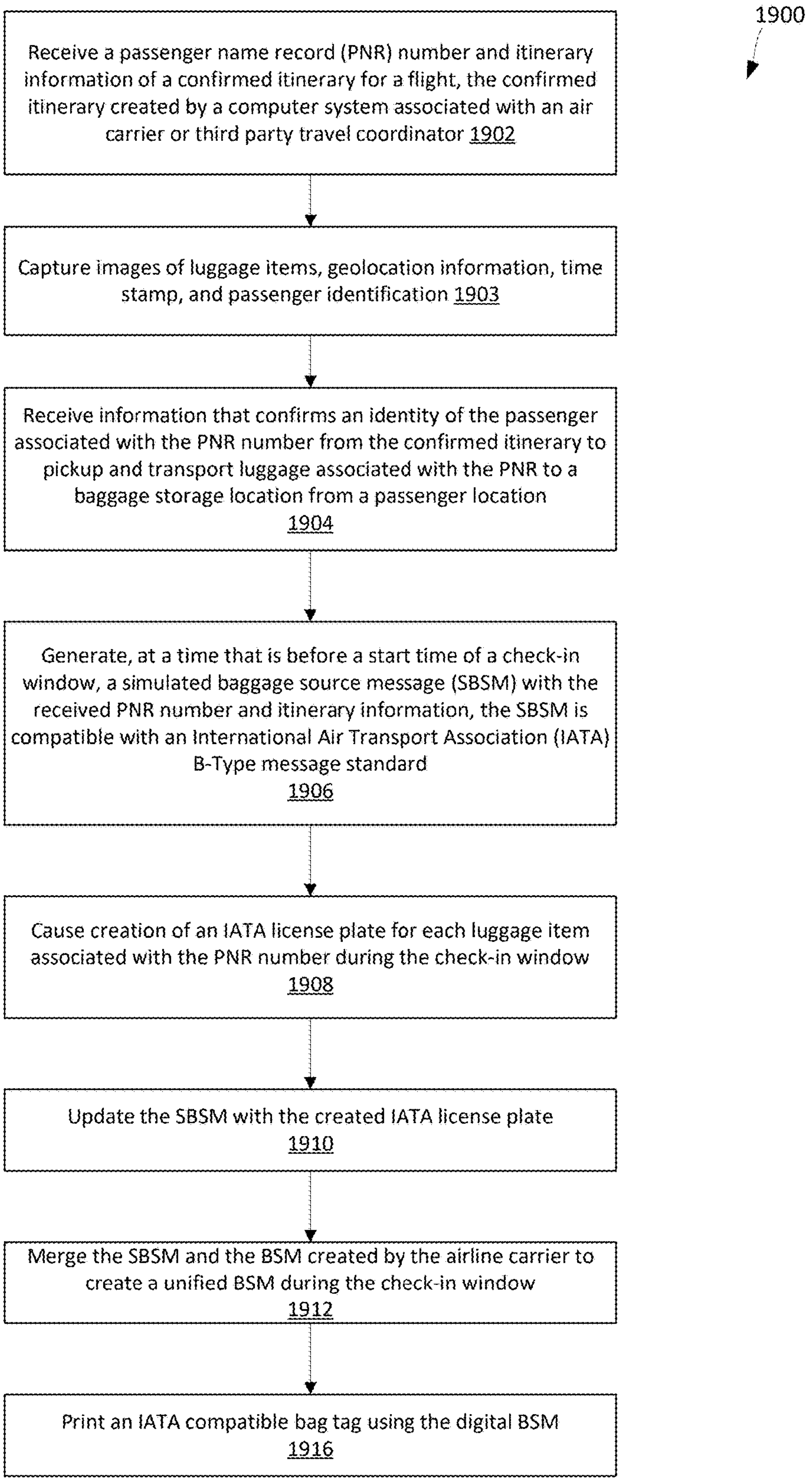
FIG. 19 illustrates a flow chart of a method for generating a simulated baggage source message in accordance with one embodiment.
Figure 20:
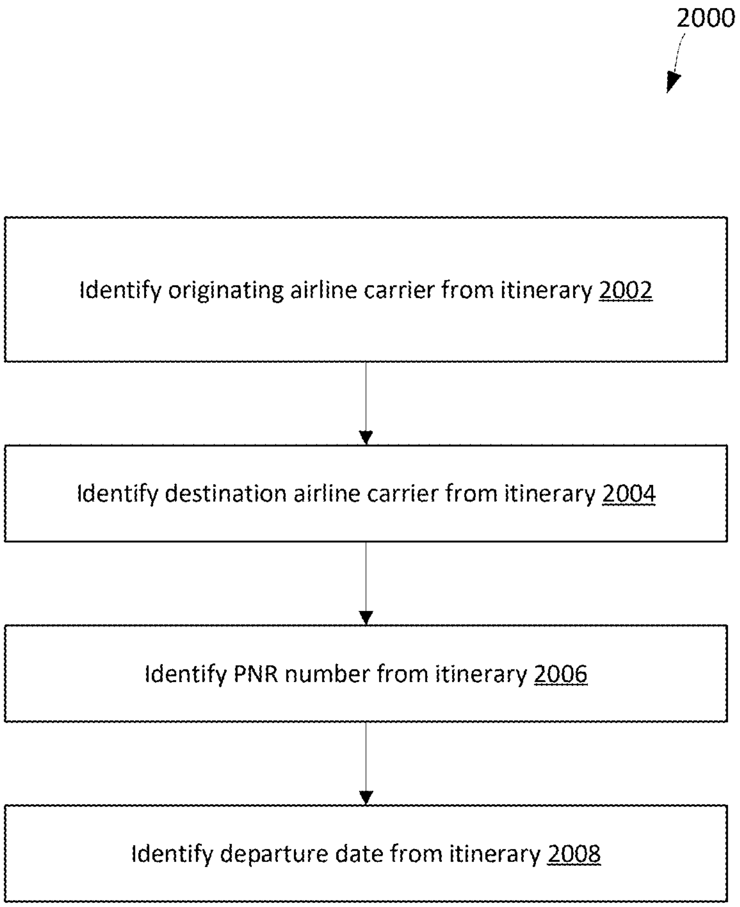
FIG. 20 illustrates a method to record a passenger itinerary in accordance with one embodiment.
Figure 23:
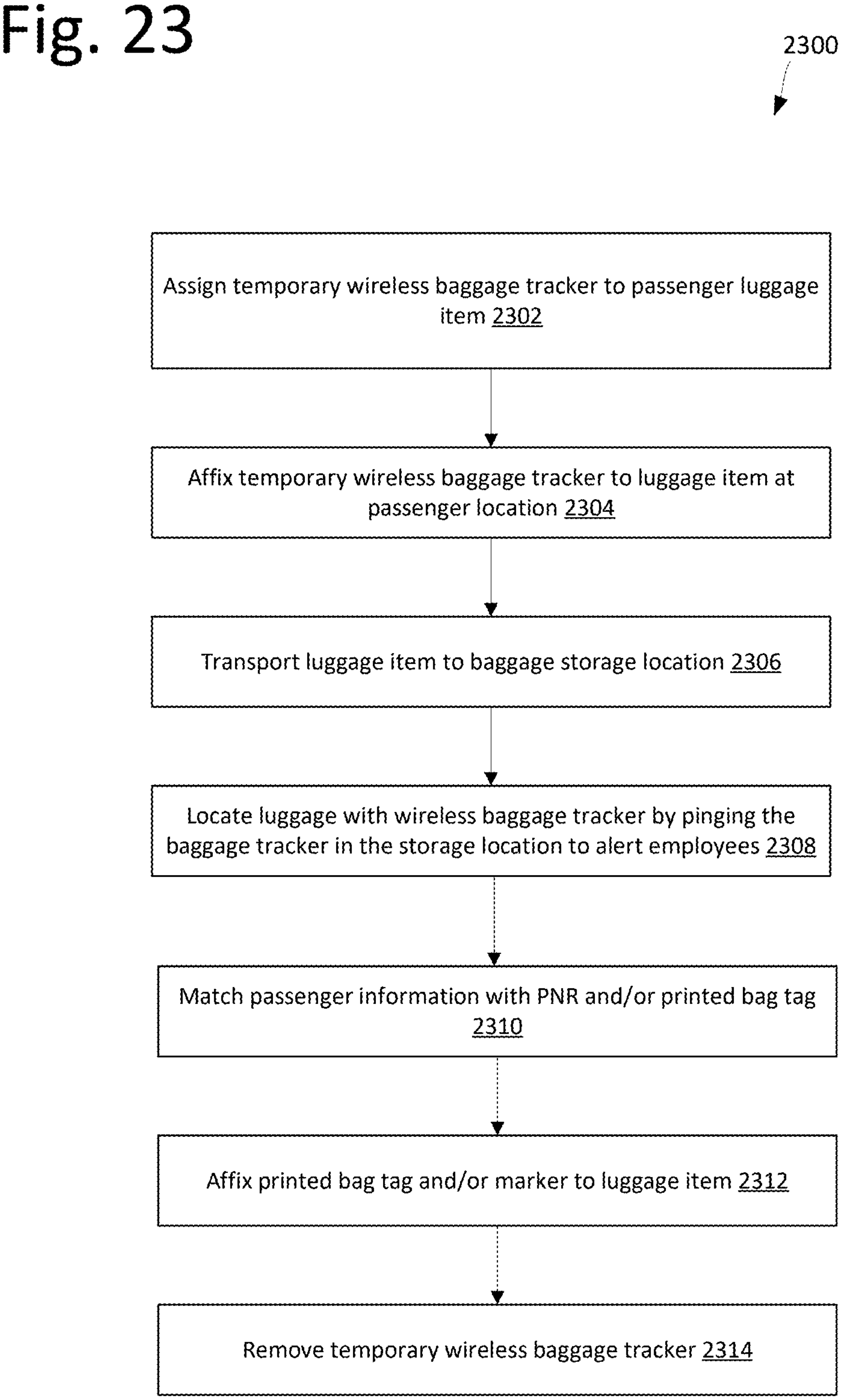
FIG. 23 illustrates a flow chart of a process for tracking a luggage item prior to loading the luggage item on an aircraft in accordance with one embodiment.

The computing device 700 may carry out one or more blocks of a method 500 in FIG. 5, method 800 in FIG. 8, method 900 in FIG. 9A, method 950 in FIG. 9B, method 1000 in FIG. 10, method 1100 in FIG. 11, method 1900 in FIG. 19, method 2000 in FIG. 20 and method 2300 in FIG. 23, all of which are described herein, via applications 724. The computing device 700 may also have additional features or functionality. As a non-limiting example, the computing device 700 may also include additional data storage media devices 708 (removable and/or non-removable) such as, for example, magnetic disks, optical disks, or tape. The computer storage media devices 708 may include volatile and non-volatile, non-transitory, removable, and non-removable media implemented in any method or technology for storage of data, such as computer readable instructions, data structures, program modules or other data. The system memory, removable storage and non-removable storage are all non-limiting examples of computer storage media. The computer storage media may include, but is not limited to, RAM 702, ROM 704, Electrically Erasable Programmable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device 700. Any such computer storage media may be part of a device.

The computing device 700 may also include or have input/output (I/O) interfaces 712 for input modules 714 such as a keyboard, mouse, pen, voice input device, touch input device, etc. Input modules 714 may include a video device, an imaging device 118, and/or a scanner 116 shown in FIG. 1A or 1B. The computing device may include or have I/O interfaces 712 for connection to output device(s) such as a display, a presentation module 716, speakers, etc. A graphical user interface (GUI) 718 may be displayed on the presentation module 716. The computing device 700 may include a peripheral bus 710 for connecting to peripherals. Computing device 700 may contain communication connection(s) that allow the device to communicate with other computing devices, such as over a network or a wireless network.

By way of example, and not limitation, communication connection(s) may include wired media such as a wired network or direct-wired connection, and wireless media such as acoustic, radio frequency (RF), infrared and other wireless media. The computing device 700 may include a network interface 720, such as a network interface card to connect (wired or wireless) to a network or other communication conduits 722.

The computing device 700 may also include accelerometers (ACC) 735, gyroscopes, Global Positioning System (GPS) 737 and/or Inertial Navigation Unit (INU) 740 to determine a location of the computing device 700, such as a mobile communication device, a scanning device, computing device, or other RF communication devices. The location data of the computing device 700 used to acquire the OP-BTI includes location data of the luggage item and the time stamp associated with the location data.

Computer program code for carrying out operations described above may be written in a variety of programming languages, including but not limited to a high-level programming language, such as C or C++, Python, Java, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM, and a flash memory. Otherwise, the code can be stored in a tangible computer-readable storage medium such as a magnetic tape, a flexible disc, a hard disc, a compact disc, a photo-magnetic disc, and a digital versatile disc (DVD).

The embodiments may be configured for use in a computer or a data processing apparatus which includes a memory, such as a central processing unit (CPU), a RAM and a ROM as well as a storage medium such as a hard disc.

In some embodiments, where the computing device is a server, the server may be one or more servers and the servers may be a virtual server.

FIG. 8 illustrates a flow chart of a method 800 for checking in baggage of a passenger leaving or departing a lodging entity in accordance with one embodiment. Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 800 may perform functions at substantially the same time or in a specific sequence. In some embodiments, one or more blocks disclosed herein may be omitted or blocks may be added.

According to some examples, the method 800 includes checking in baggage of a passenger from the lodging entity for a return flight, at block 802. If the first-mode travel carrier is an airline, then the method 800 may determine if the check-in window for baggage is open. For example, a passenger and/or their luggage for a flight may be allowed to be checked in within 24 hours to 48 hours of departure of a return flight. Train carriers may have a different window.

According to some examples, the method 800 includes causing creation of bag tag identifier and IATA license plate, at block 804. In some examples, the return flight IATA license plate may be generated by the DCS, or other airline host computer system designated to create the IATA license plate for the airline carrier. The "creation" may vary from airline to airline, mode to mode and situation to situation. For example, the server 1310 or server 148 may include programming modules to assign a unique identifier that is compatible with an IATA license plate and related barcodes. The server 1310 or server 148 may include programming modules for formatting the bag tag in a format compatible with an IATA bag tag format, such as shown in FIG. 2A.

According to some examples, the method 800 includes printing, by a printing device, a bag tag with license plate, at block 806. When baggage of a passenger is checked in, such as for a flight, one or more IATA B-Type messages are generated that include inbound and outbound airport codes and date, baggage details such as the 10-digit bag tag identifier, passenger name and PNR information.

In some embodiments, the printing device may print a marker tag that can be adhesively attached to the luggage item.

In some embodiments, the method may include communicating information associated with the 10-digit bag tag identifier of the return flight to the passenger so that upon return of their final leg of travel, the passenger can find and track their baggage using an IATA 10-digit bag tag identifier or the like.

The method 800 may include, during the remote/return baggage check-in process, obtaining, by the at least one processor, airline bag tag information for the return leg of travel for checked in luggage items for the passenger; and printing, by a printer, a new bag tag for the return leg of travel that is compatible with an IATA license plate for each checked in luggage item of the passenger.

The method 800 may include replacing the originating printed bag tag with the new return flight bag tag for the return leg of travel.

In some embodiments, the new return flight bag tag may be used to track the luggage item of the passenger along other modes of travel and to deliver luggage provided the originating printed bag tag has been removed and replaced. The new return flight bag tag may be used to track the location of the luggage item for delivery to a lodging entity on the return travel path.

FIG. 9A illustrates a flow chart of a method 900 for merging passenger manifest and lodging entity information in accordance with one embodiment. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence. In some embodiments, one or more blocks disclosed herein may be omitted or blocks may be added.

The lodging entity may include a cruise ship, a resort, a hotel, a short-term rental homestay, long-term rental homestay, residential dwelling, and building.

According to some examples, the method 900 may include searching and finding lodging information from a lodging entity database for each passenger in the manifest file, at block 902. By way of non-limiting example, the lodging entity database may include a passenger room, suite, or cabin number.

The method 900 may be an inbound process for processing baggage of the passenger upon arrival of the passenger or their luggage at a lodging entity. In some embodiments, the passenger does not need to be present at the inbound registration of the baggage, at or local to the destination point or at the lodging entity. The manifest file 1316 may be from an airport. Other reservation information may be from manifests of a railway (train) reservation system 1318, a bus reservation system 1320, a ferry reservation system (not shown), and a lodging entity reservation system 1322 of FIG. 13.

In some embodiments, travel reservations of multiple modes of travel and/or lodging entities can be merged to centralize delivery and check-in information for baggage of a passenger independent of the passenger. In some instances, the centralized manifest may be untethered to any travel mode or lodging entity.

According to some examples, the method 900 may include updating the manifest file with the lodging information, at block 904. According to some examples, the method 900 may include selectively providing the lodging information to a passenger from the updated manifest, at block 906. According to some examples, the method 900 may include providing an updated manifest to the lodging entity, at block 908. The updated manifest includes the lodging information from the lodging entity and the passenger information, such as a passenger name, return flight information for at least a first-mode travel carrier and original bag tag ID.

Figure 13:
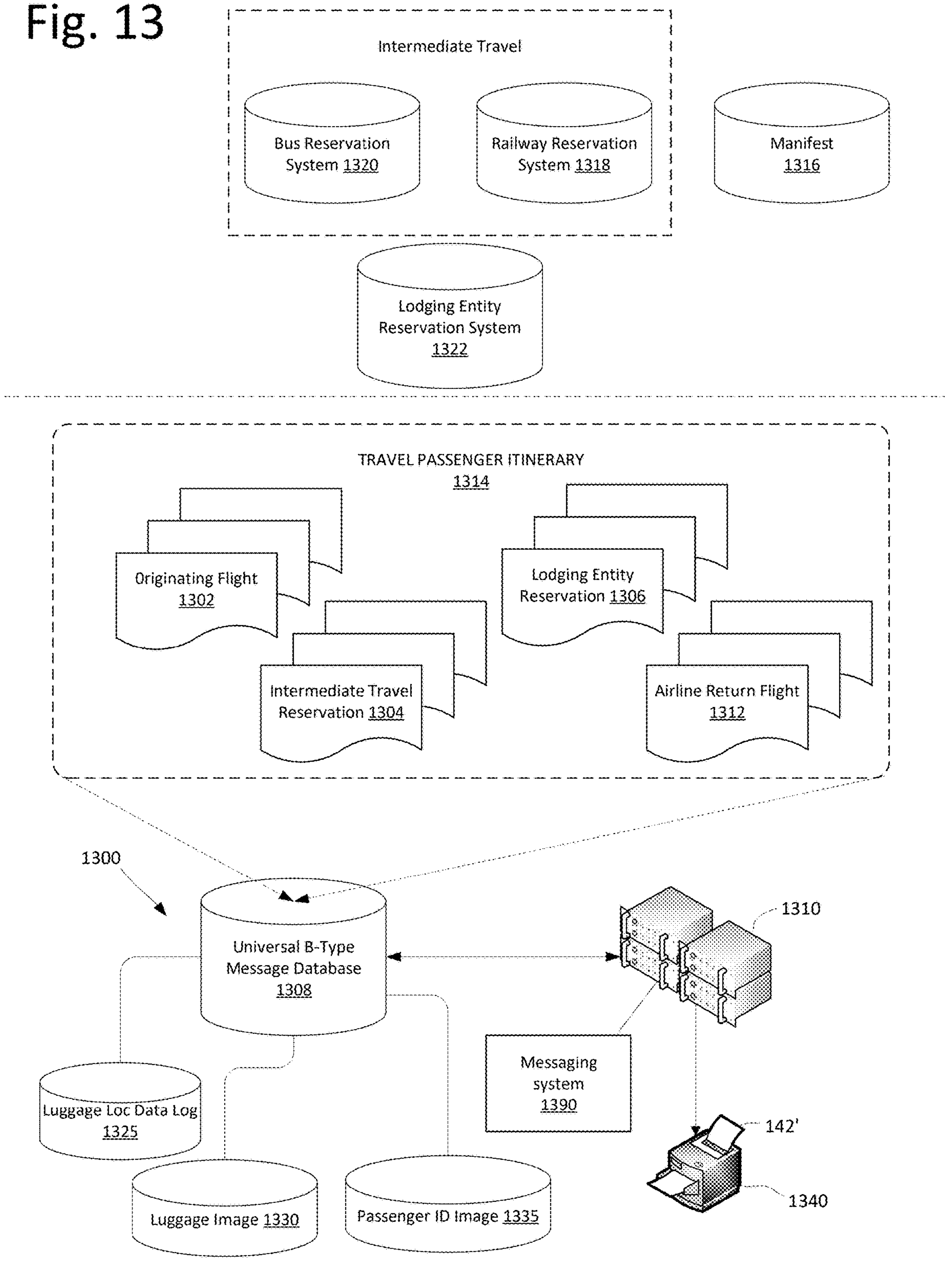
FIG. 13 illustrates a smart baggage travel system for multi-mode travel and lodging in accordance with one embodiment.

According to some examples, the method 900 may include communicating lodging information to B-Type message server 1310 (FIG. 13). According to some examples, the method 900 may include determining, at block 912, whether an update to the lodging information is received. If the determination is "YES," the method loops back to block 910 where the updated lodging information is communicated to the B-Type message server 1310. If the determination, at block 912, is "NO," the method on line 930 loops back to block 912 to wait for any updates.

FIG. 9B illustrates a flow chart of a method 950 for initiating an expanded B-Type message in accordance with one embodiment. The method 950 will be described in combination with FIG. 13.

FIG. 13 illustrates a smart baggage travel system 1300 for multi-mode travel and lodging in accordance with one embodiment. The smart baggage travel system 1300 may include a server 1310 and a database 1308 for tracking, locating, and facilitating check-in of luggage items of a passenger independent of the passenger or passenger check-in processes. The database 1308 is an expanded B-Type message database or universal B-Type message database. For example, the expanded B-Type message database includes an expanded BSM with a retrieved original BSM from an air carrier and a created lodging data or a link to lodging data is appended to the original BSM in an expanded or universal B-Type message. The expanded message includes an expanded or universal beginning header, and the end of the expanded message includes an end of message identifier code, as shown and described in FIG. 14A. The terms "expanded B-Type message" and "universal B-Type message" may be used interchangeably herein. The terms "expanded BSM" and "universal BSM" may be used interchangeably herein.

The server 1310 or server 148 may access reservation information associated with other modes of transportation, such as a manifest file 1316, which may be associated with a ferry reservation system or any other mode of travel. The server 1310 or server 148 may access a railway reservation system 1318. The server 1310 or server 148 may access a bus reservation system 1320. The server 1310 or server 148 may access a lodging entity reservation system 1322.

The server 1310 or server 148 may retrieve airline reservation information associated with an originating flight 1302 from an airline manifest, a B-Type message, an airline reservation system, or a passenger. The server 1310 or server 148 may retrieve an intermediate travel reservation 1304 from a railway reservation system 1318 or the passenger, for example.

The server 1310 or server 148 may retrieve lodging entity reservation information 1306 from the lodging entity reservation system 1322 or the passenger. The server 1310 or server 148 may retrieve intermediate travel reservations from the bus reservation system 1320 or the passenger.

At least one or more of the airline reservations of an originating flight 1302, the intermediate travel reservations 1304, the lodging entity reservations 1306, the airline return flight 1312 are stored in a universal passenger itinerary 1314. The passenger travel itinerary 1314 may include inbound travel information to the destination point and return path travel information back to home 102. The database 1308 may store the passenger itinerary 1314 separately or as part of the expanded (universal) B-Type message for baggage check-in, baggage handling and delivery for one or more legs of travel.

Although the example method 950 depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the method 950 may perform functions at substantially the same time or in a specific sequence. In some embodiments, one or more blocks disclosed herein may be omitted or blocks may be added.

According to some examples, the method 950 may include searching for reservations for at least one mode of travel associated with passenger's itinerary while the passenger is travelling at block 914. While the passenger is travelling, such as on a plane, one or more B-Type messages have been generated. For example, the airline host computing system may generate a BSM, such as when the luggage item is checked in at the airport or with the air carrier. In some embodiments, the luggage item may be checked in at home, a train station, or a port, such as a port associated with a cruise ship. In these instances, the IATA B-Type messages may have additional codes to designate the type of remote check-in. The BSM will include the additional codes and may be stored on or communicated to the airline host computer system or other associated computer system. In general, to ensure proper routing in the airline environment, the airline host computer system or other associated computer system will communicate B-Type messages to one or more of baggage handling systems, sortation systems, reconciliation systems and industry tracing systems. This tracks the location of the luggage items in the airport environment. However, shortly after a passenger arrives at a destination, the B-Type messages may be deleted.

Therefore, in some embodiments, the system 100 may access the B-Type messages to retrieve a bag tag number while a passenger is in flight.

According to some examples, the method 950 may include accessing a B-Type message for a passenger associated with an originating airline travel carrier by at least one processor, the at least one processor being outside of an airline computing environment at block 916. The at least one processor may be part of system 100 or system 1300, for example. The system 1300 may include a messaging system 1390 in communication with the server 1310 to communicate travel information in response to a trigger caused by scanning or acquiring the OP-BTI of the recycled and non-discarded originating printed IATA bag tag.

According to some examples, the method 950 may include extracting a digital IATA bag tag number from the B-Type message at block 918. As will be seen in FIG. 12A, the digital IATA bag tag number is represented by some of the digits in the field that starts with ".N/".

According to some examples, the method 950 may include retrieving the airline's B-Type message, such as from the airline host computer system or other associated computer system at block 920.

According to some examples, the method 950 may include initiating creation of an expanded B-Type message with the airline's B-Type message including the IATA bag tag number at block 922 associated with the originating printed bag tag. This is shown in FIG. 14A, and the collection of fields in bracket 1200A' may represent an airline B-Type message format compatible with IATA B-Type messages, described in FIG. 12A.

According to some examples, the method 950 may include retrieving return flight information for the passenger at block 924.

According to some examples, the method 950 may include updating the expanded B-Type message with a simulated B-Type message, shown in FIG. 12B, with return flight data at block 926. FIG. 12B illustrates a simulated B-Type message. The return flight data may be queued in the expanded B-Type message or in a designated separate simulated B-Type message until the passenger is ready to depart the lodging entity. Because of overcrowding of the figures, the simulated B-Type message is not shown in FIG. 14A. The simulated B-Type message may be generated by the simulated B-Type message generator 409 in FIG. 4.

According to some examples, the method 950 may include going to FIG. 11 at block 928, for additional modes of travel.

FIG. 10 illustrates a flow chart of a method 1000 for checking in baggage of a passenger in accordance with one embodiment. Although the example method 1000 depicts a particular sequence of operations, the sequence may be altered without departing from the scope of the present disclosure. For example, some of the operations depicted may be performed in parallel or in a different sequence that does not materially affect the function of the method 1000. In other examples, different components of an example device or system that implements the method 1000 may perform functions at substantially the same time or in a specific sequence. In some embodiments, one or more blocks disclosed herein may be omitted or blocks may be added.

In block 1002, method 1000 may include electronically acquiring, by at least one electronic acquiring device, an originating hardcopy bag tag identifier (OP-BTI) associated with or printed on a printed bag tag from an originating airline travel carrier that is on a luggage item of a passenger to create a digital data record linked to the airline travel carrier.

In block 1004, method 1000 may include utilizing, by at least one processor, the OP-BTI as a unique identifier to query a database to retrieve return flight data of the passenger. In some examples, block 1004, may include accessing, by the at least one processor, an airline B-Type message using the digital BTI data record at block 1008. In another example, the database is a manifest having the digital BTI data record.

In block 1006, method 1000 may include checking in, by the at least one processor, each luggage item for the passenger for the return flight with a return flight travel carrier identified in the retrieved return flight data. In some embodiments, the passenger is departing a lodging entity.

The lodging entity includes one of a hotel, resort, a cruise ship, short term rental homestay, long term rental homestay, residential dwelling, and building.

In some embodiments, in block 1010, method 1000 may include causing, by the at least one processor, a printing device to print a return flight bag tag compatible with an International Air Transport Association for the return flight.

In some embodiments, the passenger may be traveling by multiple modes of travel and/or a temporary lodging entity during their return journey home or to a point of origination.

FIG. 11 illustrates a method 1100 for generating an expanded (universal) B-Type message for a return path of a passenger in accordance with one embodiment. Although the example method 1100 depicts a particular sequence of operations, the sequence may be altered without departing from the scope of the present disclosure. For example, some of the operations depicted may be performed in parallel or in a different sequence that does not materially affect the function of the method 1100. In other examples, different components of an example device or system that implements the method 1100 may perform functions at substantially the same time or in a specific sequence. In some embodiments, one or more blocks disclosed herein may be omitted or blocks may be added.

According to some examples, the method 1100 may include populating, by a server (i.e., server 1310), records in the database 1308 to include an expanded (universal) B-Type message for multi-mode of travel and lodging reservations. The expanded (universal) B-Type message includes sets of data fields for each mode of travel in at least one passenger's itinerary identifying multi-mode travel and temporary lodging reservations linked by the unique identifier at block 1102.

In some embodiments, the passenger may enter their passenger's itinerary using a website portal which may be part of system 100, 1300, 1800 or otherwise accessible by system 100. The passenger may enter other information such as other modes of travel and lodging reservations. In other embodiments, the passenger may enter a PNR or itinerary confirmation number using a website portal which may be part of system 100, 1300 or 1800 or otherwise accessible by the systems.

In some embodiments, the website portal may be part of the lodging entity, such as without limitation, a resort or cruise ship.

According to some examples, the method 1100 may include determining, at block 1104, whether the passenger is traveling by bus. If the determination is "NO," a value of "NULL" 1106 will be returned to the server. If the determination, at block 1104, is "YES," then the server receives, at block 1108, the bus mode reservation data from the bus reservation system 1320 of FIG. 13 in the bus set of data fields with the unique identifier being the primary key.

According to some examples, the method 1100 may include determining, at block 1110, whether the passenger is traveling by train. If the determination is "NO," a value of "NULL" 1112 will be returned to the server. If the determination, at block 1110, is "YES," then the server receives, at block 1114, the train mode reservation data from the railway reservation system 1318 of FIG. 13 in the train set of data fields with the unique identifier being the primary key.

According to some examples, the method 1100 may include determining, at block 1116, whether the passenger has lodging. If the determination is "NO," a value of "NULL" 1118 will be returned to the server. If the determination, at block 1116, is "YES," then the server receives, at block 1120, the lodging data in the lodging set of data fields from a lodging entity reservation system 1322 of FIG. 13 in the lodging set of data fields with the unique identifier being the primary key. Blocks 1108, 1114 and 1120 flow to block 1122.

According to some examples, the method 1100 may include, at block 1122, a determination of whether there is an update to any of the modes of travel and lodging. If the determination, at block 1122, is "NO," the method waits for an update by looping on line 1128. If the determination, at block 1122, is "YES," the method 1100 may trigger a communication update at block 1124 and cause a display of the update at block 1126. In some embodiments, the communication does not happen until the server is triggered by a communication representative of received image data from an acquiring device.

The server 1301 may update a corresponding passenger itinerary linked to the universal B-Type message in the database 1308.

FIG. 12A illustrates a conventional BSM 1200A for an airline carrier. The BSM is a B-Type message. The B-Type message may include a plurality of data fields that include coded characters. For example, the coded characters may include one of American Standard Code for Information Interchange (ASCII) code, Baudot, and Padded Baudot, for example. The Baggage Information Messages or the B-Type messages code and format is described for example in the "Recommended Practice 1745 Baggage Information Messages" by IATA, in the Passenger Services Resolution Manual, June 2010, $30^{th}$ Edition, pgs. 1110-1205.

The B-Type message may include field or line 1202 that includes a header. For example, the header may be labeled "BSM," which represents the heading of the beginning of an airline BSM. The field or line 1204 may include a line preface ".V/" followed by a set of alphanumeric characters. By way of non-limiting example, the line preface ".V/" may denote version and supplemental data. For example, supplement data may include a transfer station in an airline environment.

The field or line 1206 may include a line preface ".F/" followed by a set of alphanumeric characters that represent the outbound flight number and date. The alphanumeric characters may be separated by a symbol "/". For example, the data "22MAY" may represent the date of arrival. The code "IST" represents Istanbul Airport.

The field or line 1208 may include a line preface ".I/" followed by a set of alphanumeric characters that represent the Inbound flight number and date. The alphanumeric characters may be separated by a symbol "/". For example, the data "12MAY" may represent the date of departure. The code "SLC" represents Salt Lake City Airport.

The field or line 1212 may include a line preface ".N/" followed by a set of numbers, which represent the digital BTI data record of the OP-BTI. The field or line 1210 may include a line preface ".P/" followed by a set of characters, which represent the passenger's name. The first name may be separated by the last name by a symbol "/".

The field or line 1218 may include a line preface ".L/" followed by a set of alphanumeric characters, which represent the passenger name record or PNR number. The field or line 1220 may include an end of message indicator, such as "ENDBSM."

Between lines 1202 and 1220, there may be other fields or lines, such as fields 1214 and 1216. The field or line 1214 has a preface ".S/" is reconciliation data. The field or line 1216 having a preface of ". W/" is related to the weight, pieces, dimension, and type data of the luggage item. Since airline B-Type messages are known in the art, no further description of B-Type messages will be described. Some of the fields/lines are mandatory and others are optional depending on the B-Type message.

However, the system 100 may access other B-Type messages from a computer system associated with the airline carrier to determine whether a luggage item is missing or not found, for example. The system 100 may access other B-Type messages stored in a computer system associated with the airline carrier to determine the status of a luggage prior to the passenger starting their stay at a lodging entity, for example, or at other times to track the status of the luggage moving through the airport environment.

The example BSM 1200A is provided for descriptive purposes and is not meant to be limiting in any way. Each airline may have changes to the airline BSM.

FIG. 12B illustrates a simulated BSM 1200B for a return flight that may be generated inside or outside of the regulated check-in window in accordance with one embodiment. The simulated BSM 1200B may serve as a placeholder for generating large volumes of the BSM inside or outside of the regulated check-in window of airlines, for example, or other modes of travel.

The B-Type message may include field or line 1222 that includes a header. For example, the header may be labeled "SBSM," which represents the heading of the beginning of an airline BSM, for example, or may include another B-Type message header. For the sake of description and illustration, the simulated BSM in this example has the same format the layout as the BSM in FIG. 12A. Therefore, only the differences will be described. For the sake of simplicity, the same code references may be used. However, slight differences may be used. For example, a simulated BSM header or another B-Type message may start with an "S" such that the header can be "SBSM," for example. In another example, the simulated BSM header or another B-Type message may end with a symbol, such as, an "*". These examples are not meant to be limiting. The start letter "S" may include two characters or an alphanumeric combination of two-digit codes.

The field or line 1224 may include a line preface ".V/" followed by a set of alphanumeric characters. By way of non-limiting example, the line preface ".V/" may denote version and supplemental data. Since, this is a simulated BSM outside of the regulated check-in window, the ".V/" field is marked as "NULL."

The field or line 1226 may include a line preface ".F/" followed by a set of alphanumeric characters that represent the outbound flight number and date. The alphanumeric characters may be separated by a symbol "/". For example, the data "31MAY" may represent the date of arrival. The code "SLC" represents Salt Lake City Airport.

The field or line 1228 may include a line preface ".I/" followed by a set of alphanumeric characters that represent the Inbound flight number and date. The alphanumeric characters may be separated by a symbol "/". For example, the data "30MAY" may represent the date of departure. The code "IST" represents Istanbul Airport.

The field or line 1230 may include a line preface ".N/" followed by the set of characters "NULL." This is because the bag tag identifier has not been assigned yet. The field or line 1236 may include a line preface ".P/" followed by a set of characters, which represent the passenger's name. The first name may be separated by the last name by a symbol "/".

In some embodiments, the simulated B-Type message generator 431 may assign a bag tag identifier that is compatible with the 10-digit IATA bag tag number that is printed as a bag tag for airline carriers. In this instance, the ".N/" preface will be followed by the assigned bag tag identifier or 10-digit IATA bag tag number. The numerical digits in the field following the ".N/" preface may include the number of luggage items checked.

The assignment of the bag tag identifier by server 148 or server 1310 outside of the airline travel information system may vary by airline or country.

The field or line 1238 and 1240 may include be used for remote check-in. For example, field line 1238 may include line preface ".D/" followed by a set of alphanumeric characters or alpha characters for bag check-in details. Each ".D/" code field varies based on the location data for the type of remote check-in. For example, the field 1238 may include at least location data, date, and time, for example. The field or line 1240 may include a preface ".C/" followed by characters, for example, which represent a company or group name.

The field or line 1242 may include a line preface ".L/" followed by a set of alphanumeric characters, which represent the passenger name record or PNR number. The field or line 1244 may include an end of message indicator, such as "ENDBSM."

Between lines 1222 and 1240, there may be other fields or lines, such as fields 1232 and 1234. The field 1232 has a preface ".S/" and field 1234 has a preface of ".W/", both of which are marked "NULL." The fields or lines marked "NULL" cannot be populated with return flight data because the airline system, such as the DCS, does not allow the baggage to be checked in until a regulated check-in window is open.

The simulated B-Type message or simulated BSM may be used as a placeholder to prepopulate the BSM or other B-Type message for checking in baggage that assigns the IATA license plate number.

In some embodiments, a third-party provider or the company checking in the baggage may be configured to assign a unique identifier that is compatible with an IATA license plate number including barcode formatting for printing on an IATA bag tag.

Universal Bag Tag

The inventor has identified that there is a substantial need for solving the disconnect with baggage handling throughout the passenger travel system. Using the originating flight airline bag tag (previously garbage) can be used to resolve the current passenger's experience issues and substantially reduce the enormous system costs for moving and identifying baggage through multi modes of travel and lodging. Using the original flight bag tag allows for the luggage to have an identifier that has important information and also allows access to a message system that will allow the bag to have a smart bag travel experience. This will allow the baggage to have a seamless travel experience much like the passenger while removing the baggage burden from the traveling passenger. Allowing the baggage to become smart with the identifier and messaging across all modes of travel and lodging will allow for a cost effective and seamless travel experience like never before due to the enhanced systems associated with recycling the original airline bag tag and provisioning the OP-BTI for off-airport location use.

Figure 14B:
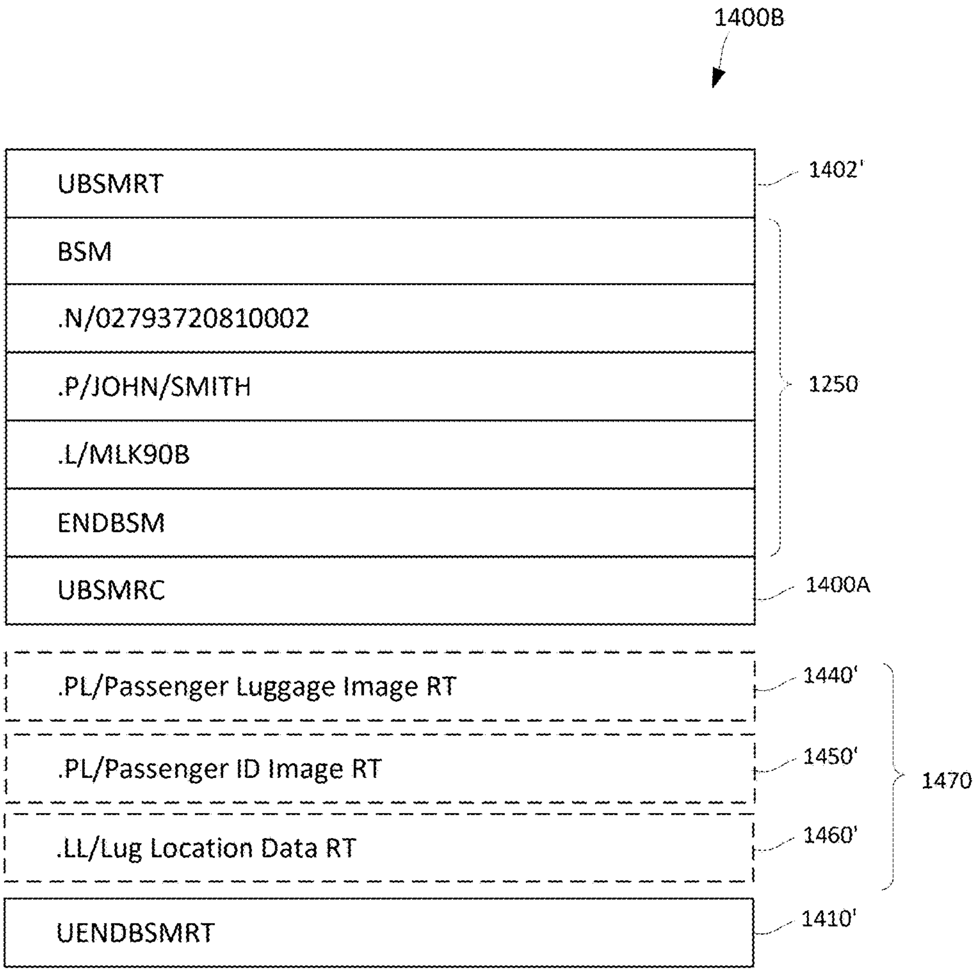
FIG. 14B illustrates an expanded (universal) B-Type message for a return flight in accordance with one embodiment.

FIG. 14A illustrates an expanded (universal) B-Type message 1400A for multi-mode travel and lodging and recycling the originating bag tag in accordance with one embodiment. FIG. 14B illustrates an expanded (universal) B-Type message 1400B for a return flight in accordance with one embodiment.

For the sake of illustration and description, the expanded (universal) B-Type message may be a universal BSM. The expanded B-Type message 1400A includes the BSM 1200A' described above in relation to FIG. 12A. According to some embodiments, the BSM 1200A' is a lite airline BSM version of BSM 1200A in FIG. 12A. In general, the fields 1202, 1210, 1212, 1218 and 1220 are preserved. In some embodiments, all fields may be preserved. In some embodiments, a different BSM construction may be generated. Furthermore, the expanded B-Type message 1400A may use other coding formats.

In this example, the B-Type message 1200A' may be immediately followed by a simulated B-Type message 1200B described in FIG. 12B. The header of the expanded B-Type message 1400A may use, for example, the code "UBSMRC" as shown in FIG. 14A, reference numeral 1402. The "U" denotes that the message is universal and usable at off-airport locations. The "BSM" indicates the type of B-Type message format. The "RC" denotes that the format of the universal message is for recycling of the originating IATA printed bag tag.

After the ending designation "ENDSBSM," one or more fields or lines 1420, 1430, 1440, 1450, 1460 may be appended. The expanded B-Type message 1400A may have an end of message identifier "UENDBSMRC" in field 1410. The code term "RC" represents recycling. The code term "RT" represents return.

For the sake of illustration and description, the preface ".L/" in field 1430 may include a link to a lodging PNR # such as found in itinerary 1314. However, lodging data could be entered including lodging address and room number or cabin number, by way of a non-limiting example. Also, the preface may use a different coding schema.

The preface ".L/" on line 1420 may include a link to an intermediate travel PNR number or alternately, data representative of alternate travel data.

The preface ".PL/" in field 1440 may represent the code to a link for a passenger luggage image. The preface ".PL/" in field 1450 may represent the code to a link for a passenger ID image. The preface ".LL/" in field 1460 may represent the code to a link for a log of luggage location data.

Once the return flight bag tag of a checked-in baggage replaces the originating printed bag tag, the return flight bag tag may become a machine-readable instrument to continue the tracking, locating, and checking in of baggage with multiple modes of travel and lodging along multiple legs of travel for a journey home.

Regarding the simulated B-Type message 1200B, it can be varied based on whether the baggage is checked in at a remote location, airport location, and airline. For example, there are recommended BSM formats for remotely checked in baggage from home, a train station, and a cruise ship at a port. By way of non-limiting example, the field or code ".D/" may be used to enter the check in location information. When the luggage item is checked in at a train station, the train station, date, and time may be added to the field ".D" and separated by the symbol "/". When the luggage item is checked in at a port, the port, port identification, date and time may be added to the field ".D/" and separated by the symbol "/". This is shown in the simulated BSM because, in the examples, the baggage may be checked in from a cruise ship. Other location data may be used for other approved remote check-in locations.

The IATA messages may have .M and .Z symbols unused. However, this may change in time. So, other code combinations may be used to distinguish different fields in the expanded/universal B-Type messages.

The description herein references coding schema of IATA B-Type messages for descriptive purposes. However, other coding schema may be used in the expanded B-Type message outside of the airline environment.

FIG. 14B illustrates an expanded (universal) B-Type message 1400B for a return flight in accordance with one embodiment. The field 1402' is the header and may include the code "UBSMRT" such that "U" denotes universal, BSM denotes the type of B-Type message, and "RT" denotes return. The bracketed fields 1250 represent a lite airline BSM as described previously regarding bracket 1200A'. In this instance, the field ".N/" may be updated with the IATA bag tag number for the printed bag tag for the return flight and is different from the ".N/" number in the lite BSM 1200A'. In this instance, the lite airline BSM 1250 may be followed by the universal B-Type message 1400A. FIG. 14B illustrates an expanded (universal) B-Type message 1400B for a return flight in accordance with one embodiment.

In some embodiments, the UBSMRC 1400A may be followed by fields 1440', 1450', 1460' as previously described (collectively 1470). However, the data in these fields can be for the return path of the journey. The expanded (universal) B-Type message 1400B includes an end of message designator 1410', which may be "UENDBSMRT."

Figure 15:
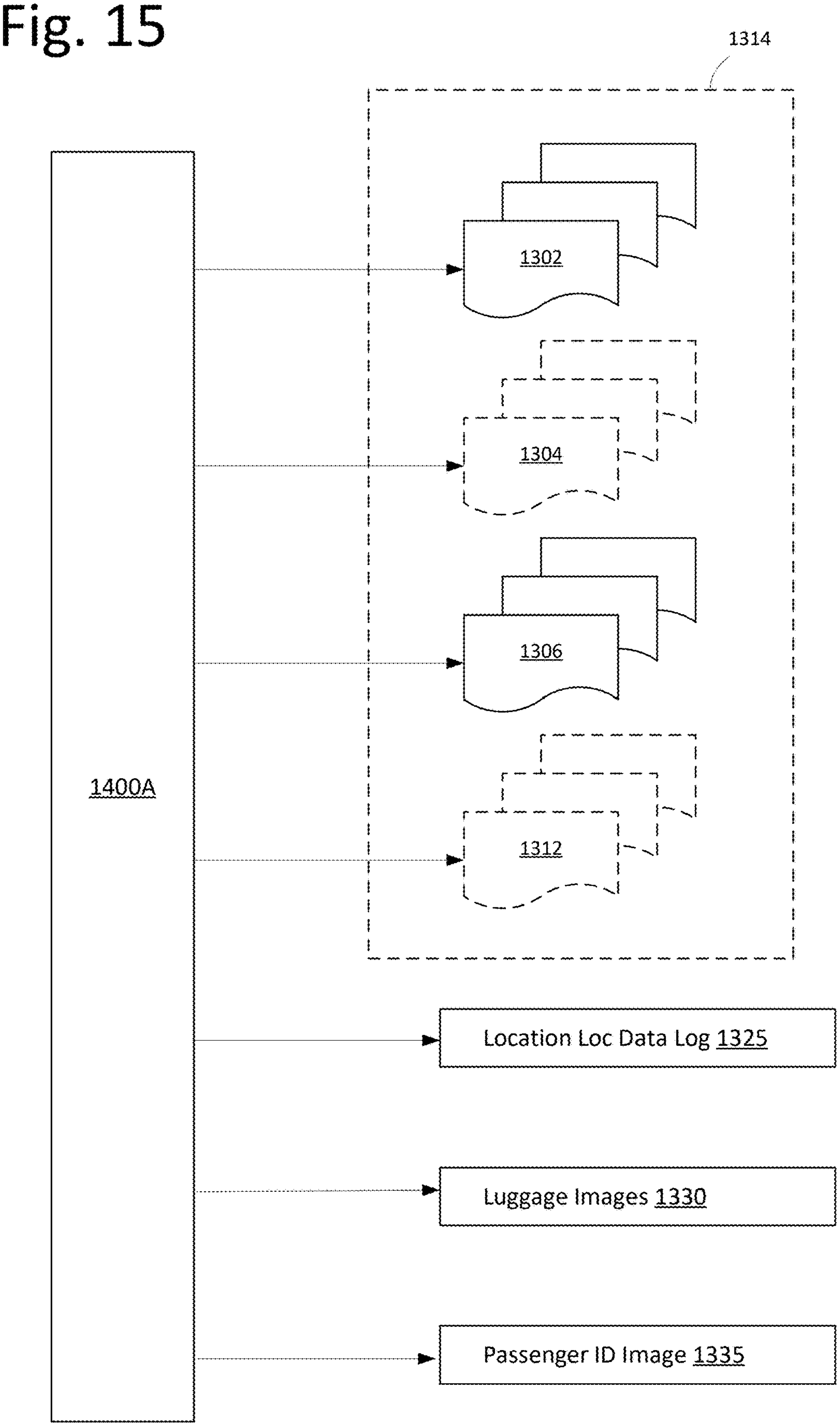
FIG. 15 illustrates a block diagram of links to expanded data of multi-mode travel and lodging data in accordance with one embodiment.

FIG. 15 illustrates a block diagram of links to expanded data of multi-mode travel and lodging data in accordance with one embodiment. The expanded B-Type message 1400A may access or have links to airline reservations of an originating flight 1302, the intermediate travel reservations 1304, the lodging entity reservations 1306, the airline return flight 1312 that are stored in a universal passenger itinerary 1314. The expanded B-Type message 1400A may access or have links to the luggage location data log 1325 in database 1308, the luggage image 1330 in database 1308 and the passenger ID image 1335 in database 1308.

Figure 16:
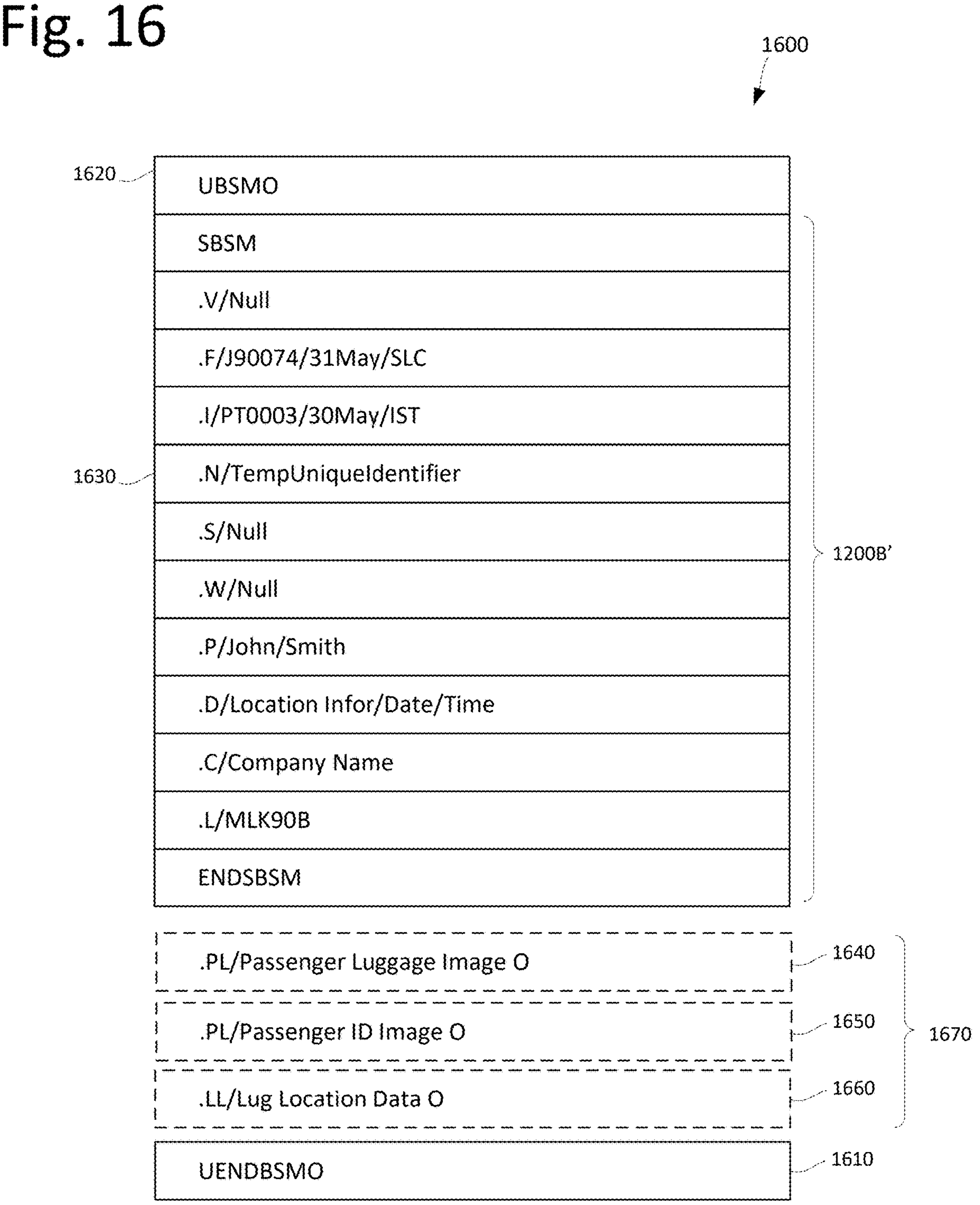
FIG. 16 illustrates an expanded (universal) B-Type message for multi-mode travel and lodging and of an originating flight in accordance with one embodiment.

FIG. 16 illustrates an expanded (universal) B-Type message for multi-mode travel and lodging and of an originating flight in accordance with one embodiment. The B-Type message 1600 (i.e., UBSMO) may include header "UBSMO" in field 1620. Field 1620 is followed by simulated BSM or other B-Type message 1200B', described in FIG. 12B. In message 1200B' the field 1630 may have a temporary unique identifier as a placeholder until an IATA bag tag number is created. The simulated BSM 1200B' may be followed by fields 1640, 1650 and 1660 (collectively 1670) with links to passenger luggage image data on the originating leg of the journey, the passenger ID image on the originating leg of the journey, and location data on the originating leg, respectively. This will become more evident with the description of FIGS. 18-24 below. The B-Type message 1600 may include an end of message identifier such as "UENDBSMO" 1610.

When the luggage item is ready to be checked in, the simulated message 1200B' is merged with an airline BSM, for example, to obtain the IATA bag tag identifier and other remaining information. Embodiments of the IATA bag tag identifier by system 1800 are described below.

Figure 17:
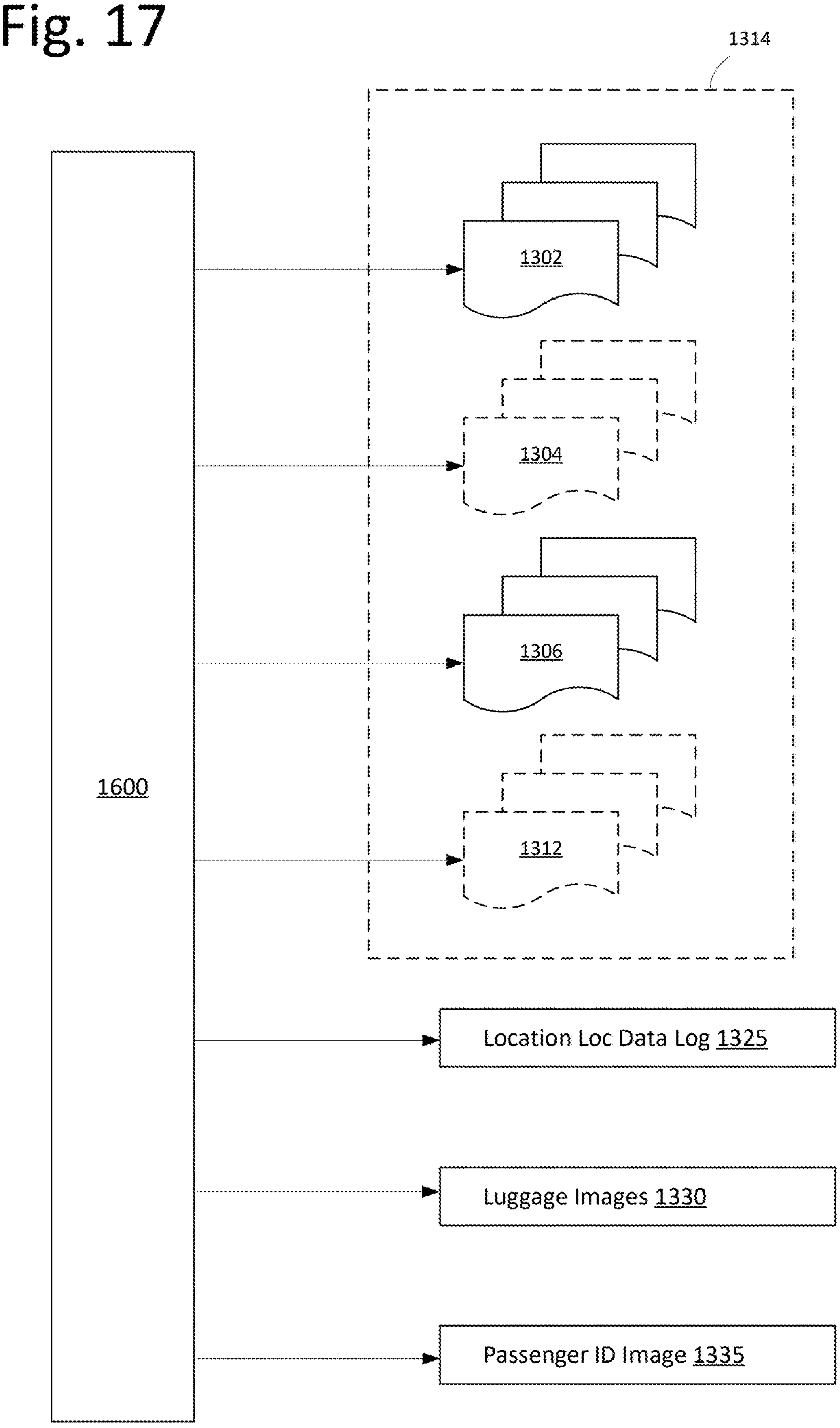
FIG. 17 illustrates a block diagram of links to expanded data of multi-mode travel and lodging data of an originating flight in accordance with one embodiment.

FIG. 17 illustrates a block diagram of links to expanded data of multi-mode travel and lodging data of an originating flight in accordance with one embodiment. The B-Type message 1600 (i.e., UBSMO) may access or have links to airline reservations of an originating flight 1302, the intermediate travel reservations 1304, the lodging entity reservations 1306, the airline return flight 1312 that are stored in a universal passenger itinerary 1314. The B-Type message 1600 may access or have links to the location data 1325, the luggage image 1330 and the passenger ID image 1335.

Originating Baggage Check-In

Remote check in at the home began approximately back in 2001 and has taken on multiple forms over the years but has struggled to operate due to enormous costs for technology at the remote site, or logistic issues with trying to pre-print any documents such as a valet tag or a bag tag, for example. The valet tag is discarded and replaced with a permanent IATA bag tag, which causes environmental waste. While a single valet tag does not seem to cause a significant issue, compounding the discarded paper, ink, and equipment for printing millions of valet tags over years can cause environmental waste that contributes to long term climate change.

The challenge with a remote check-in in some environments also includes a strict time constraint, such as a 24-hour check-in window, which creates a very difficult task of managing the process and having any opportunity for financial viability. The embodiments address these concerns and offer an on-demand lite technology that is environmentally friendly and expands the airline check-in window externally by using a simulated BSM and/or assignable IATA bag tag codes combined with ID check and verification, location verification, itinerary verification, ticket purchase verification, capturing an image of the luggage and/or attaching a temporary wireless luggage tracker to allow for the baggage check-in to occur seamlessly with the airline B-Type message triggering the printing of the bag tag.

The one or more blocks of the methods of FIGS. 18, 19, 20 and 23 may be performed by programming instructions stored on tangible, non-transitory computer readable medium, which, when executed by one or more processors or servers, may cause the one or more processor or servers to perform the operations of the blocks described herein below.

Figure 18:
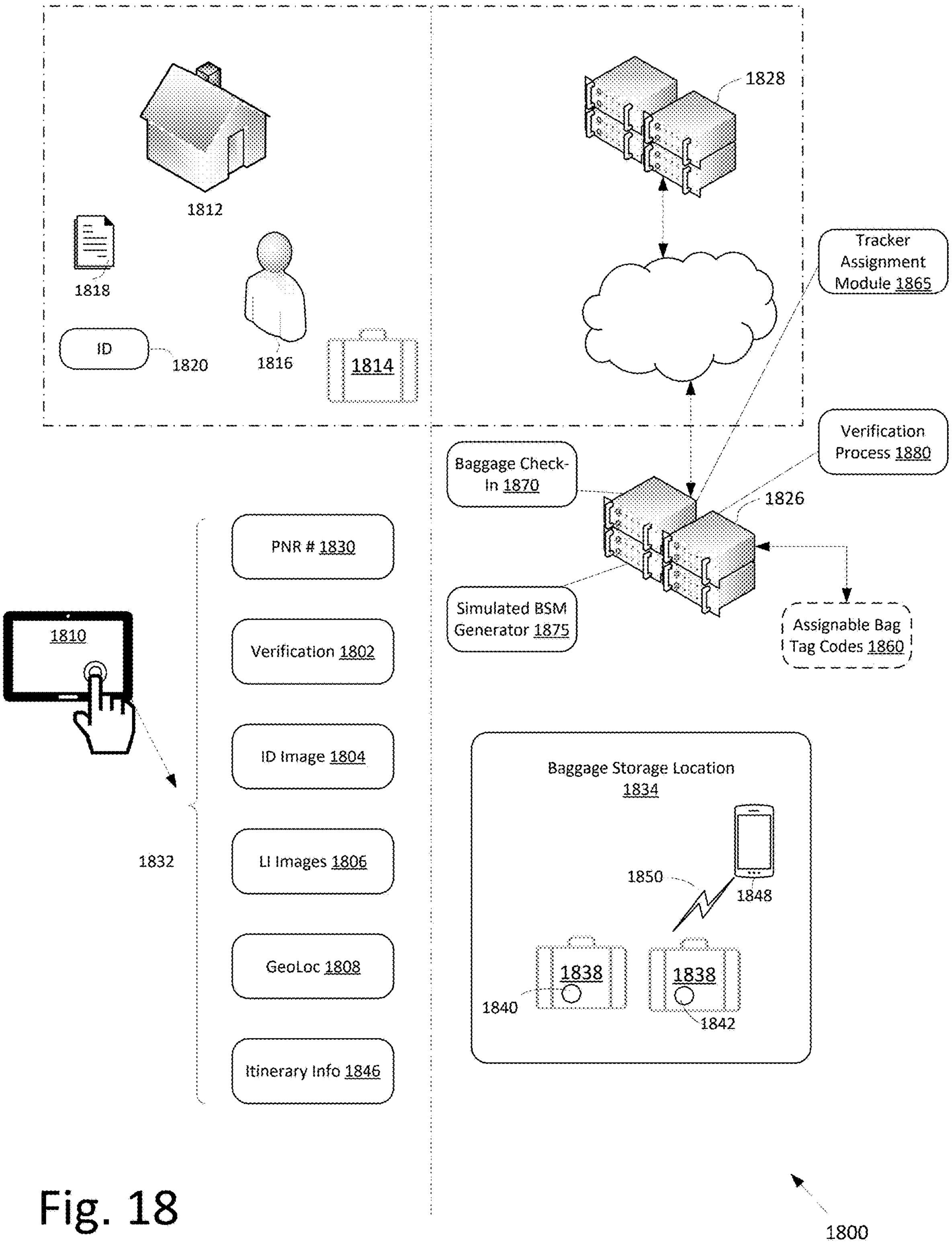
FIG. 18 illustrates a system for digitizing luggage custody and luggage check-in in accordance with one embodiment.

FIG. 18 illustrates a system 1800 for digitizing luggage custody and luggage check-in in accordance with one embodiment. The system 1800 may be part of system 100 and/or 1300, in some embodiments. In some embodiments, the disclosure provides a unified system for combining the operations of system 100, 1300 and 1800 to enhance the travel experience of the luggage item and passenger 1816 while eliminating environmental waste.

The system 1800 may include at least one first processor 1810 and at least one second processor 1826 in wired or wireless communications with each other. The system 1800 does not include those items in the box denoted by dash dot lines. The system 1800 may include at least one baggage storage location 1834 to temporarily store luggage items. The system 1800 may include other computing devices 1848 to acquire bag tag identifiers or other information affixed to the luggage item as will be described later.

In some embodiments, the system 1800 may include a baggage check-in module 1870 and a simulated BSM generator 1875. A simulated BSM generator has been previously described, so no further discussion is necessary.

In some embodiments, the system 1800 may include a module for assignable bag tag codes 1860. The module for assignable bag tag codes 1860 bypasses the IATA bag tag code generated by the DCS of the airline carrier and assigns an IATA bag tag code by system 1800. The assigned IATA bag tag code is populated into the simulated BSM and further merged with the missing airline BSM data to form a unified BSM. A unified BSM is a merger of a simulated BSM with information from an airline BSM. The unified BSM is used to create an expanded BSM. The same process to create a unified BSM may be used to create a unified B-Type message.

It should be noted that system 1800 can be used at a lodging entity for the originating bag tag. Furthermore, as shown in FIG. 1A, path L1 in some embodiments may be provided by system 1800, wherein the luggage 138 may be retrieved at home 102 and checked-in prior to delivery to the first-mode travel carrier 104 such that bag tag 142 is created by system 1800 using the methods described herein.

In some embodiments, the first processor 1810 may receive a PNR number 1830 or other identifier from a confirmed itinerary 1818 for a flight with at least one airline carrier. The first processor 1810 may receive information that confirms an identify of the passenger 1816 associated with the PNR number from the confirmed itinerary 1818 to pick up and transport luggage associated with the PNR number to a baggage storage location 1834 from a passenger location 1812. The confirmed itinerary 1818 (FIG. 21) may be created by a computer system 1828 associated with an air carrier.

Figure 21:
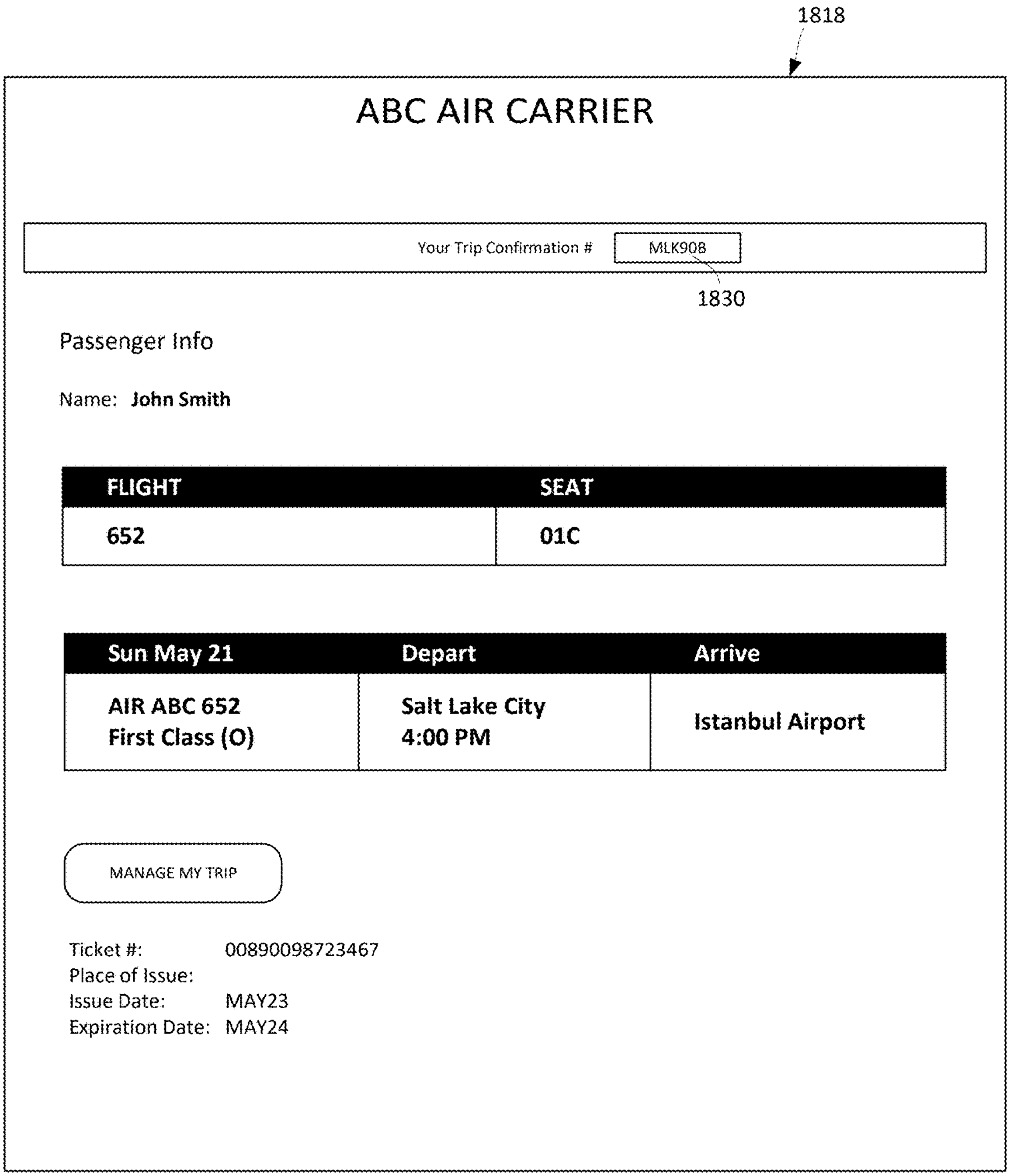
FIG. 21 illustrates an example confirmed itinerary for an air flight in accordance with one embodiment.

FIG. 21 illustrates an example confirmed itinerary 1818 for an air flight in accordance with one embodiment. The confirmed itinerary 1818 includes at least one of a passenger record number (PNR), a passenger name, flight reservation information, and a purchased ticket number.

In some embodiments, the system 1800 may include a tracker assignment module 1865, which includes an application that allows the wireless tracker to be named or provided with information that is associated with a unique code such as a PNR or other identifier. This process is described later in FIG. 23.

In one embodiment, the system 1800 includes an imaging device in communication with the first processor 1810. The imaging device and first processor 1810 may be integrated into a single device, such as a smart phone, mobile communication device, tablet, notebook, or other camera-enabled portable computing device. The imaging device, as shown in FIG. 1, may capture an image of each luggage item (LI) 1814 (hereinafter referred to as "LI images 1806") associated with the PNR 1830, prior to departing the passenger location 1812.

In one embodiment, the imaging device may capture an image of an identification instrument 1820 (hereinafter referred to as "ID image 1804") issued to the passenger. The user of the first processor 1810 and imaging device may verify the identification of the passenger to reconcile with the PNR in the confirmed itinerary 1818. The PNR may be associated with at least one person. However, at the time of pickup of at least one luggage item 1814, only one individual in the PNR may need to be verified. In some embodiments, all the passengers need to be present, and all identifications of adult passengers need to be verified.

Figure 22:
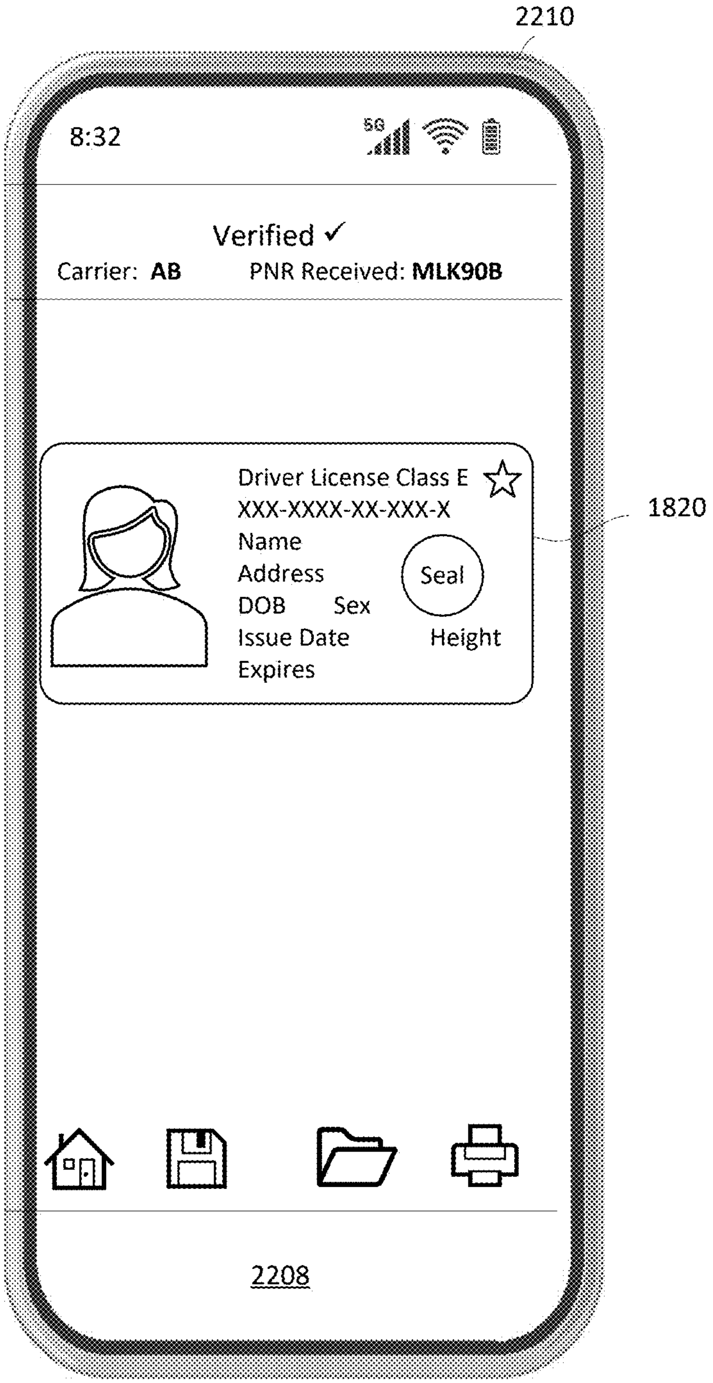
FIG. 22 illustrates a graphical user interface on a mobile communication device capturing a passenger identification in accordance with one embodiment.

FIG. 22 illustrates graphical user interface 2208 on a mobile communication device 2210 capturing a passenger identification 1820 in accordance with one embodiment. After the image of the passenger identification 1820 is captured, the image may be sent to a verification process 1880. For example, the verification process 1880 may have policies and procedures for verifying the identification depending on the state from which the identification is issued and the type of identification, such as a driver's license or passport. Communication procedures for contacting the databases of the Department of Motor Vehicles (DMV) may be stored to be subsequently looked up in the module of the verification process 1880. The verification process 1880 may complete the verification process and communicate a signal representative of a verification received from a DMV, for example, to the first processor 1810, which is then displayed on the display device.

In one embodiment, the first processor 1810 may receive a data entry representative of a verification of the passenger by a user of the first processor 1810. For example, the user may receive the identification instrument 1820 and visually match the passenger's name in the confirmation itinerary with the name on the identification instrument 1820. In some embodiments, the first processor 1810 may be configured to extract an individual's name in the identification instrument 1820 using optical character recognition (OCR) or other software applications such as to convert a PDF or JPEG file to a DOCX (MICROSOFT WORD) file, for example.

In one embodiment, the imaging device of the first processor 1810 may capture an image of the confirmed itinerary 1818, an image of a bar code, or a QR code. Information associated with the confirmed itinerary 1818 can be received, such as, without limitation, the names of other passengers associated with the confirmed itinerary 1818, the airline of the originating airline carrier, the destination airline carrier, date and time of departure, and time of arrival at the destination. The first processor 1810 may perform optical character recognition (OCR) on an image of the paper copy of the confirmed itinerary 1818 as a methodology to receive the itinerary information and the PNR, or other artificial intelligence (AI) software may be used to convert hardcopy text to digital data. The first processor 1810 may receive itinerary information and the PNR by accessing the same information from a web portal linked to a passenger's account, for example.

In an embodiment, the passenger record may include at least one of the PNR of a confirmed itinerary 1818, an image of each luggage item being picked up, and a copy of the identification instrument 1820.

The first processor 1810 may communicate with the second processor 1826 the PNR 1830, the verification 1802, the ID image 1804, the LI images 1806, geo location information 1808 and itinerary information 1846 in bracket 1832. By way of non-limiting example, the smart phone or other mobile computing device may include a Global Positioning receiver to receive signals form a Global Positioning System (GPS) to identify the location of the first processor 1810. The digitized information in 1832 is used to eliminate the need for a printed valet tag for tagging the luggage item.

In an embodiment, the second processor 1826 may generate a simulated baggage source message (BSM), as shown FIG. 12B, with the received PNR 1830. The second processor is independent from the air carrier and computer system 1828. The BSM is compatible with an International Air Transport Association (IATA) B-Type messages.

The second processor 1826 may cause the creation of an IATA license plate for each luggage item associated with the PNR 1830 and related itinerary information.

In an embodiment, the second processor 1826 may update the virtual BSM with the created IATA license plate and communicate, to the computer system 1828 associated with the air carrier, the updated BSM.

The trackers 1840, 1842 affixed to luggage 1838 may be an AIRTAG tracker by APPLE® Inc. The tracker 1840, 1842 may be a Global Positioning System (GPS) tracker, a GSM tracker or other tracker. This step may be performed at any time including when the luggage item is brought into the baggage storage location 1834.

Figure 24:
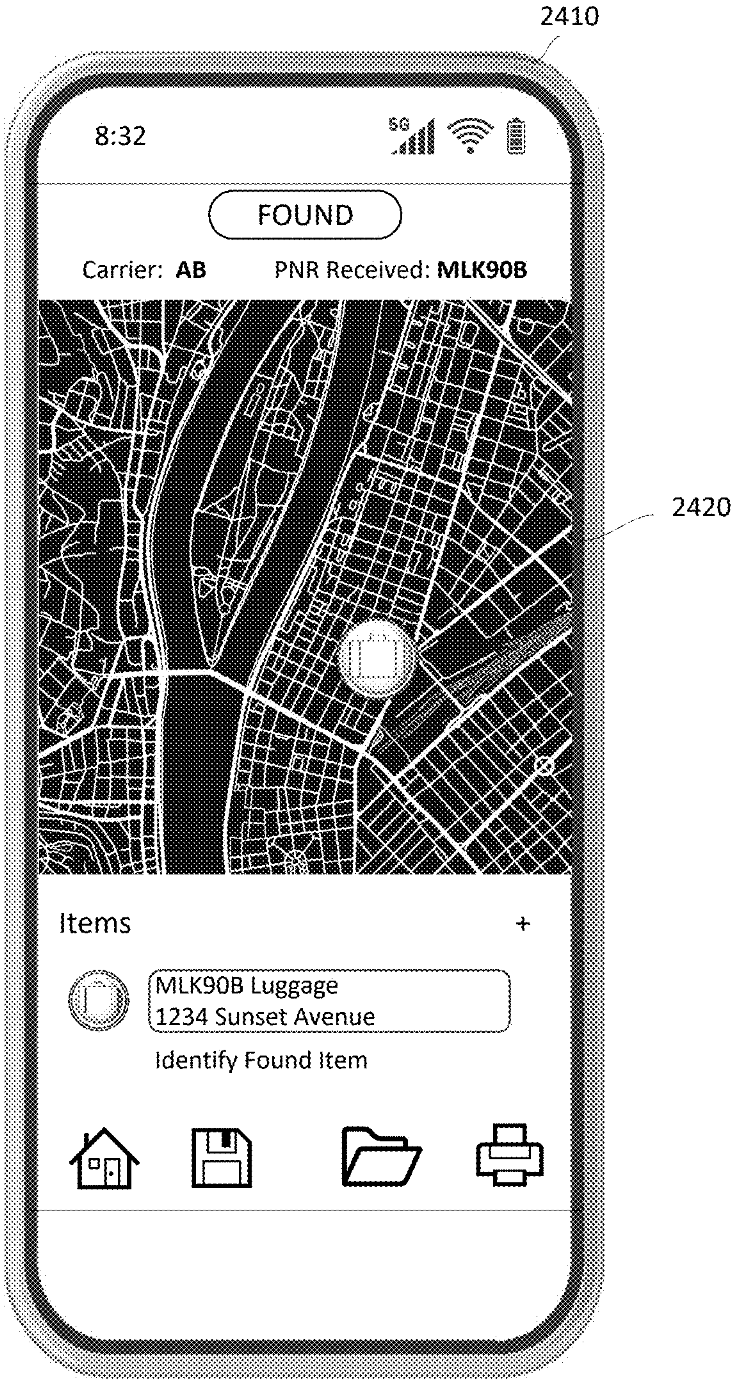
FIG. 24 illustrates a mobile communication device displaying a FIND MY application in accordance with one embodiment.

The AIRTAG tracker has a mobile application called FIND MY 2420 as shown in FIG. 24 that is displayed on a display of a mobile communication device 2410. Other types of trackers may be programmed to transmit data to a computing device in response to a ping signal.

Luggage items are tagged with a bag tag that conforms to the International Air Transport Association (IATA) bag tag code and/or other standardized formatting of the carrier. For example, an airline bag tag may include an IATA code that includes a three-character alpha numerical geocode designating airports and metropolitan areas. The IATA code is also known as an IATA location identifier. The IATA also publishes industry standard rules for creation of bag tags for the airline industry. The printed bag tag may include a 10-digit license plate and a corresponding bar code. The printed bag tag may include information to create the IATA geocode, the original airline flight information, the 10-digit license plate, and other bag tag information printed on a hardcopy printed bag tag.

FIG. 19 illustrates a flow chart of a method 1900 for generating a simulated baggage source message in accordance with one embodiment. Although the example method 1900 depicts a particular sequence of operations, the sequence may be altered without departing from the scope of the present disclosure. For example, some of the operations depicted may be performed in parallel or in a different sequence that does not materially affect the function of the method 1900. In other examples, different components of an example device or system that implements the method 1900 may perform functions at substantially the same time or in a specific sequence. In some embodiments, one or more of the blocks may be omitted or blocks may be added.

According to some examples, the method 1900 may include receiving a passenger name record (PNR) and itinerary information of a confirmed itinerary for a flight, the confirmed itinerary created by a computer system associated with an air carrier or a third-party travel coordinator (e.g., travel agency or other independent entity from the air carrier) at block 1902. The process of block 1902 is described in more detail in relation to FIG. 20 below.

According to some examples, the method 1900 may include capturing images of a luggage items, geolocation information, time stamp, and passenger identification at block 1903.

According to some examples, the method 1900 may include receiving information that confirms an identify of the passenger associated with the PNR from the confirmed itinerary to pick up and transport luggage associated with the PNR to a baggage storage location from a passenger location at block 1904.

According to some examples, the method 1900 may include generating, at a time that may be before a start time of a check-in window, a simulated baggage source message with the received PNR and itinerary information, the simulated baggage source message is compatible with an International Air Transport Association (IATA) B-Type Messages at block 1906.

According to some examples, the method 1900 may include causing creation of an IATA license plate for each luggage item associated with the PNR during the check-in window at block 1908.

According to some examples, the method 1900 may include updating the SBSM with the created IATA license plate at block 1910.

According to some examples, the method 1900 may include merging the SBSM and the BSM created by the airline carrier to create a unified BSM during the check-in window at block 1912. One or more of the blocks 1908, 1910 and 1912 may be part of a baggage check-in process where the luggage is picked up from the passenger at home.

According to some examples, the method 1900 may include printing an IATA compatible bag tag using the digital BSM at block 1916.

While the description here in describes an example for picking up luggage from a home and verifying passengers at a home location, this process may be performed at any remote location that is outside of an airport infrastructure.

FIG. 20 illustrates a method 1902 to record passenger itinerary in accordance with one embodiment. In some embodiments, the method 1902 may include identifying an originating airline carrier from an itinerary at block 2002. In some embodiments, the method 1902 may include identifying a destination airline carrier from an itinerary at block 2004. In some embodiments, the method 1902 may include identifying a PNR number from an itinerary at block 2006. In some embodiments, the method 1902 may include identifying a departure date from an itinerary at block 2008.

FIG. 23 illustrates a flow chart of a method 2300 for tracking a luggage item prior to affixing a bag tag on the luggage item in accordance with one embodiment. FIG. 24 illustrates a mobile communication device displaying a FIND MY application by APPLE®, Inc. in accordance with one embodiment. While the FIND MY application is an example tracker, other trackers may be used and the description should not be limited in any way to only the AIRTAG by APPLE®, Inc.

Although the method 2300 depicts a particular sequence of operations, the sequence may be altered without departing from the scope of the present disclosure. For example, some of the operations depicted may be performed in parallel or in a different sequence that does not materially affect the function of the method 2300. In other examples, different components of an example device or system that implements the method 2300 may perform functions at substantially the same time or in a specific sequence. In some embodiments, one or more of the blocks may be omitted or blocks may be added.

According to some embodiments, the method 2300 may include assigning a temporary wireless baggage tracker 1840 or 1842 to a passenger luggage item at block 2302.

By way of non-limiting example, the collected PNR and date and time of travel, described in FIG. 20, may be saved in a manifest or other file used to alert employes of a check-in window for the luggage item. The assigning of the temporary wireless baggage tracker to a passenger luggage item may include naming the temporary wireless tracker 1840 with the PNR of the passenger, for example.

According to some examples, the method 2300 may include affixing a temporary wireless baggage tracker to luggage item at block 2304.

According to some examples, the method 2300 may include transporting the luggage item to a baggage storage location at block 2306.

According to some examples, the method 2300 may include pinging 1850 the baggage tracker in the storage location to alert the employees of the location of the luggage item for the passenger at block 2308. For example, the AIRTAG can be controlled to play a sound.

According to some examples, the method 2300 may include matching passenger information with the PNR and/or the printed bag tag in a communication device linked to the tracker at block 2310 once the luggage item is located.

According to some examples, the method 2300 may include affixing the printed bag tag and/or the marker to the luggage item at block 2312 matching the passenger information. The bag tag information may be communicated to the passenger.

According to some examples, the method 2300 may include removing 2314 the temporary wireless baggage tracker. The temporary wireless baggage tracker may be reused for other luggage items.

This process may eliminate the need for a printed valet tag. Instead, the temporary wireless tracker may be used to replace the valet tag.

In some embodiments, the digital images of the luggage items in combination with the digital geolocation data and passenger name data on the passenger identification linked to the PNR may be used to replace a printed valet tag.

In some embodiments, processes herein allow the process for checking in a luggage item to begin prior to a regulated check-in window.

In view of the foregoing, the embodiments herein provide a method that includes receiving, by a first processor, a passenger name record (PNR) from a confirmed itinerary for a flight, the confirmed itinerary created by a computer system associated with an air carrier, receiving, by the first processor, information that confirms an identify of the passenger associated with the PNR from the confirmed itinerary to pick up and transport luggage associated with the PNR to a location from a passenger location, and generating, by a second processor in communication with the first processor, a simulated baggage source message (BSM) with the received PNR, the second processor being independent from the air carrier and the BSM being compatible with an International Air Transport Association (IATA) B-Type message.

For the sake of discussion and illustration, a BSM message is described. However, any B-Type message may be used that includes relevant passenger information that is accessible using the IATA bag tag number.

In view of the foregoing, the embodiments provide a system 1800 and method for checking in the luggage item that may include a first processor for receiving a passenger name record (PNR) of a confirmed itinerary for a flight. The confirmed itinerary is created by a computer system associated with an air carrier, for example. The first processor may receive information that confirms an identify of the passenger associated with the PNR from the confirmed itinerary to pick up and transport luggage associated with the PNR to a processing location (i.e., baggage storage location) from a passenger location. The system 1800 and method may employ a second processor in communication with the first processor to generate a simulated baggage source message (SBSM) using a temporary unique identifier 1630. The second processor is independent from the computer system of the air carrier. The simulated BSM is compatible with an International Air Transport Association (IATA) B-Type messages.

The system 1800 and method may employ the second processor to cause the creation of an originating IATA license plate for each luggage item associated with the PNR.

The system 1800 and method may employ the second processor to update the simulated BSM with the created IATA license plate. The second processor may communicate, to a computer system associated with the air carrier, the updated BSM.

The system 1800 and method may employ the first processor to receive the information that confirms the identity of the passenger. This may include the use of an imaging device in communication with the first processor to capture an image of an identification instrument issued to the passenger.

The system 1800 and method may employ the imaging device in communication with the first processor to capture an image of each luggage item associated with the PNR, prior to departing from the passenger location.

The simulated BSM may include information associated with inbound and outbound airports and dates.

The system 1800 and method may include a server or processor to check in a luggage item of the passenger and merge an airline BSM with the simulated BMS.

The system 1800 and method may include a printing device to print an originating IATA bag tag. The system and method may employ a communication device to communicate a 10-digit IATA bag tag number to a mobile communication device of the passenger.

The system 1800 and method may provision the 10-digit IATA bag tag number to be a universal bag tag number. The IATA bag tag is recycled for off-airport locations.

The system 1800 and method may include a temporary and re-assignable luggage tracker that can be temporarily associated with the luggage item so that when a check-in window opens for printing the IATA for a flight, the luggage tracker may be pinged to locate the luggage. After printing the originating IATA bag tag and locating the luggage, the luggage tracker can be removed and subsequently reassigned for use by another luggage item.

While the description herein describes the creation of a BSM, this description also applies to the creation of any of the other B-Type messages such as a baggage transfer message (BTM), baggage source message (BSM), baggage processed message (BPM), baggage unload message (BUM), baggage not seen message (BNS), baggage control message (BCM), baggage manifest message (BMM) and baggage request (BRQ), used outside of the airline environment and their baggage handling system. The bag tag number may be part of the baggage messages.

For example, when a delivery service is expecting to pick up baggage at a destination location and the baggage location is not there, a computing device may be able to access an expanded B-Type message and create a BUM, for example, such as when a luggage item is missing from a train station or a bus station.

In some embodiments, the method may include electronically receiving at least one passenger's itinerary for at least one of lodging reservation data associated with a lodging entity, and at least one mode of travel that includes an air travel mode with an originating airline travel carrier. The method may include generating, by a server 1310, a universal baggage source message (BSM) for multi-mode of travel, the universal BSM including sets of data fields for an airline mode of travel and lodging reservations linked by a digital unique identifier representative of an originating hardcopy bag tag identifier (OP-BTI) associated with or printed on a printed bag tag that is on a passenger's luggage item from the originating airline travel carrier. The method may include recycling the printed bag tag and OP-BTI using the universal BSM to check-in a luggage item of a passenger for a return flight associated with the at least one passenger's itinerary.

The method may include provisioning the recycled printed bag tag as a luggage locator at off-airport locations in response to the recycled printed bag tag being acquired by an acquiring device until a new printed bag tag is created for the return flight. This is accomplished for example by the creation of the database 1308 to allow the OP-BTI to live on after the originating flight. The machine-readability of the OP-BTI allows the OP-BTI to be scanned or read over and over to track, locate, or to only retrieve updated information by those needing to retrieve updated travel information, such as lodging information or other modes of transportation.

According to some embodiments, the generating of the database 1308 to include the universal BSM, as shown in FIG. 14, may include acquiring a digital data record representative of the OP-BTI by accessing an airline BSM 1200A, shown in FIG. 12A, of the originating airline travel carrier while the passenger is in flight. This may allow expanding the airline BSM having the OP-BTI very quickly which can be helpful when thousands of passengers are soon arriving for a voyage on a cruise ship or resort. The sooner the expansion process can occur for some passengers, overloading employees with processing down-stream passengers can be minimized. The expanded airline BSM includes sets of data fields for linking a messaging system 1390 and updated lodging reservation data. The server 1310 stores the expanded BSM as a universal multi-travel and lodging BSM in the database 1308.

While the description herein discloses an expanded BSM, the disclosure also relates to expanded B-Type messages that include information that is unique to the passenger and their luggage item.

The airline BSM 1200A (FIG. 12A) includes a plurality of sets of data fields. The fields include a bag tag data field (i.e., field 1212) with a sequence of numbers that represent at least the OP-BTI. The sequence of numbers may include the number of luggage items checked in. The fields may include a passenger's name data field that includes a passenger's name and a passenger name record (PNR) data field (i.e., field 1218).

In some embodiments, the expanding of the airline BSM may include creating a lite airline BSM 1200A' (FIG. 14A) by recycling the OP-BTI data field (i.e., field 1212), the passenger's name data field, and the PNR data field (i.e., field 1218) of the plurality of sets of data fields. The fields of the lite airline BSM are added to the expanded BSM. In some embodiments, all fields of the original airline BSM may be preserved and added to the expanded BSM.

In some embodiments, the expanding of the airline BSM may include appending to the lite airline BSM 1200A', by the server 1310, a link to the lodging reservation data in a field 1430 of the lodging entity associated with the passenger. However, in some embodiments, in lieu of a link to data, the data field 1430 may include data representative of an assigned room or a cabin number. The data field 1430 may include at least one data field. For example, the lodging data field may include geolocation data or an address of the lodging entity.

In some embodiments, the expanding of the airline BSM may include appending to the lite airline BSM, by the server 1310, a link to a travel mode reservation data of a second mode of travel different from the air travel mode that is in a field 1420. However, in some embodiments, in lieu of a link to data, the data field 1420 may include data representative of a train station or gate, date, time of departure. The data field 1420 may include at least one data field. For example, the mode of travel data field may include geolocation data or an address of the station.

In some embodiments, the expanding of the airline BSM may include at least one of: a) linking data to at least one stored image of the luggage item, such as in luggage image 1330 in database 1308, to the lite airline BSM in field 1440; b) linking data to location data of the luggage item in response to the OP-BTI being acquired by an acquiring device in field 1460; and c) linking data to an image of a passenger's identification, such as in database 1308 for the passenger ID image 1335 (FIG. 13) to the lite airline BSM in field 1450. The luggage location data log 1325 may be stored in database 1308.

The messaging system 1390 may be used to generate a message to the acquiring device in response to the acquiring device acquiring the OP-BTI. The acquiring device would send the image of the OP-BTI so that the digital BTI data record is created to query the database 1308 for information. The messaging system may provide any updated information to the acquiring device for directing the luggage item to the next location in the travel experience.

As shown in FIG. 12B and FIG. 14A, the method may further include creating a simulated BSM 1200B and checking in the luggage item using the simulated BSM to create the OP-BTI. The method may include printing, by printing device 1340, the printed bag tag 142' with the new OP-BTI for the return flight.

The method may include accessing, by the server 1310, an airline BSM 1200A using the PNR prior to the passenger arriving at a destination. The method may include acquiring, by the server 1310, the OP-BTI associated with the PNR in the airline BSM 1200A and retrieving, by the server 1310, the return flight data linked to the PNR and/or OP-BTI.

The method may include creating, by the server 1310, a lite airline BSM 1200A' and generating, by the server 1310, a simulated BSM with the return flight data. The method may include generating, by the server 1310, a universal BSM (i.e., universal B-Type message 1400A) with the lite airline BSM 1200A' and the simulated BSM 1200B appended together.

The method may include electronically acquiring, by an acquiring device, the OP-BTI on the recycled printed bag tag; logging an instance and a location associated with the OP-BTI affixed to the luggage item that is read by the acquiring device, in the luggage location data log 1325 of the database 1308; and appending a link to information representative of the logged instance and location to the universal BSM 1400A.

The method may include linking the lodging reservation data to the universal BSM 1400A; receiving updated assigned lodging reservation data; and communicating, by the messaging system 1390, the updated assigned lodging reservation data to at least one of: a mobile communication device, computing device, or a scanning device, in response to an acquiring device reading the recycled printed bag tag at an off-airport location.

The method may include electronically acquiring, by an acquiring device, the originating hardcopy bag tag identifier (OP-BTI) on the recycled printed bag tag affixed to the luggage item; querying, by the server 1310, the database (itinerary 1314) for an assigned room associated with the digital data record of the OP-BTI in the universal BSM, in response to receiving the acquired OP-BTI; and causing display on a display device of the acquiring device information associated with the assigned room, in response to the query, as shown in FIG. 3B.

The method may include utilizing, by the at least one processor, the OP-BTI as a machine-readable unique identifier to query the database 1308 or system 108 to retrieve return flight data of a departing passenger from the lodging entity; and checking in, by the at least one processor, each luggage item for the departing passenger for the return flight with a return flight travel carrier identified in the retrieved return flight data.

The method may include causing, by the at least one processor, creation of a new OP-BTI with the return flight data, passenger name and passenger name record; and printing, by a printing device 1340, a new bag tag 1350 with the new OP-BTI for the return flight.

The method may include generating, by the server 1310, an outbound simulated BSM 1200B with the return flight data, passenger name and passenger name record; assigning a new OP-BTI to the luggage item for the return flight; and populating a new digital BTI record representative of the assigned OP-BTI in the simulated BSM.

The system 1300 or 1800 may include a remote simulated Departure Control System (DCS) in communication with server 1310 or 1826 that assigns IATA compatible bag tags for a non-flying airline carrier with its own IATA assigned airline code that can be processed through traditional airline baggage handling systems. The assigned OP-BTI is assigned by a remote server 1826 in communication with the simulating DCS. The universal B-type message may be created for all IATA B-Type messages.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general-purpose computer, but rather the special purpose computer programmed to perform the disclosed algorithm.

A general-purpose computer, or microprocessor, may be programmed to carry out the algorithm/steps for creating a new machine. The general-purpose computer becomes a special purpose computer once it is programmed to perform particular functions pursuant to instructions from program software of the embodiments described herein. The instructions of the software program that carry out the algorithm/steps electrically change the general-purpose computer by creating electrical paths within the device. These electrical paths create a special purpose machine for carrying out the particular algorithm/steps.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

"Communication media" typically comprise computer readable instructions, data structures, program modules, or other data in a modulated data signal, such as carrier wave or other transport mechanism. The communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, infrared, and other wireless media. Combinations of any of the above are also included within the scope of computer readable medium.

Alternatively, or in addition, any of the functions and programming modules described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products, System-on-a-chip systems, Complex Programmable Logic Devices, and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices, otherwise known as non-transitory devices. The features of the embodiments described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, wearable device, an Internet-of-Things (IoT) device, and the like).

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

Computer and Software Technology

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Virtual servers, storage and services may be on premises or remote such as in the "cloud" through vendors operating under the brands, MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk, or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages. Additional languages may include scripting languages such as PYTHON, LUA and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Claim Terms

Airline Travel Carrier means a company that provides air transport services for traveling passengers and/or cargo.

BTI means "bag tag identifier." A bag tag identifier, also known as a baggage tag or baggage label, is a small tag or label attached to a passenger's luggage that contains identifying information about the passenger and their flight. It is used by airlines to track and handle the passenger's checked baggage. The tag usually includes the passenger's name, flight information (flight number, departure and destination airports, and date of travel), and a unique identifier, such as a bag tag number or barcode. The bag tag identifier number is unique for each luggage, and it is used as reference for the airlines to track the luggage through the baggage handling system, matching the luggage to the passenger's flight and route, and also to identify the owner of the luggage in case of misplaced, lost or delayed luggage. The bag tag identifier is usually issued at check-in, and the passenger attaches it to their luggage before they drop it off at the baggage drop-off counter.

Database means an organized collection of data stored, updated and accessed electronically. Databases are typically designed to hold data, support efficient query and data manipulation, and manage the way that data is stored and retrieved.

First-mode travel carrier (FMTC) means the initial carrier that affixes a tangible, machine-scannable indicium to a passenger's luggage which according to the present invention is used to retrieve the passenger PNR and then construct a passenger manifest for one or more return trips without having to manually reenter data.

International Air Transport Association (IATA) refers to the world-wide trade association of airlines (for both freight and passenger carriers) that regulates the aviation industry by promulgating standards, procedures, and practices.

License Plate means the ten-digit numeric code on a bag tag issued by a carrier to agent during check-in for a travel journey. The term "license plate" in this context is the official term used by IATA. The license plate is encoded in a machine-scannable bar code but also presented in human-readable form where it will have either a two-character or a three-digit IATA carrier code. For example, it may be either "CZ728359" or "784728359." "CZ" would be the two-character IATA code for China Southern Airlines, and "784" would be the three-digit IATA carrier code. For American Airlines®, the IATA Designator would be "AA" and the IATA code "001."

Lodging Entity means a business or operation providing residential hospitality services, such as a hotel, resort, or cruise ship as non-limiting examples.

Multi-Mode Travel means functionally using a B-Type message and using an IATA message, and expanding their use all the way to the lodging entity. The IATA message name, the PNR number, and the piece of paper becomes a bag tag for the entire trip and for any mode of travel.

Originating Hardcopy Bag Tag Identifier (OP-BTI) means a unique identifier associated with or printed on a luggage tag from the originating airline travel carrier. In general, every piece of luggage in airline travel is tagged with a unique identifier for tracking purposes. It is typically attached to the luggage at check-in and scanned at various points throughout the journey to ensure the luggage makes it to the correct destination.

Passenger Manifest means a record containing an array of data including data for check-in of a return leg of travel of a passenger with a designated return travel carrier.

PNR stands for "Passenger Name Record." It is a record in the database of an airline or a travel agency that contains all the details of a passenger's itinerary and trip information. This information includes the passenger's name, contact information, flight details, seat preferences, and any special requests. PNR also contains information about the booking, such as the booking date, fare, and ticketing status. It is used by the airlines and travel agencies to manage and keep track of the passenger's itinerary and travel plans. PNR number is unique for each passenger, and it is used as reference for the passengers, airlines and travel agencies. PNR is also used to check-in, check flight status, and make any changes to the reservation. The PNR number itself is typically 6 characters, often a combination of letters and numbers. While regulatory bodies like IATA (see above) do not dictate a universal format for PNRs, each PNR has five (5) mandatory fields including: (1) the phone for traveler or agent; (2) the last person who made changes in the PNR; (3) the itinerary which must include at least one segment of the journey; (4) the name of the passenger or passengers including full first and last names; and (5) specifying how and when a ticket is to be issued.

Radio-frequency identification (RFID) means a technology that uses electromagnetic fields to automatically identify, and track tags attached to objects.

Return travel carrier (RTC) means the carrier (e.g., airline) a passenger takes at the conclusion of a stay at a lodging entity. The RTC in the present invention is extracted in a process using the license plate printed by the FMTC to access the PNR of the passenger to build a passenger manifest for the return journey. Among other benefits, this reduces or eliminates data entry, particularly for the lodging entity checking in the passenger for the RTC.

Type B (or B-Type) messages refer to a specific format of communication that airlines and other entities in the air travel industry use to transmit and receive critical operational data. These messages are standardized and utilized for a wide range of applications, including flight planning, passenger booking and check-in, luggage tracking, weather updates, and other crucial air transport operations. The Type B messaging standard is overseen by the International Air Transport Association (IATA). Compared to more modern data types and formats like XML (extensible markup language) and JSON (JavaScript Object Notation), which carry message payloads, Type B messages employ a stringent structure. Type B messages operate on a "store-and-forward" mechanism, whereby a message sender sends data via their service provider, which is then stored for a contracted period, often seven (7) days. The data is delivered directly to a chosen recipient or via a gateway provider if they exist on a different network. Should delivery fail, contractual agreements allow the data to be re-sent, a contingency reflected in the PDM (Possible Duplicate Message) header.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method comprising:

a. generating, by at least one processor, at least one expanded baggage information message that includes an originating hardcopy bag tag identifier (OP-BTI) associated with or printed on a printed bag tag from an originating travel carrier that is on a luggage item of a passenger, the passenger having one or more luggage items, wherein the at least one expanded baggage information message is expanded from an airline baggage information message to include travel data of multiple modes of travel;

b. electronically acquiring, by at least one electronic acquiring device, the OP-BTI on the luggage item;

c. querying, by at least one processor, a database using the acquired OP-BTI as a unique identifier, wherein the database comprises the travel data of the at least one expanded baggage information message enumerating a travel path of the passenger by a different mode of travel from the originating travel carrier; and d. checking in, by the at least one processor, each luggage item of the one or more luggage items for the passenger for the travel path of the passenger using information from the at least one expanded baggage information message.

2. The method according to claim 1, wherein the different mode of travel is a lodging entity wherein the lodging entity includes one of a hotel, a resort, a cruise ship, a short term rental homestay, a long term rental homestay, a residential dwelling, and a building.

3. The method according to claim 1, wherein the electronically acquiring, by the at least one electronic acquiring device, includes one of:

a. scanning, by a barcode scanner, the OP-BTI on a printed paper bag tag from the originating airline travel carrier that is attached to the one or more luggage items;

b. scanning, by a barcode scanner, the OP-BTI on a printed marker from the originating airline travel carrier that is attached to the one or more luggage items;

c. receiving, by a radio frequency identifier (RFID) reader, RFID information associated with the OP-BTI; or d. receiving, by a near field communication (NFC) reader, an NFC signal associated with the OP-BTI.

4. The method according to claim 1, wherein the OP-BTI includes an International Air Transport Association (IATA) license plate number.

5. The method according to claim 1, wherein the at least one expanded baggage information message enumerating the travel path of the passenger includes an International Air Transport Association (IATA) bag tag number, the name of the passenger, and a passenger name record (PNR) number.

6. The method according to claim 1, further comprising populating, by a server, records in the database for the expanded baggage information message data fields for each mode of travel in an itinerary of the passenger identifying each mode of travel and lodging reservations linked by the unique identifier.

7. The method according to claim 1, further comprising:

a. receiving updated reservation information for the passenger;

b. updating a corresponding passenger itinerary linked to the at least one expanded baggage information message of the passenger in the database; and c. in response to acquiring the OP-BTI, triggering, by the at least one processor, a communication to a computing device of the updated reservation information.

8. The method according to claim 1, further comprising, in response to acquiring the OP-BTI, appending by the at least one processor, additional fields to at least one expanded baggage information message of the one or more luggage items for the passenger, wherein the appended additional fields include one or more of location identification, date, and time.

9. The method of claim 1, further comprising the step of updating a bag tag number field in the at least one expanded baggage information message for a newly issued International Air Transport Association (IATA) bag tag for the travel path.

10. The method of claim 1, wherein the at least one expanded baggage information message includes access or links to at least one data record referencing an originating flight, intermediate travel reservations, lodging entity reservations, an airline return flight, luggage location, luggage imagery, and passenger identification imagery.

11. A system comprising:

a. at least one processor configured to generate at least one expanded baggage information message that includes an originating hardcopy bag tag identifier (OP-BTI) associated with or printed on a printed bag tag from an originating travel carrier that is on a luggage item of a passenger, the passenger having one or more luggage items, wherein the at least one expanded baggage information message is expanded from an airline baggage information message to include travel data of multiple modes of travel;

b. at least one electronic acquiring device configured to electronically acquire the OP-BTI on the luggage item;

c. a database, wherein the at least one processor is configured to query the database using the acquired OP-BTI as a unique identifier, wherein the database comprises the travel data of the at least one expanded baggage information message enumerating a travel path of the passenger by a different mode of travel from the originating travel carrier; and d. wherein the at least one processor is configured to check in each luggage item of the one or more luggage items for the passenger for the travel path of the passenger using information from the at least one expanded baggage information message.

12. The system of claim 11, wherein the different mode of travel is a lodging entity wherein the lodging entity includes one of a hotel, a resort, a cruise ship, a short term rental homestay, a long term rental homestay, a residential dwelling, and a building.

13. The system of claim 11, wherein the at least one electronic acquiring device includes one of:

a. a barcode scanner configured to scan the OP-BTI on a printed paper bag tag from the originating airline travel carrier that is attached to the luggage item;

b. a barcode scanner configured to scan the OP-BTI on a printed marker from the originating airline travel carrier that is attached to the luggage item;

c. a radio frequency identifier (RFID) reader configured to receive RFID information associated with the OP-BTI; or d. a near field communication (NFC) reader configured to receive an NFC signal associated with the OP-BTI.

14. The system of claim 11, wherein the OP-BTI includes an International Air Transport Association (IATA) license plate number.

15. The system of claim 11, wherein the at least one expanded baggage information message enumerating the travel path of the passenger includes an International Air Transport Association (IATA) bag tag number, the name of the passenger, and a passenger name record (PNR) number.

16. The system of claim 11, further comprising a server configured to populate records in the database for expanded baggage information message data fields for each mode of travel in an itinerary of the passenger identifying each mode of travel and lodging reservations linked by the unique identifier.

17. The system of claim 11, wherein the at least one processor is further configured to:

a. receive updated reservation information for the passenger;

b. update a corresponding passenger itinerary linked to the at least one expanded baggage information message of the passenger in the database; and c. in response to acquiring the OP-BTI, trigger a communication to a computing device of the updated reservation information.

18. The system of claim 11, wherein the at least one processor is further configured to, in response to acquiring the OP-BTI, append additional fields to at least one expanded baggage information message of the luggage item for the passenger, wherein the appended additional fields include one or more of location identification, date, and time.

19. The system of claim 11, wherein the at least one processor is further configured to update a bag tag number field in the at least one expanded baggage information message for a newly issued International Air Transport Association (IATA) bag tag for the travel path.

20. The system of claim 11, wherein the at least one expanded baggage information message includes access or links to one or more data records referencing an originating flight, intermediate travel reservations, lodging entity reservations, an airline return flight, luggage location, luggage imagery, and passenger identification imagery.

21. A non-transitory computer-readable medium storing instructions that, when executed by at least one processor, cause the at least one processor to perform operations comprising:

a. generating, by the at least one processor, at least one expanded baggage information message that includes an originating hardcopy bag tag identifier (OP-BTI) associated with or printed on a printed bag tag from an originating travel carrier that is on a luggage item of a passenger, the passenger having one or more luggage items, wherein the at least one expanded baggage information message is expanded from an airline baggage information message to include travel data of multiple modes of travel;

b. electronically acquiring, by at least one electronic acquiring device, the OP-BTI on the luggage item;

c. querying, by the at least one processor, a database using the acquired OP-BTI as a unique identifier, wherein the database comprises the travel data of the at least one expanded baggage information message enumerating a travel path of the passenger by a different mode of travel from the originating travel carrier; and d. checking in, by the at least one processor, each luggage item of the one or more luggage items for the passenger for the travel path of the passenger using information from the at least one expanded baggage information message.

22. The non-transitory computer-readable medium of claim 21, wherein the different mode of travel is a lodging entity wherein the lodging entity includes one of a hotel, a resort, a cruise ship, a short term rental homestay, a long term rental homestay, a residential dwelling, and a building.

23. The non-transitory computer-readable medium of claim 21, wherein the electronically acquiring, by the at least one electronic acquiring device, includes one of:

a. scanning, by a barcode scanner, the OP-BTI on a printed paper bag tag from the originating airline travel carrier that is attached to the luggage item;

b. scanning, by a barcode scanner, the OP-BTI on a printed marker from the originating airline travel carrier that is attached to the luggage item;

c. receiving, by a radio frequency identifier (RFID) reader, RFID information associated with the OP-BTI; or d. receiving, by a near field communication (NFC) reader, an NFC signal associated with the OP-BTI.

24. The non-transitory computer-readable medium of claim 21, wherein the OP-BTI includes an International Air Transport Association (IATA) license plate number.

25. The non-transitory computer-readable medium of claim 21, wherein the at least one expanded baggage information message enumerating the travel path of the passenger includes an International Air Transport Association (IATA) bag tag number, the name of the passenger, and a passenger name record (PNR) number.

26. The non-transitory computer-readable medium of claim 21, wherein the operations further comprise populating, by a server, records in the database for the expanded baggage information message data fields for each mode of travel in an itinerary of the passenger identifying each mode of travel and lodging reservations linked by the unique identifier.

27. The non-transitory computer-readable medium of claim 21, wherein the operations further comprise:

a. receiving updated reservation information for the passenger;

b. updating a corresponding passenger itinerary linked to the at least one expanded baggage information message of the passenger in the database; and c. in response to acquiring the OP-BTI, triggering, by the at least one processor, a communication to a computing device of the updated reservation information.

28. The non-transitory computer-readable medium of claim 21, wherein the operations further comprise, in response to acquiring the OP-BTI, appending, by the at least one processor, additional fields to at least one expanded baggage information message of the luggage item for the passenger, wherein the appended additional fields include one or more of location identification, date, and time.

29. The non-transitory computer-readable medium of claim 21, wherein the operations further comprise updating a bag tag number field in the at least one expanded baggage information message for a newly issued International Air Transport Association (IATA) bag tag for the travel path.

30. The non-transitory computer-readable medium of claim 21, wherein the at least one expanded baggage information message includes access or links to one or more data records referencing an originating flight, intermediate travel reservations, lodging entity reservations, an airline return flight, luggage location, luggage imagery, and passenger identification imagery.

* * * * *